(12) United States Patent
Meyers et al.

(10) Patent No.: US 9,123,114 B2
(45) Date of Patent: Sep. 1, 2015

(54) SYSTEM AND PROCESSOR IMPLEMENTED METHOD FOR IMPROVED IMAGE QUALITY AND ENHANCEMENT BASED ON QUANTUM PROPERTIES

(71) Applicant: U.S. Army Research Laboratory, Adelphi, MD (US)

(72) Inventors: Ronald E Meyers, Columbia, MD (US); Keith S Deacon, Coumbia, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 14/461,625

(22) Filed: Aug. 18, 2014

(65) Prior Publication Data
US 2014/0353475 A1    Dec. 4, 2014

Related U.S. Application Data

(63) Continuation-in-part of application No. 13/477,890, filed on May 22, 2012, now Pat. No. 8,811,768, which is a continuation-in-part of application No. 13/247,470, filed on Sep. 28, 2011, now Pat. No.
(Continued)

(51) Int. Cl.
*G06K 9/40* (2006.01)
*G06T 5/00* (2006.01)
(Continued)

(52) U.S. Cl.
CPC .............. *G06T 5/007* (2013.01); *G01J 1/0411* (2013.01); *G01J 1/42* (2013.01); *G06N 99/002* (2013.01);
(Continued)

(58) Field of Classification Search
CPC ..................................................... H04N 1/488
See application file for complete search history.

(56) References Cited

U.S. PATENT DOCUMENTS

| | | | | |
|---|---|---|---|---|
| 5,790,275 | A | * | 8/1998 | Iizuka ........................... 358/474 |
| 6,204,962 | B1 | * | 3/2001 | Kawamura .................... 359/368 |

(Continued)

FOREIGN PATENT DOCUMENTS

| | | | |
|---|---|---|---|
| JP | 2014067061 A | * | 4/2014 |
| WO | WO 2005091548 A1 | * | 9/2005 |

OTHER PUBLICATIONS

"Probabilistic teleportation of a three-particle state via three pairs of entangled particles", Physical Review A 67, 014305 (2003), Jianxing Fang, Yinsheng Lin, Shiqun Zhu, and Xianfeng Chen.*
(Continued)

*Primary Examiner* — Michelle Entezari
(74) *Attorney, Agent, or Firm* — Lawrence E. Anderson

(57) ABSTRACT

A method and system for generating an image utilizing entangled quantum particle pairs comprising at least one processor; at least one source of entangled quantum particles having first and second channels, the first and second channel s outputting first and second pairs of entangled quantum particles, respectively, a first beam splitter operatively connected to the first channel; the first beam splitter configured to split the first pairs of entangled particles for entry into first and second spatial detectors; at least one focusing device operatively connected to the second channel configured to direct the second pairs of entangled quantum particles towards a distant target; each of the first and second spatial detectors detecting one particle of the first pairs of entangled quantum particles; the at least one processor operating to record the detection of entangled quantum particles by the first and second spatial detectors and create image data for display.

20 Claims, 34 Drawing Sheets

Related U.S. Application Data 8,532,427, and a continuation-in-part of application No. 13/198,133, filed on Aug. 4, 2011, now Pat. No. 8,373,107, which is a continuation-in-part of application No. 12/819,602, filed on Jun. 21, 2010, now Pat. No. 8,242,428, which is a continuation-in-part of application No. 12/330,401, filed on Dec. 8, 2008, now Pat. No. 7,812,303, said application No. 13/198,133 is a continuation-in-part of application No. 12/343,384, filed on Dec. 23, 2008, now Pat. No. 7,847,234, and a continuation-in-part of application No. 12/837,668, filed on Jul. 16, 2010, now Pat. No. 8,053,715, application No. 14/461,625, which is a continuation-in-part of application No. 14/303,078, filed on Jun. 12, 2014, and a continuation-in-part of application No. 14/086,463, filed on Nov. 21, 2013, and a continuation-in-part of application No. 14/022,148, filed on Sep. 9, 2013, which is a continuation-in-part of application No. 13/838,249, filed on Mar. 15, 2013, now Pat. No. 8,594,455.

(60) Provisional application No. 60/992,792, filed on Dec. 6, 2007.

(51) Int. Cl.

| | |
|---|---|
| G06N 99/00 | (2010.01) |
| G01J 1/04 | (2006.01) |
| G01J 1/42 | (2006.01) |
| G06T 5/50 | (2006.01) |
| G06T 3/40 | (2006.01) |
| H04N 5/232 | (2006.01) |
| H04B 10/70 | (2013.01) |

(52) U.S. Cl.
CPC ............... *G06T 3/4053* (2013.01); *G06T 5/50* (2013.01); *H04B 10/70* (2013.01); *H04N 5/23232* (2013.01)

(56) References Cited

U.S. PATENT DOCUMENTS

| | | | | |
|---|---|---|---|---|
| 6,535,327 | B1* | 3/2003 | Vodopyanov | 359/330 |
| 7,536,012 | B1 | 5/2009 | Meyers et al. | |
| 7,660,533 | B1 | 2/2010 | Meyers et al. | |
| 7,805,079 | B1* | 9/2010 | Meyers et al. | 398/118 |
| 7,812,303 | B2 | 10/2010 | Meyers et al. | |
| 7,847,234 | B2 | 12/2010 | Meyers et al. | |
| 7,945,168 | B2 | 5/2011 | Meyers et al. | |
| 8,053,715 | B2 | 11/2011 | Meyers et al. | |
| 8,149,501 | B2* | 4/2012 | Arahira | 359/328 |
| 8,242,428 | B2 | 8/2012 | Meyers et al. | |
| 8,373,107 | B2 | 2/2013 | Meyers et al. | |
| 8,503,885 | B2 | 8/2013 | Meyers et al. | |
| 8,532,427 | B2 | 9/2013 | Meyers et al. | |
| 8,594,455 | B2 | 11/2013 | Meyers et al. | |
| 8,706,437 | B2* | 4/2014 | Walmsley et al. | 702/85 |
| 8,811,763 | B2 | 8/2014 | Meyers et al. | |
| 8,811,768 | B2 | 8/2014 | Meyers et al. | |
| 2003/0019854 | A1* | 1/2003 | Gross et al. | 219/121.73 |
| 2005/0131746 | A1* | 6/2005 | Beausoleil et al. | 705/7 |
| 2005/0135620 | A1* | 6/2005 | Kastella et al. | 380/256 |
| 2005/0206904 | A1* | 9/2005 | Zaugg | 356/451 |
| 2007/0260658 | A1* | 11/2007 | Fiorentino et al. | 708/250 |
| 2008/0055493 | A1* | 3/2008 | Hanano | 349/9 |
| 2008/0085121 | A1* | 4/2008 | Tomaru | 398/138 |
| 2009/0016386 | A1* | 1/2009 | Edamatsu et al. | 372/21 |
| 2010/0278373 | A1* | 11/2010 | Capron et al. | 382/100 |
| 2012/0229668 | A1 | 9/2012 | Meyers et al. | |
| 2013/0308956 | A1 | 11/2013 | Meyers et al. | |
| 2014/0029850 | A1 | 1/2014 | Meyers et al. | |
| 2014/0119651 | A1 | 5/2014 | Meyers et al. | |

OTHER PUBLICATIONS

O'Sullivan, Malcolm N., Kam Wai Clifford Chan, and Robert W. Boyd. "Comparison of the signal-to-noise characteristics of quantum versus thermal ghost imaging." Physical Review A 82.5 (2010): 053803.*

Gatti, Alessandra, et al. "Ghost imaging with thermal light: Comparing entanglement and classicalcorrelation." Physical review letters 93.9 (2004): 093602.*

Machine Translation of JP2014-67061A.*

R. Meyers, K. Deacon, and Y. Shih, 'Ghost-imaging experiment by measuring reflected photons,' Phys. Rev. A 77, 041801(R) (2008).

D. L. Donoho, "Compressed sensing," IEEE Transactions on Information Theory, vol. 52, pp. 1289-1306, 2006.

E Candes, J. Romberg, and T. Tao, "Robust uncertainty principles: Exact signal Reconstruction from Highly Incomplete Frequency Information," IEEE Trans. Inf. Theory, 52, 489 (2006).

Giuliano Scarcelli, et al. "Can Two-Photon Correlation of Chaotic Light Be Considered as Correlation of Intensity Fluctuations?" Physics Review Letters 96, 063602 (2006).

O. Katz, Y. Bromberg, Y. Silberberg, "Compressive Ghost Imaging," Appl Phys. Lett., 95, 131110 (2009).

J. Shapiro, "Computational ghost imaging," Phys. Rev. A vol. 78 061802(R) (Dec. 18, 2008).

R. Meyers and K. Deacon,"Quantum Ghost Imaging Experiments at ARL", Proc. SPIE vol. 7815, 781501, (2010).

M. Figueiredo, R. Nowak, and S. Wright, "Gradient projection for sparse reconstruction: Application to compressed sensing and other inverse problems (2007)," IEEE J. Sel. Topics on Signal Processing, 1, 586 (2007).

R. Meyers, K. Deacon, and Y.Shih,"A new Two-photon Ghost Imaging Experiment with Distortion Study," J. Mod. Opt., 54, 2381-2392 (2007).

R. Meyers, K. Deacon, and Y. Shih, "Quantum imaging of an obscured object by measurement of reflected photons," Proc. SPIE vol. 7092, 70920E (2008) doi:10.1117/12.797926.

R. Meyers, K. Deacon, and Y. Shih, "Turbulence-free ghost imaging," Appl. Phys. Lett. 98, 111115 (Mar. 18, 2011); doi:10.1063/1.3567931.

R. Glauber, "The Quantum Theory of Optical Coherence," Phys. Rev. 130, 2529 (1963) 131, 2766 (Jun. 1963).

T. B. Pittman, et al. "Optical imaging by means of two-photon quantum entanglement,"Phys. Rev. A 52, R3429-R3432 (1995).

D. Strekalov, et al. "Observation of Two-Photon 'Ghost' Interference and Diffraction,"Phys. Rev. Lett. 74, 3600-3603 (1995).

R. Meyers, K. Deacon, Y. Shih, "Positive-negative turbulence-free ghost imaging," Appl. Phys. Lett. 100, 131114 (2012) (Mar. 29, 2012).

R. Meyers, K. Deacon, A. Tunick, Y. Shih, "Positive-negative turbulence-free ghost imaging experiments," Proc. Spie 8518 85180X-1 (2012).

Wang, Y. Cai, and and O. Korotkova, "Ghost imaging with partially coherent light in turbulent atmosphere," Proc. SPIE 7588, 75880F(2010).

J. Cheng, "Ghost imaging through turbulent atmosphere," Opt. Express 17, Issue 10, pp. 7916-7921 (2009).

Brown, R. Hanbury, The Question of Correlation Between Photons in Coherent Light Rays, Nature, No. 4548, Dec. 29, 1956, pp. 1447-1450.

Klyshko, D.N., "Combined EPR and Two-Slit Experiments: Interference of Advanced Waves", Physics Letters A, vol. 132, No. 6.7, pp. 299-304 (1988).

Zhang, Da, et al., "Correlated two-photon imaging with true thermal light", Optics Letters, vol. 30, No. 18, Sep. 15, 2005, pp. 2354-2356.

A.V. Sergienko, et al., "Two-photon geometric optical imaging and quantum 'cryptoFAX'" Proc. SPIE Int. Soc. Opt. Eng.(2799), p. 164-171, 1996.

Spiller, "Quantum Information Processing: Cryptography, Computation, and Teleportation," Proceedings of the IEEE Dec. 1996 Volume: 84Issue:12, pp. 1719 -1746ISSN: 0018-9219.

(56) References Cited

OTHER PUBLICATIONS

Jennewein, Thomas, et al. "Experimental Non locality Proof of Quantum Teleportation and Entanglement Swapping," Physical Review Letters vol. 88, No. 1, (Jan. 2002) 124-141.

Jennewein, Thomas, et al., Quantum Communication and Teleportation Experiments Using Entangled Photon Pairs (Dissertation zur Erlangung des Grades) "Doktor der Naturwissenschafen" Jun. 2002.

Roisse, et al. "Walk-off and Phase-compensated Resonantly Enhanced Frequency-doubling of Picosecond Pulses Using Type II Nonlinear Crystal," Applied Physics B: Lasers and Optics, vol. 69, No. 1, 25-27, DOI: 10.1007/Ds003400050764 (1999).

B.C. Jacobs, "Quantum Cryptography in Free Space," Nov. 15, 1996, Optics Letters, vol. 21, No. 22, p. 1854-1856.

A. Einstein, B. Podolksy and N. Rosen, "Can a Quantum-Mechanical Description of Reality Be Considered Complete?" Physical Review, vol. 47, May 15, 1935, pp. 777-800.

J-W. Pan, D. Bouwmeester, et al. "Experimental Entanglement Swapping: Entangling Photons That Never Interacted"Physical Review Letters 80, 3891-3894 May 1998.

J. Yin et al. "Lower Bound on the Speed of Nonlocal Correlations without Locality and Measurement Choice Loopholes,"Physical Review Letters 110, 260407 Jun. 2013.

* cited by examiner

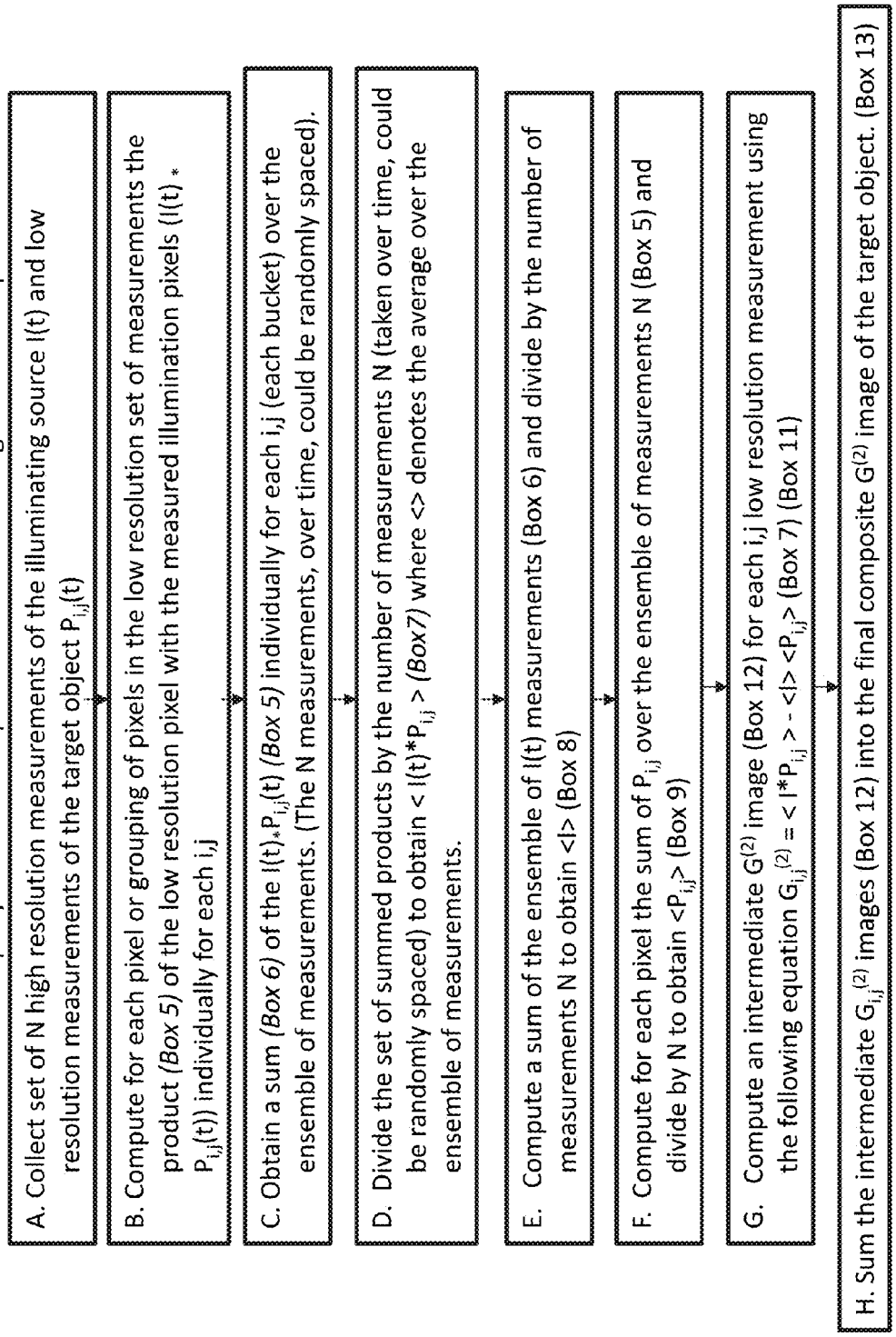

FIG. 1 FLOW CHART- Exemplary Resolution Improvement Process using a $G^{(2)}$ technique A. Collect set of N high resolution measurements of the illuminating source I(t) and low resolution measurements of the target object $P_{i,j}(t)$ B. Compute for each pixel or grouping of pixels in the low resolution set of measurements the product (Box 5) of the low resolution pixel with the measured illumination pixels (I(t) ∗ $P_{i,j}(t)$) individually for each i,j C. Obtain a sum (Box 6) of the $I(t)*P_{i,j}(t)$ (Box 5) individually for each i,j (each bucket) over the ensemble of measurements. (The N measurements, over time, could be randomly spaced).

D. Divide the set of summed products by the number of measurements N (taken over time, could be randomly spaced) to obtain $<I(t)*P_{i,j}>$ (Box 7) where <> denotes the average over the ensemble of measurements.

E. Compute a sum of the ensemble of I(t) measurements (Box 6) and divide by the number of measurements N to obtain <I> (Box 8)

F. Compute for each pixel the sum of $P_{i,j}$ over the ensemble of measurements N (Box 5) and divide by N to obtain $<P_{i,j}>$ (Box 9)

G. Compute an intermediate $G^{(2)}$ image (Box 12) for each i,j low resolution measurement using the following equation $G_{i,j}^{(2)} = <I*P_{i,j}> - <I><P_{i,j}>$ (Box 7) (Box 11)

H. Sum the intermediate $G_{i,j}^{(2)}$ images (Box 12) into the final composite $G^{(2)}$ image of the target object. (Box 13)

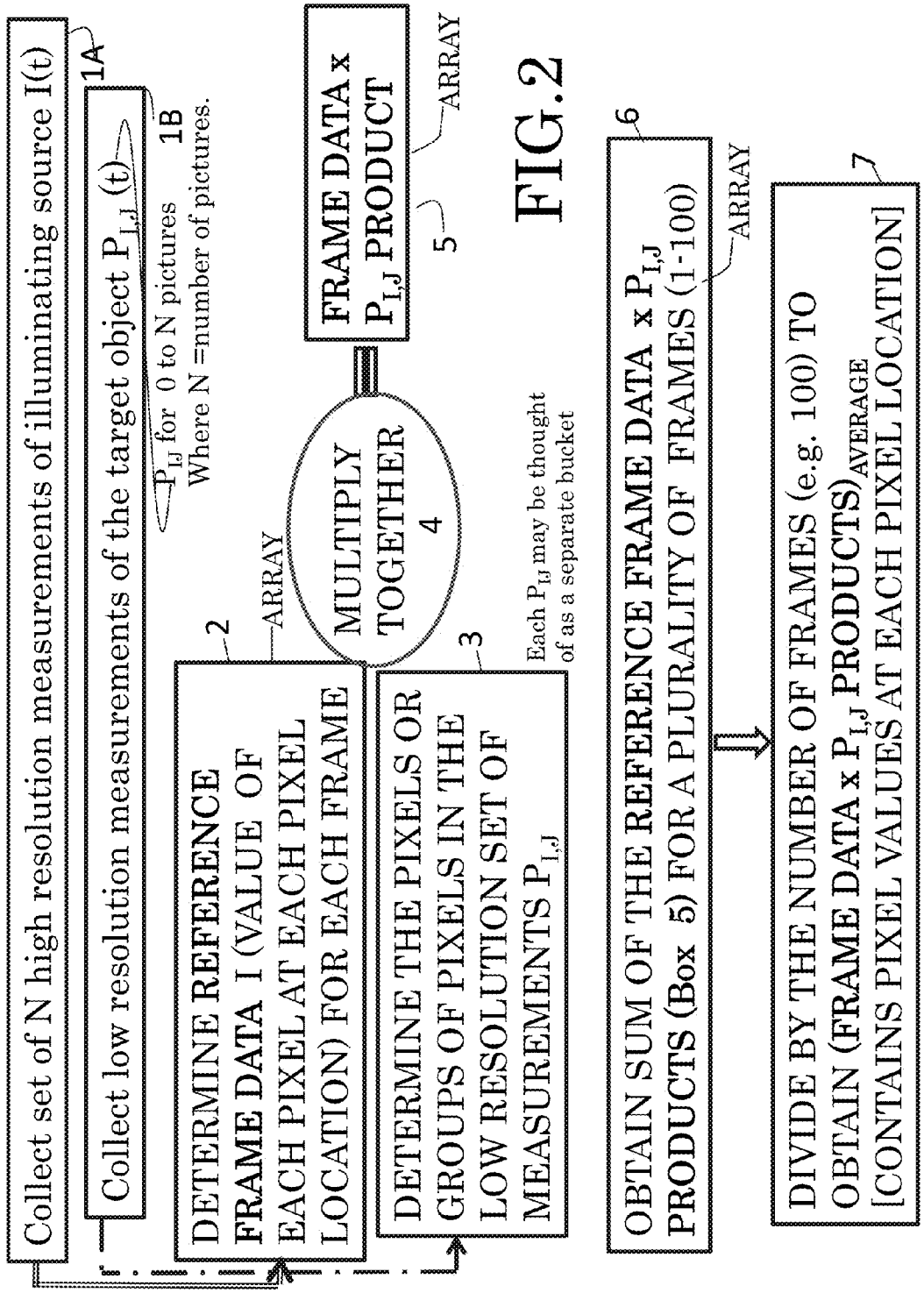

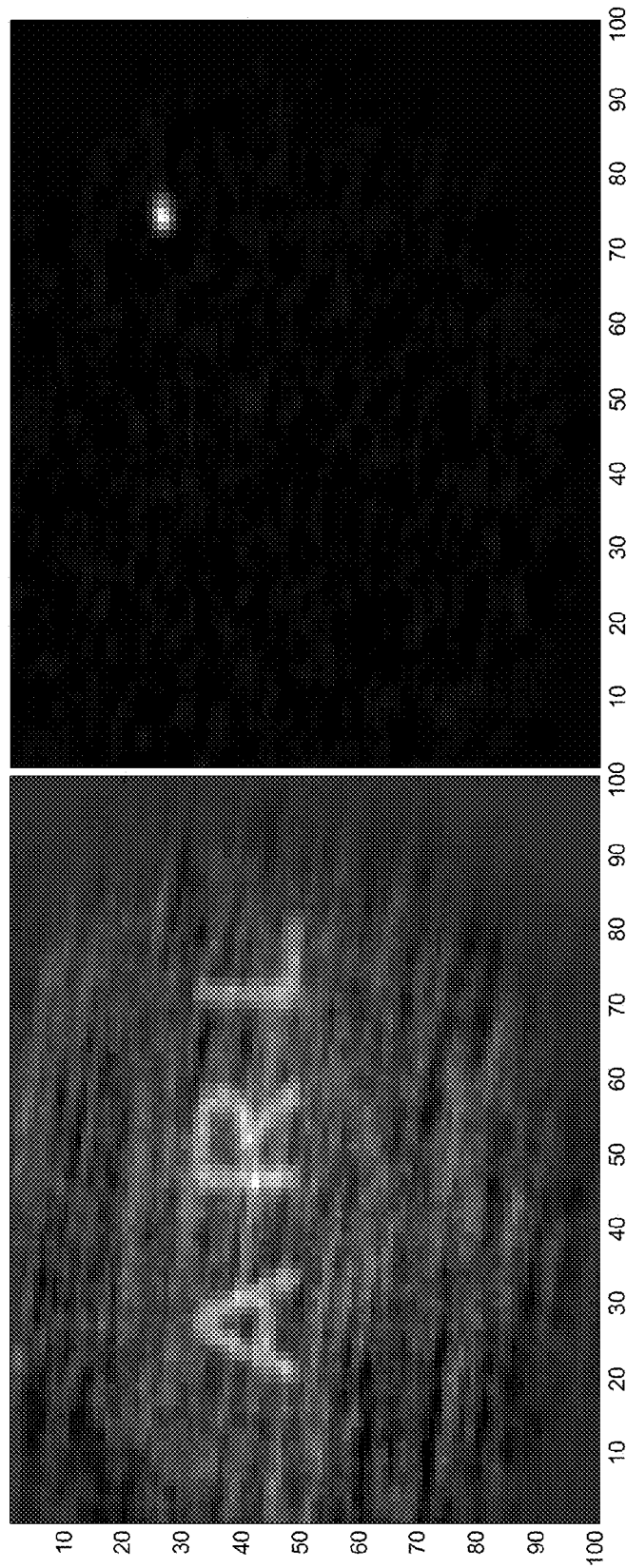
FIG. 7A Ghost Image
Computing using Compressive Sensing (CS) techniques using a single bucket that measured all the the light from the target subject.
FIG. 7B Sample single intermediate 2x2 bucket Ghost Image

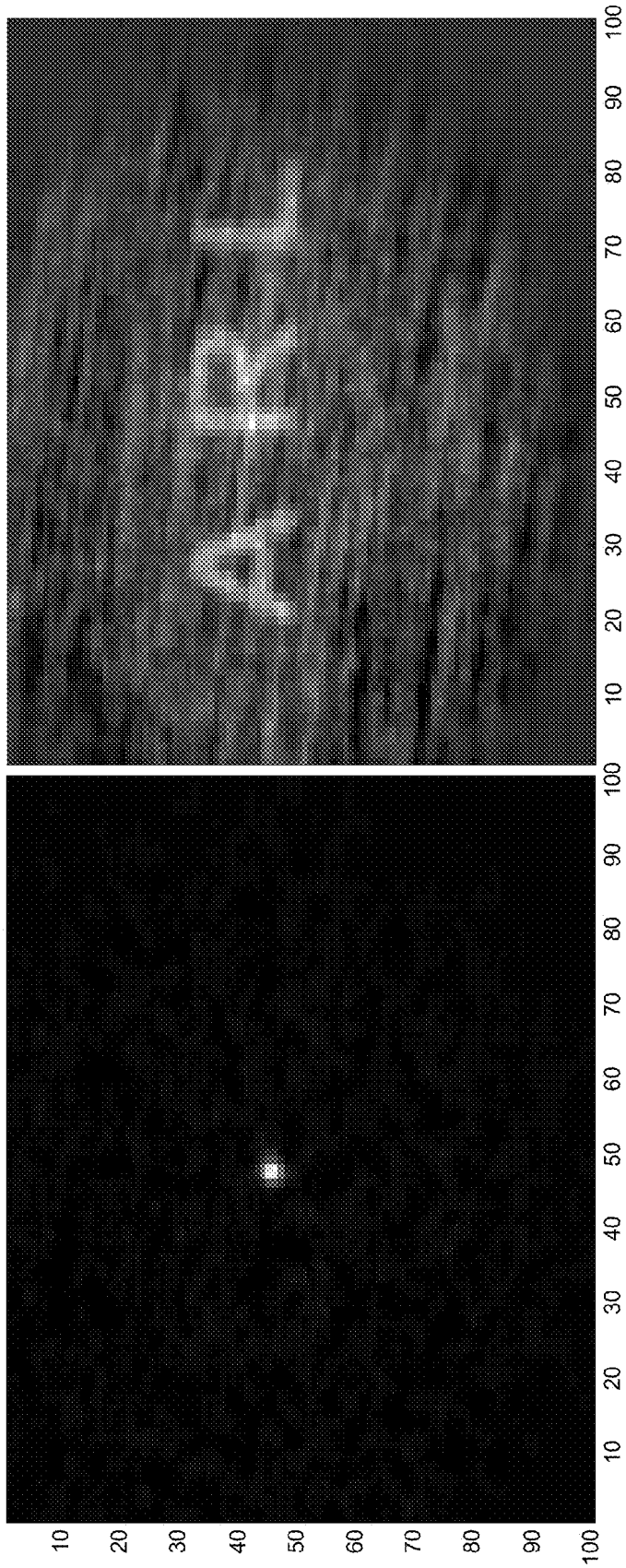
FIG. 8A Sample Single intermediate 2x2 bucket Ghost Image
FIG. 8B Ghost Image Computed using CS Techniques using the set of 2x2 pixel spatially averaged buckets and summed into a final Ghost Image.

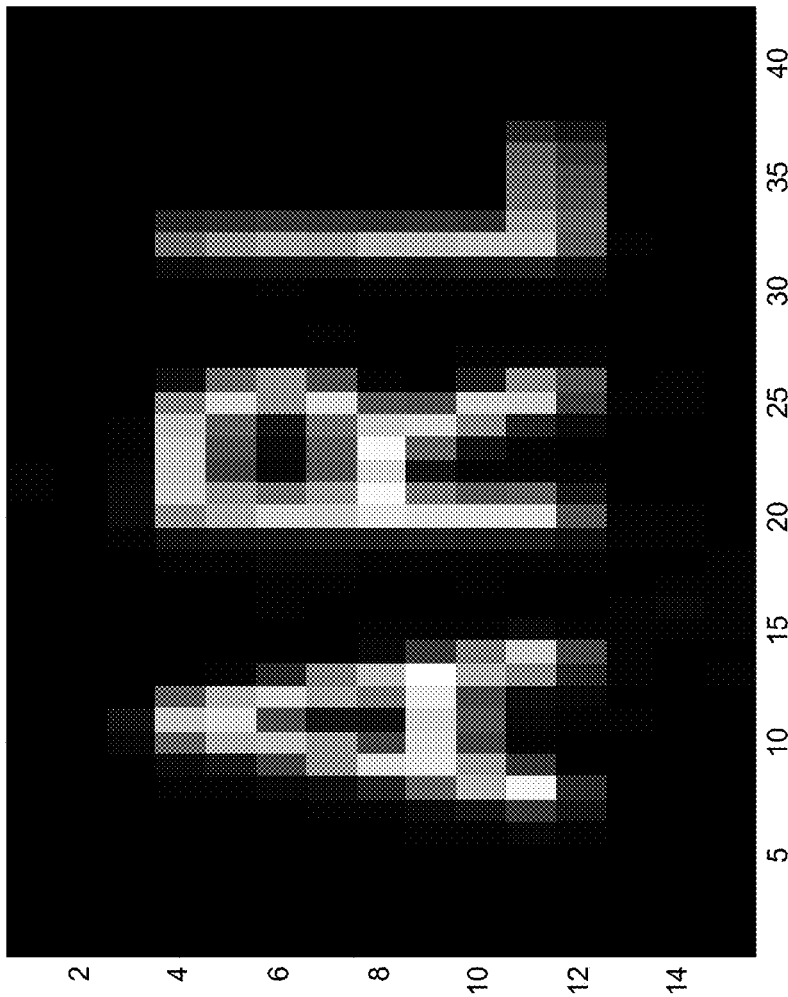
FIG. 9B 2x2 spatially averaged set of pixels of the target subject
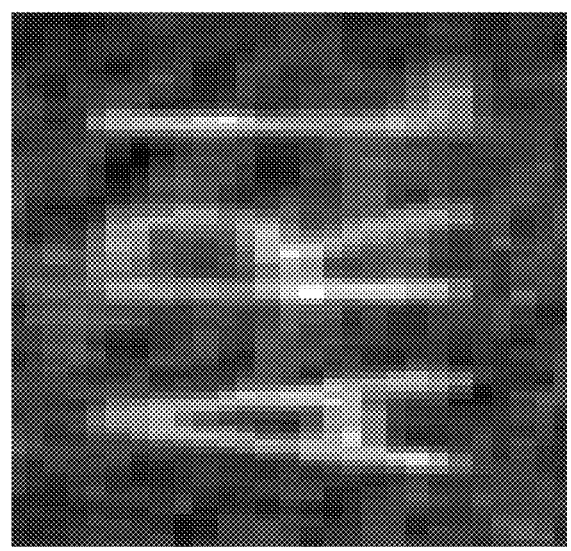
FIG. 9A 1x1 spatially averaged set of pixels of the target subject

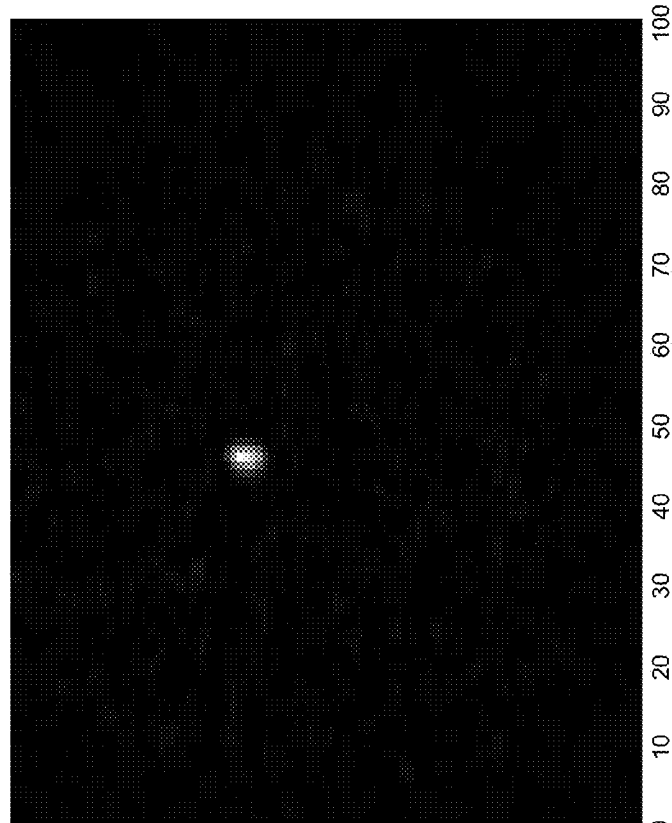
FIG. 10B Sample
Single intermediate 4x4 bucket
Ghost Image
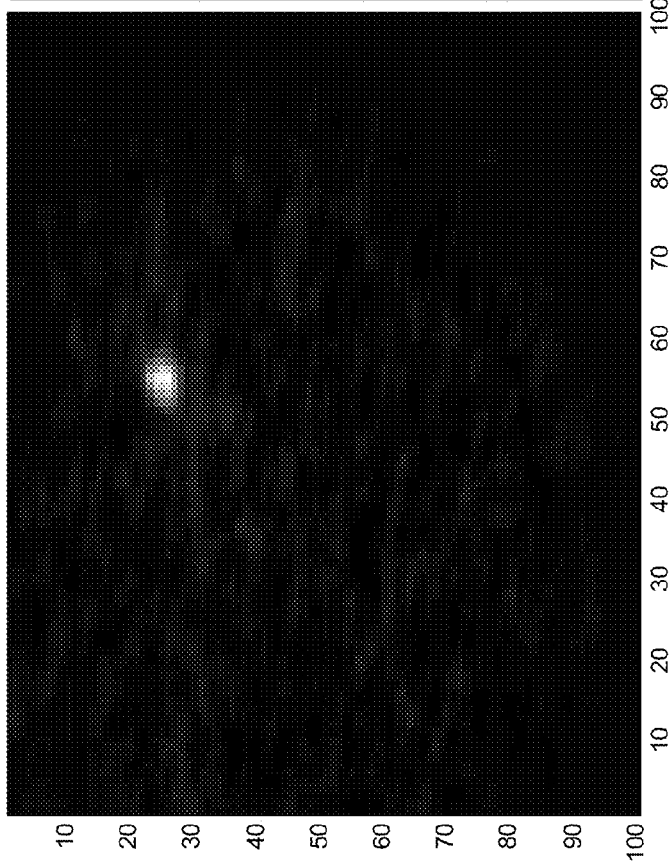
FIG. 10A Sample
Single intermediate 4x4 bucket
Ghost Image

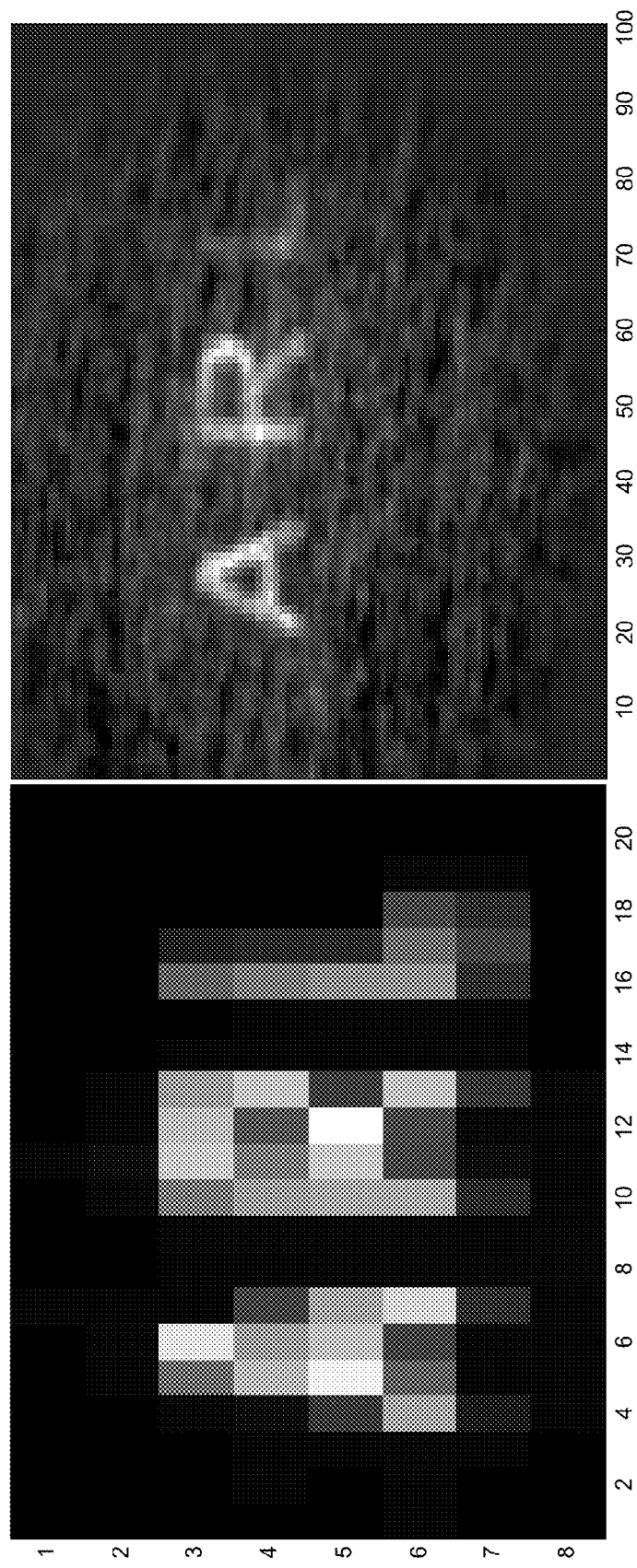
FIG. 11B Ghost Image Computed using CS Techniques using the set of 4x4 pixel spatially averaged buckets and summed into a final Ghost Image.
FIG. 11A 4x4 spatially averaged set of pixels of the target subject

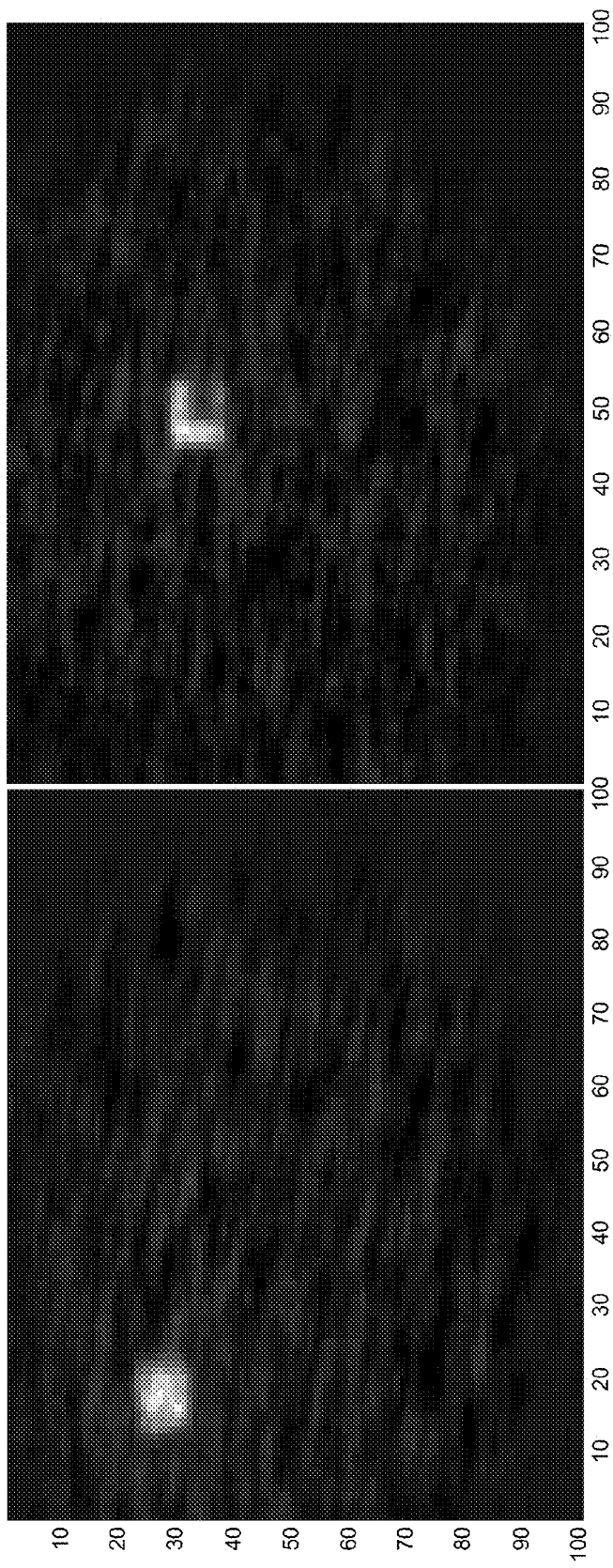
FIG. 12A Sample Single intermediate 8x8 bucket Ghost Image
FIG. 12B Sample Single intermediate 8x8 bucket Ghost Image

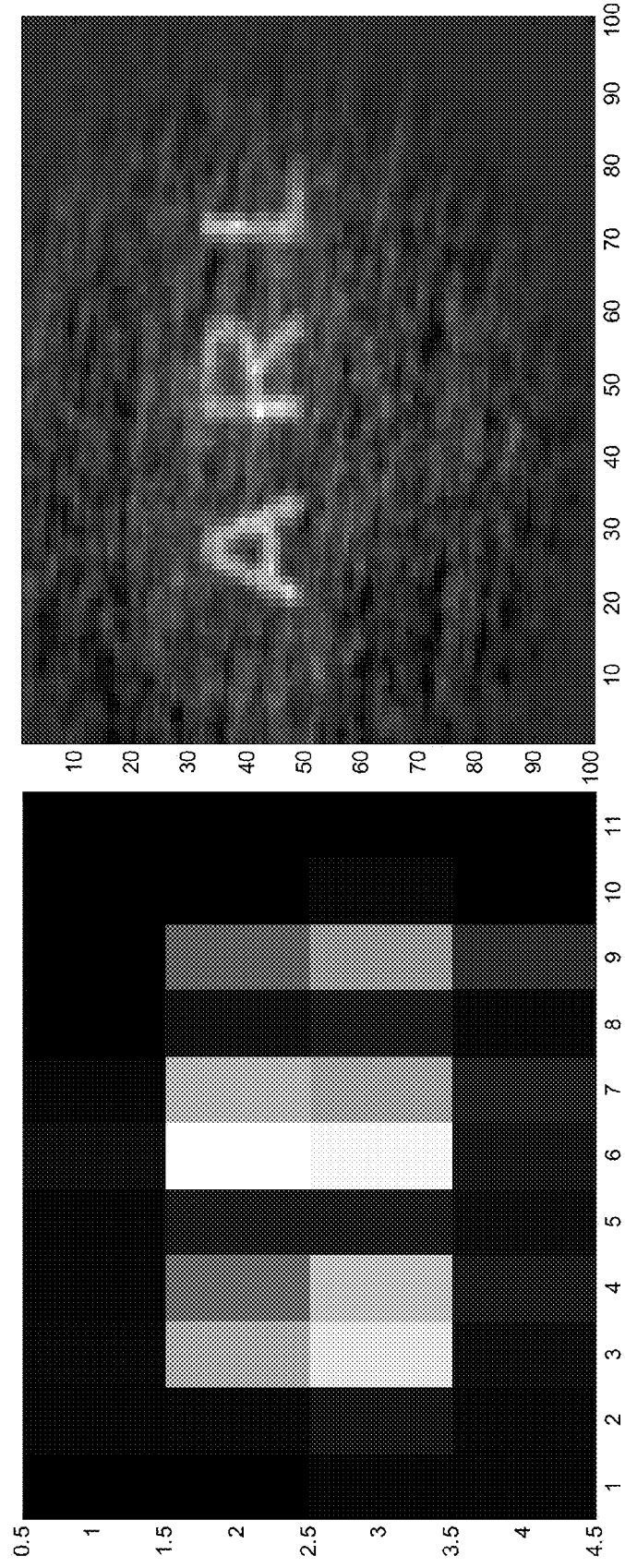
FIG. 13A 8x8 spatially averaged set of pixels of the target subject
FIG. 13B Ghost Image. Computed using CS Techniques using the set of 8x8 pixel spatially averaged buckets and summed into a final Ghost Image.

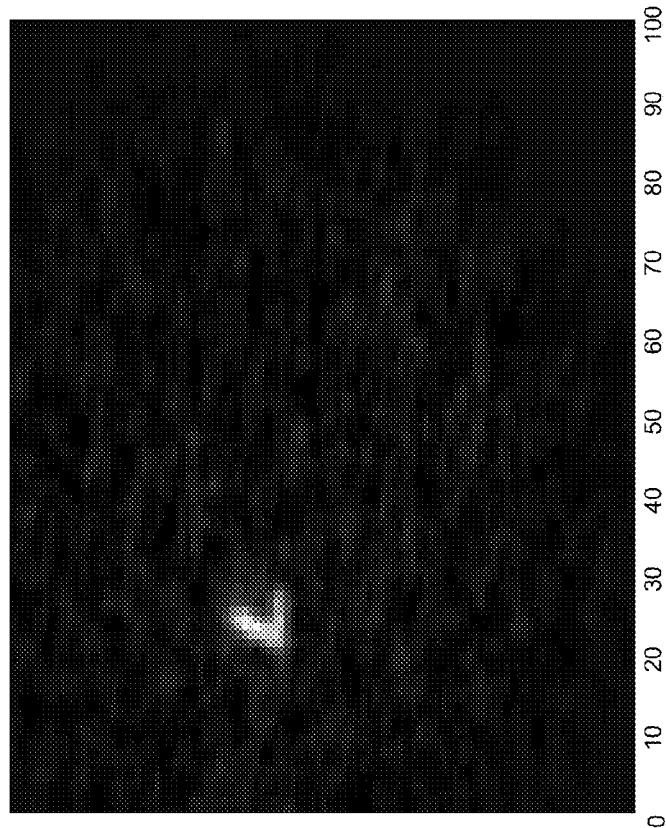
FIG. 14A Sample
Single intermediate, 8x8 with an overlap of 4, bucket Ghost Image
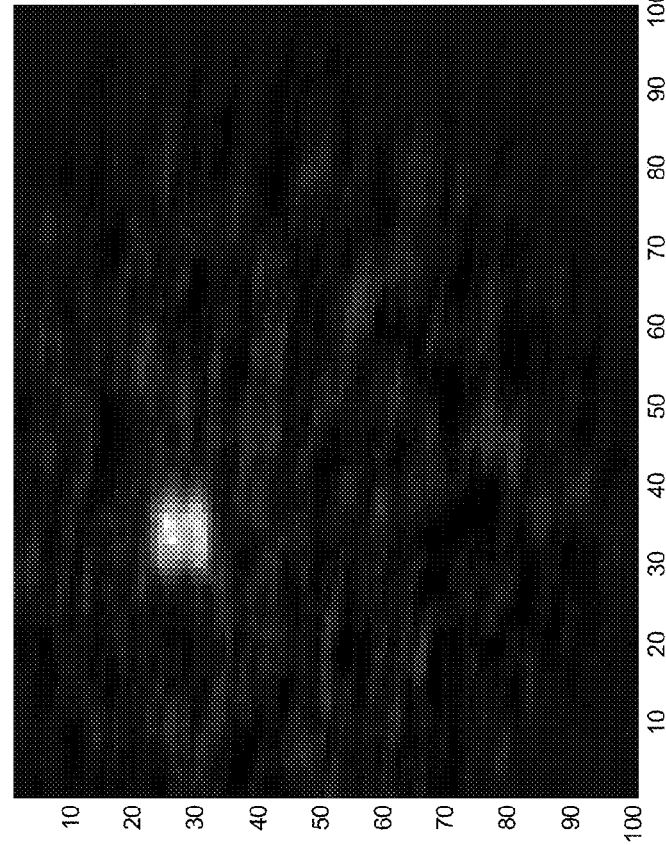
FIG. 14B Sample
Single intermediate, 8x8 with an overlap of 4, bucket Ghost Image

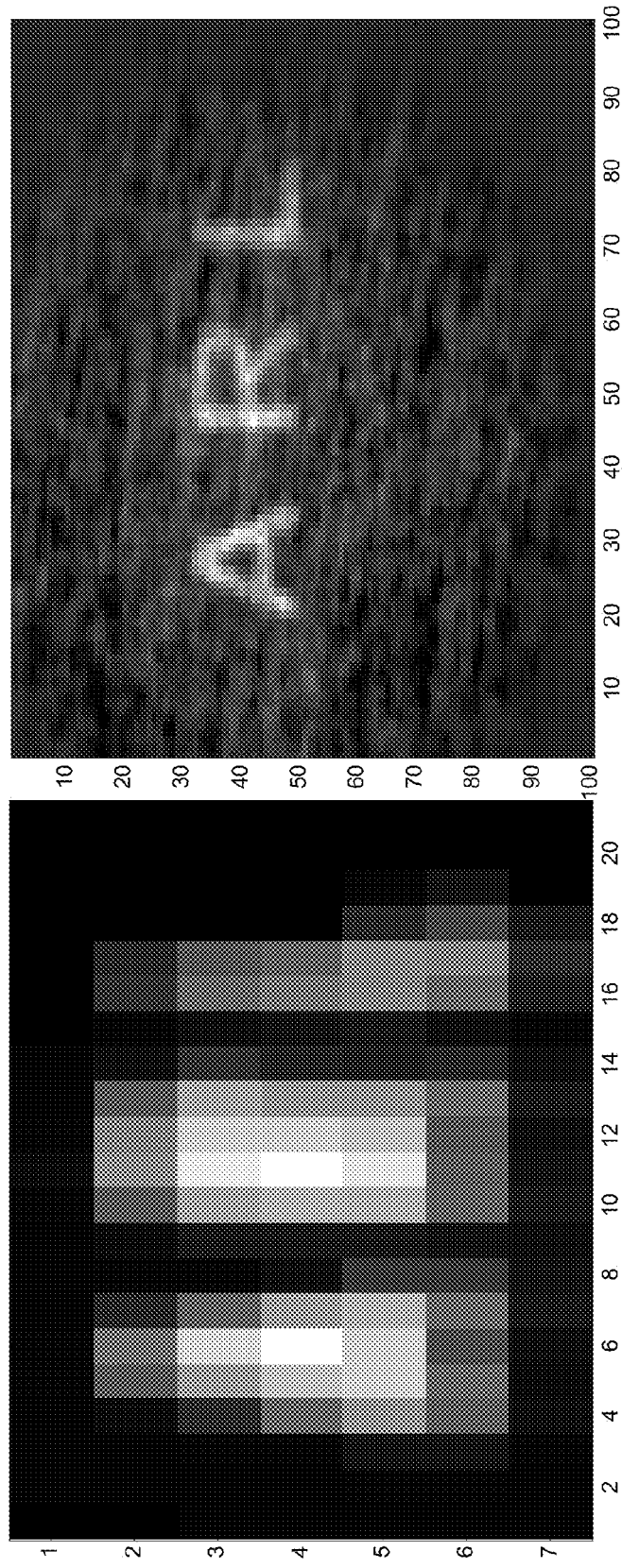
FIG. 15A 8x8 with overlap of 4 spatially averaged set of pixels of the target subject
FIG. 15B Ghost Image Computed using CS Techniques using the set of 8x8 overlap of 4 pixels spatially averaged buckets and summed into a final Ghost Image.

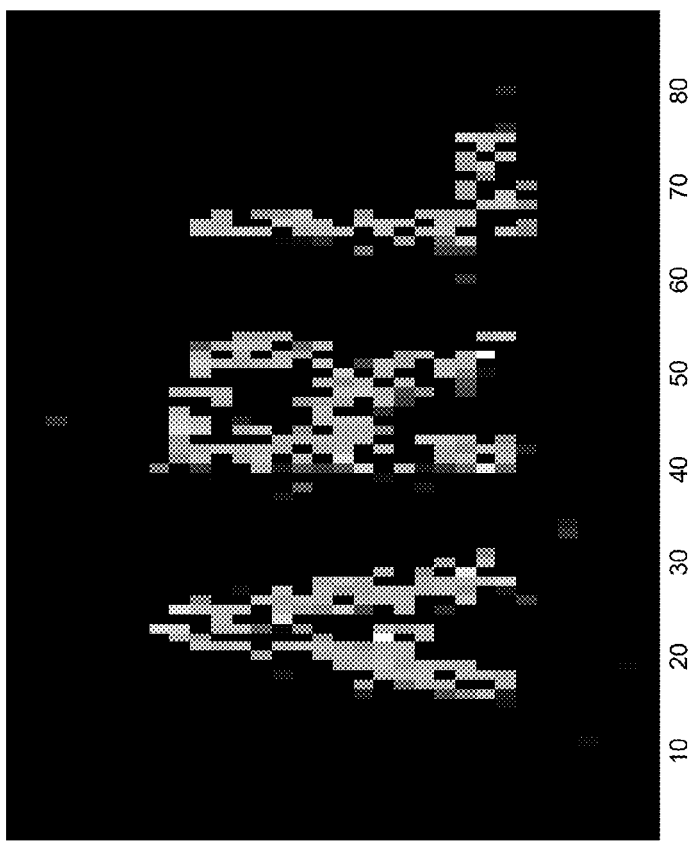
FIG. 16B Ghost
Image computed using CS techniques using 1400 shots with 2 randomly located pixel per shot
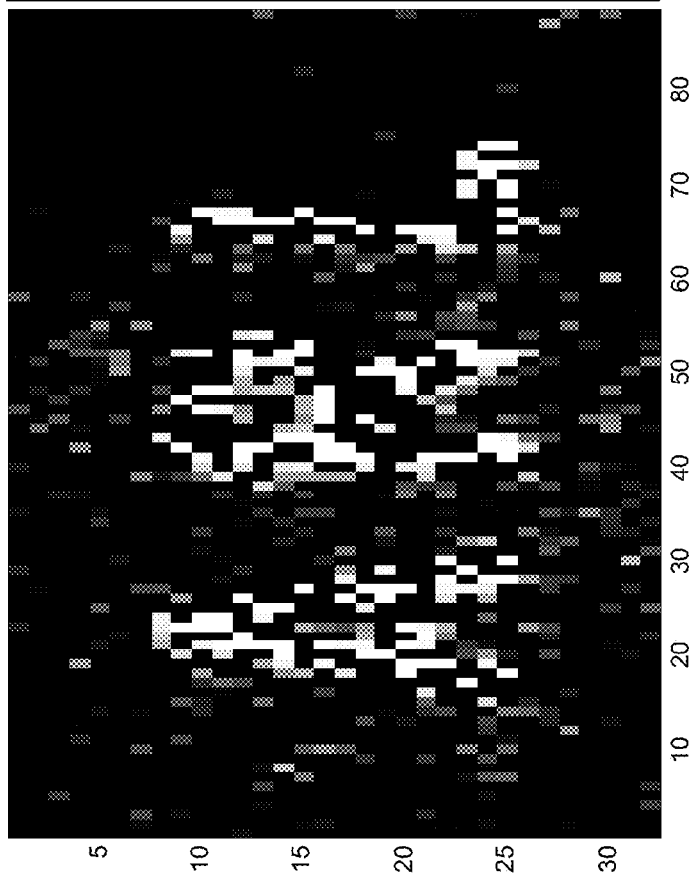
FIG. 16A Ghost
Image computed using CS techniques using 1400 shots with 1 randomly located pixel per shot

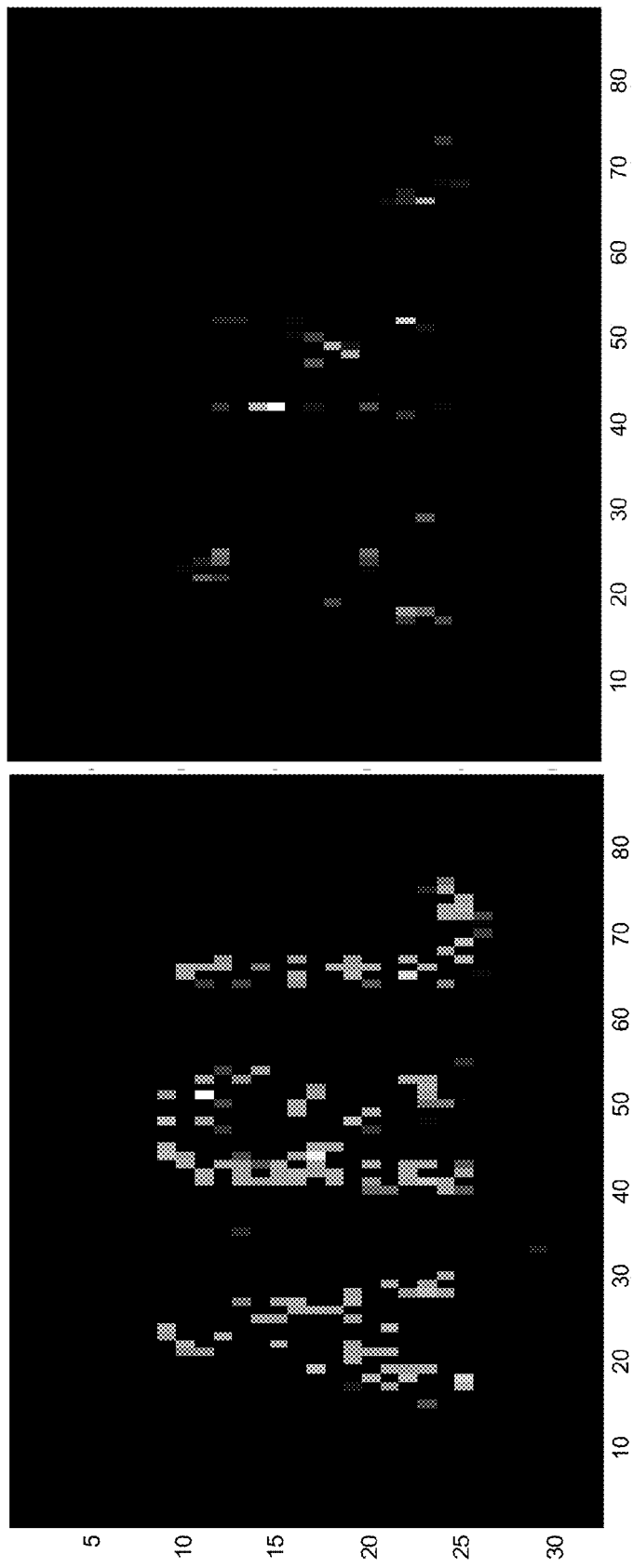
FIG. 17A Ghost
Image computed using CS techniques using 500 shots with 2 randomly located pixel per shot
FIG. 17B Ghost
Image computed using CS techniques using 10 shots with 1000 randomly located pixel per shot

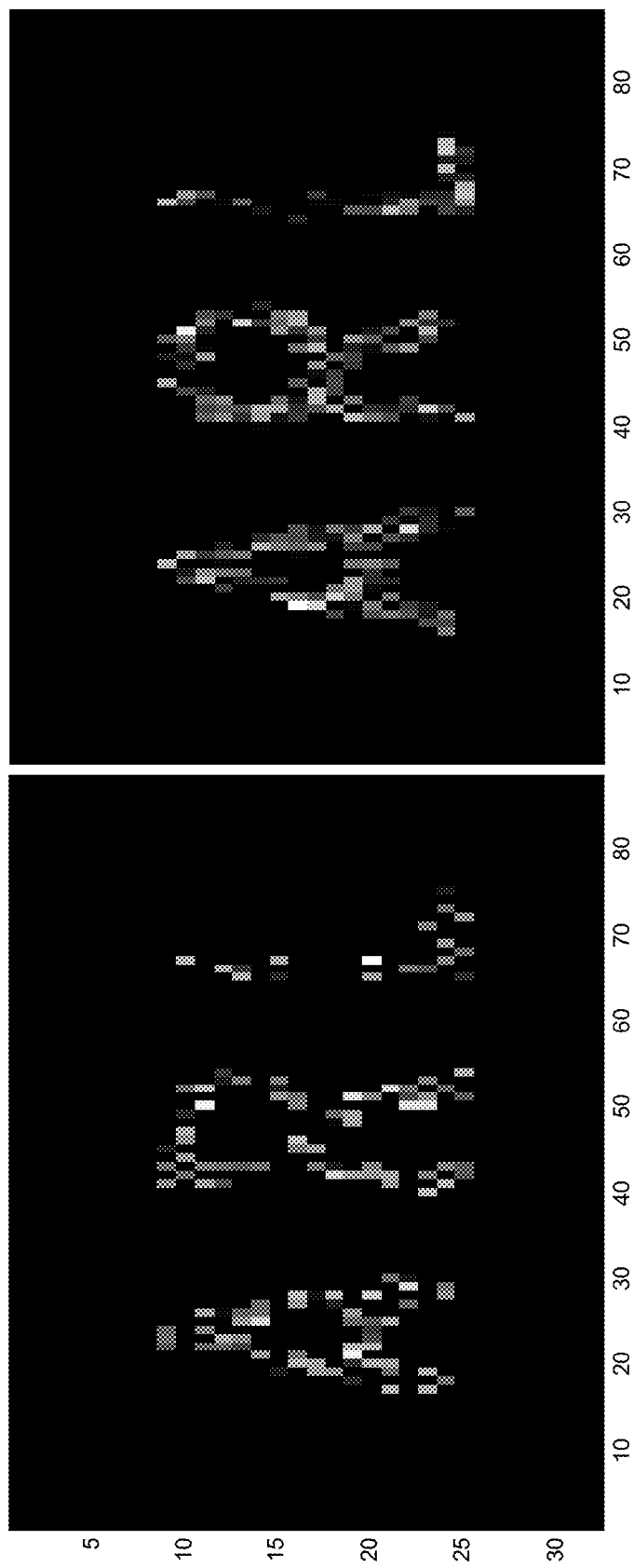

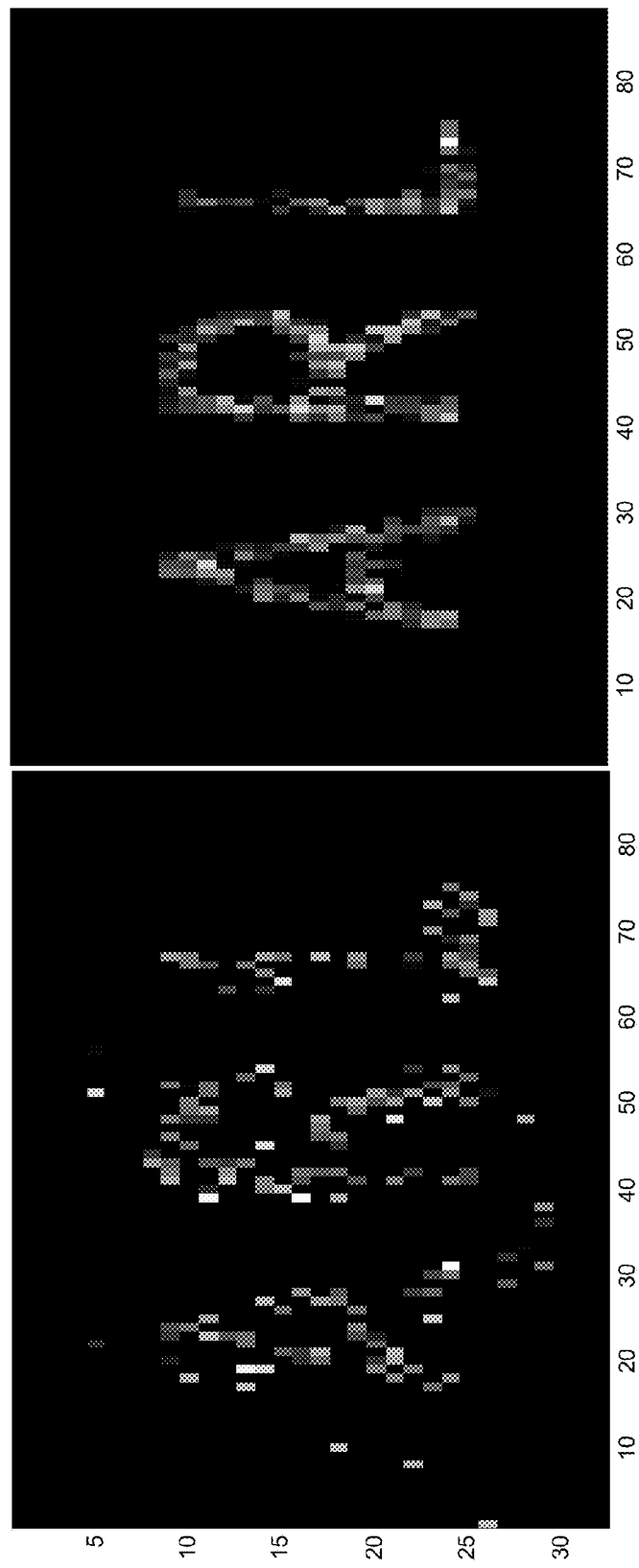
FIG. 19A Ghost
Image computed using CS techniques using 150 shots with 10 randomly located pixels per shot
FIG. 19B Ghost
Image computed using CS techniques using 150 shots with 1000 randomly located pixels per shot

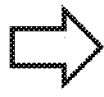
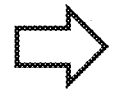

| INPUT A SERIES OF HIGH RESOLUTION FRAMES (e.g., 1-100) OF AN ILLUMINATING SOURCE ⟶ 315 | DETERMINE AVERAGE HIGH RESOLUTION FRAME DATA (AVERAGE VALUE OF EACH PIXEL AT EACH PIXEL LOCATION) FOR THE PLURALITY OF FRAMES ⟶ 316 | DETERMINE THE HIGH RESOLUTION FRAME DATA DEVIATION FOR EACH FRAME BY SUBTRACTING THE AVERAGE HIGH RESOLUTION FRAME DATA FROM THE HIGH RESOLUTION FRAME DATA FOR EACH FRAME (FOR EACH PIXEL) ⟶ 317 |

FIG. 21

SET 3 — 318

FOR EACH LOW RESOLUTION PIXEL WITH A POSITIVE LOW RESOLUTION FRAME DATA DEVIATION MULTIPLY THE POSITIVE LOW RESOLUTION FRAME DATA DEVIATION BY THE POSITIVE HIGH RESOLUTION FRAME DATA DEVIATIONS (on a pixel basis) WITHIN THAT SET OF LOW RESOLUTION PIXELS TO OBTAIN THE PRODUCT OF THE POSITIVE LOW RESOLUTION FRAME DATA DEVIATION (for each pixel) x POSITIVE HIGH RESOLUTION FRAME DATA DEVIATION (for each pixel)

RECORD AND ACCUMULATE (a) PIXEL LOCATIONS, (b) THE SQUARE OF THE POSITIVE LOW RESOLUTION FRAME DATA DEVIATION VALUES, (c) THE PRODUCT OC THE POSITIVE LOW RESOLUTION FRAME DATA DEVIATION, AND (d) THE SQUARE OF THE POSITIVE HIGH RESOLUTION FRAME DATA DEVIATION PIXELS VALUES THAT WERE USED AT A PIXEL LOCATION. — 319

(a) DETERMINE THE PRE-NORMALIZED POSITIVE-POSITIVE PRODUCT PIXEL VALUES BY DIVIDING THE PRODUCT OF THE POSITIVE LOW RESOLUTION FRAME DATA DEVIATION x POSITIVE HIGH RESOLUTION FRAME DATA DEVIATION (on a pixel basis) BY THE ACCUMULATED PIXEL LOCATIONS. — 320A (b) DETERMINE THE AVERAGE THE SQUARES OF THE POSITIVE LOW RESOLUTION FRAME DATA DEVIATION VALUES BY DIVIDING THE ACCUMULATED SQUARES OF THE POSITIVE LOW RESOLUTION FRAME DATA DEVIATION VALUES BY THE ACCUMULATED PIXEL LOCATIONS — 320B (c) DETERMINE THE AVERAGE THE SQUARES OF THE POSITIVE HIGH RESOLUTION FRAME DATA DEVIATION PIXELS BY DIVIDING THE ACCUMULATED SQUARES OF THE POSITIVE HIGH RESOLUTION FRAME DATA DEVIATION PIXEL VALUES BY THE ACCUMULATED PIXEL LOCATIONS — 320C

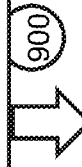

FIG. 22

SET 4

400 — (800)

401 — FOR EACH LOW RESOLUTION PIXEL WITH A NEGATIVE LOW RESOLUTION INTENSITY DEVIATION MULTIPLY THE NEGATIVE LOW RESOLUTION INTENSITY DEVIATION BY THE NEGATIVE HIGH RESOLUTION FRAME DATA DEVIATION PIXELS WITHIN THAT SET OF PIXELS

RECORD AND ACCUMULATE PIXEL LOCATIONS(a), THE SQUARE OF THE NEGATIVE LOW RESOLUTION FRAME DATA DEVIATION VALUES(b), THE PRODUCT OF THE NEGATIVE LOW RESOLUTION FRAME DATA DEVIATION x NEGATIVE HIGH RESOLUTION FRAME DATA DEVIATION PIXELS (c) AND THE SQUARE OF THE NEGATIVE HIGH RESOLUTION FRAME DATA DEVIAITON PIXELS (d) VALUES THAT WERE USED AT A PIXEL LOCATION.

DETERMINE THE PRE-NORMALIZED NEGATIVE-NEGATIVE PRODUCT PIXEL VALUES BY DIVIDING THE PRODUCT OF THE NEGATIVE LOW RESOLUTION FRAME DATA DEVIATION x NEGATIVE HIGH RESOLUTION FRAME DATA DEVIATION PIXELS BY THE ACCUMULATED PIXEL LOCATIONS   402A

DETERMINE THE AVERAGE THE SQUARES OF THE NEGATIVE LOW RESOLUTION FRAME DATA DEVIATION VALUES BY DIVIDING THE ACCUMULATED SQUARES OF THE NEGATIVE LOW RESOLUTION FRAME DATA DEVIATION VALUES BY THE ACCUMULATED PIXEL LOCATIONS   402B

DETERMINE THE AVERAGE THE SQUARES OF THE NEGATIVE HIGH RESOLUTION FRAME DATA DEVIATION PIXELS BY DIVIDING THE ACCUMULATED SQUARES OF THE NEGATIVE HIGH RESOLUTION FRAME DATA DEVIATION PIXEL VALUES BY THE ACCUMULATED PIXEL LOCATIONS   402C (901)

FIG. 24

SET 4

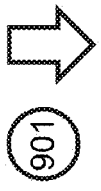

403 — DETERMINE THE STANDARD DEVIATION OF THE NEGATIVE LOW RESOLUTION FRAME DATA DEVIATION VALUES BY TAKING SQUARE ROOT OF THE AVERAGE THE SQUARES OF THE NEGATIVE LOW RESOLUTION FRAME DATA DEVIATION VALUES

404 — DETERMINE THE STANDARD DEVIATION OF THE NEGATIVE HIGH RESOLUTION FRAME DATA DEVIATION PIXELS BY TAKING SQUARE ROOT OF THE AVERAGE THE SQUARES OF THE NEGATIVE HIGH RESOLUATION FRAME DATA DEVIATION PIXEL VALUES

405 — DETERMINE THE NORMALIZED NEGATIVE-NEGATIVE PRODUCT PIXEL VALUES BY DIVIDING THE PRE-NORMALIZED NEGATIVE-NEGATIVE PRODUCT BY THE PRODUCT OF THE STANDARD DEVIATION OF THE NEGATIVE LOW RESOLUTION FRAME DATA DEVIATION VALUES x THE STANDARD DEVIATION OF THE NEGATIVE HIGH RESOLUTION FRAME DATA DEVIATION PIXELS

FIG. 25

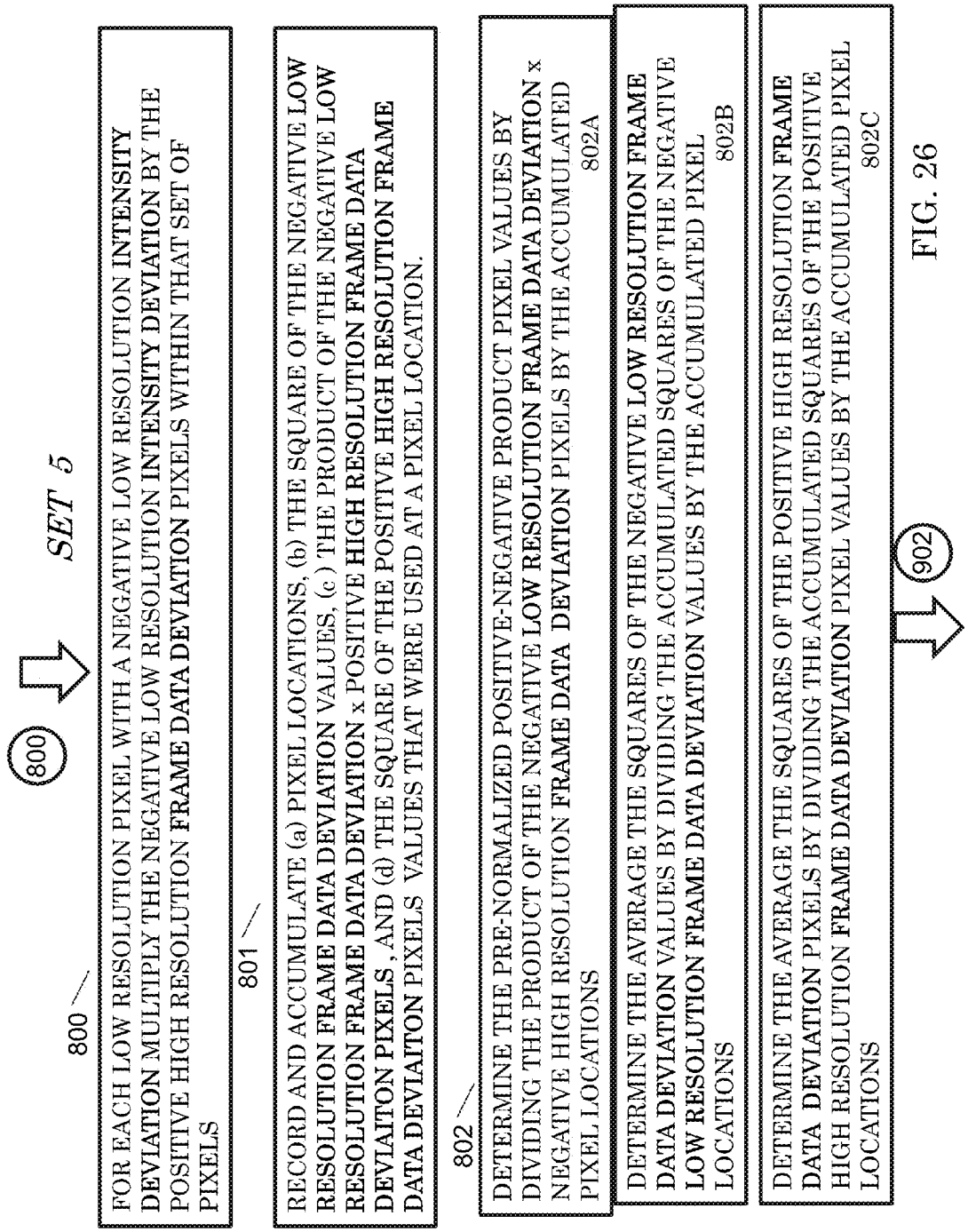

SET 5

803 — DETERMINE THE STANDARD DEVIATION OF THE NEGATIVE LOW RESOLUTION FRAME DATA DEVIATION VALUES BY TAKING SQUARE ROOT OF THE AVERAGE THE SQUARES OF THE NEGATIVE LOW RESOLUTION FRAME DATA DEVIATION VALUES

804 — DETERMINE THE STANDARD DEVIATION OF THE POSITIVE HIGH RESOLUTION FRAME DATA DEVIATION PIXELS BY TAKING SQUARE ROOT OF THE AVERAGE THE SQUARES OF THE POSITIVE HIGH RESOLUATION FRAME DATA DEVIATION PIXEL VALUES

805 — DETERMINE THE NORMALIZED POSITIVE-NEGATIVE PRODUCT PIXEL VALUES BY DIVIDING THE PRE-NORMALIZED POSITIVE-NEGATIVE PRODUCT BY THE PRODUCT OF THE STANDARD DEVIATION OF THE NEGATIVE LOW RESOLUTION FRAME DATA DEVIATION VALUES x THE STANDARD DEVIATION OF THE POSITIVE HIGH RESOLUTION FRAME DATA DEVIATION PIXELS

FIG. 27

*SET 6*

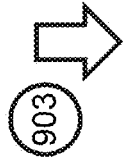

603 — DETERMINE THE STANDARD DEVIATION OF THE POSITIVE LOW RESOLUTION FRAME DATA DEVIATION VALUES BY TAKING SQUARE ROOT OF THE AVERAGE THE SQUARES OF THE POSITIVE LOW RESOLUTION FRAME DATA DEVIATION VALUES

604 — DETERMINE THE STANDARD DEVIATION OF THE NEGATIVE HIGH RESOLUTION FRAME DATA DEVIATION PIXELS BY TAKING SQUARE ROOT OF THE AVERAGE THE SQUARES OF THE NEGATIVE HIGH RESOLUATION FRAME DATA DEVIATION PIXEL VALUES

605 — DETERMINE THE NORMALIZED NEGATIVE-POSITIVE PRODUCT PIXEL VALUES BY DIVIDING THE PRE-NORMALIZED NEGATIVE-POSITIVE PRODUCT BY THE PRODUCT OF THE STANDARD DEVIATION OF THE POSTIVE LOW RESOLUTION FRAME DATA DEVIATION VALUES x THE STANDARD DEVIATION OF THE NEGATIVE HIGH RESOLUTION FRAME DATA DEVIATION PIXELS

FIG. 29

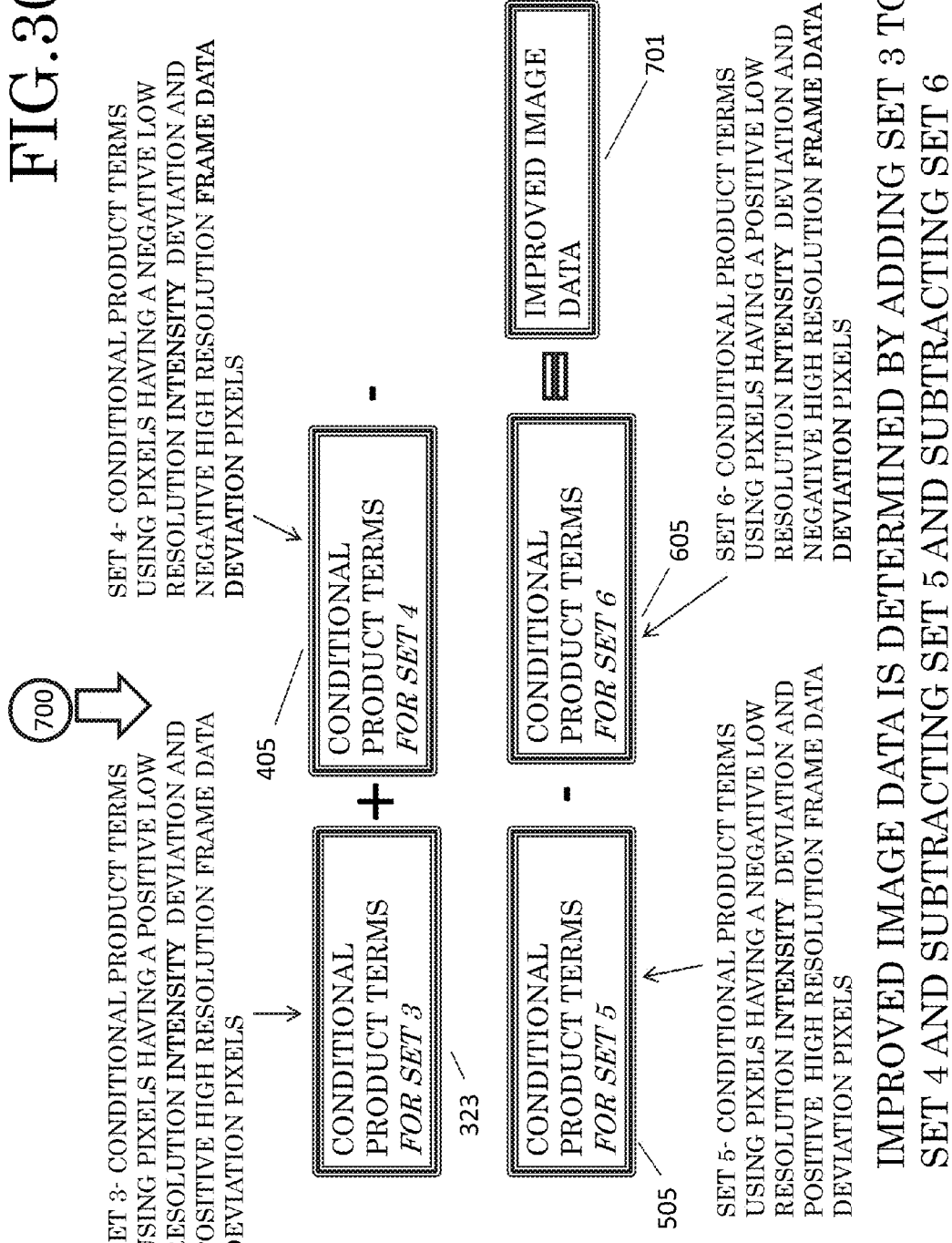

SYSTEM AND PROCESSOR IMPLEMENTED METHOD FOR IMPROVED IMAGE QUALITY AND ENHANCEMENT BASED ON QUANTUM PROPERTIES

CROSS REFERENCE TO RELATED APPLICATIONS

This application is a Continuation-In-Part application of application Ser. No. 13/477,890 (U.S. Pat. No. 8,811,768) entitled "Image Enhancement System and Method," by R. Meyers & K. Deacon, filed May 22, 2012, which is a continuation-in-part of application Ser. No. 13/247,470 (now U.S. Pat. No. 8,532,427) entitled "System and Method for Image Enhancement" by R. Meyers & K. Deacon, filed Sep. 28, 2011, and application Ser. No. 13/198,133 (now U.S. Pat. No. 8,373,107) entitled "Method and System for Non-line-of-sight Imaging" filed Aug. 4, 2011, which in turn claims priority of U.S. patent application Ser. No. 12/819,602 (now U.S. Pat. No. 8,242,428) entitled "Method and System for LIDAR Utilizing Quantum Properties," filed Jun. 21, 2010, which in turn claims priority of U.S. application Ser. No. 12/330,401 (now U.S. Pat. No. 7,812,303) entitled "Method and System for Creating an Image Using Quantum Properties of Light Based Upon Spatial Information From a Second Light Beam Which Does not Illuminate the Subject," filed Dec. 8, 2008, which claims priority to U.S. Provisional Patent Application Ser. No. 60/992,792 filed Dec. 6, 2007. The present application, through application Ser. No. 13/477,890 (U.S. Pat. No. 8,811,768), U.S. patent application Ser. No. 13/198,133 entitled "Method and System for Non-line-of-sight Imaging" and U.S. application Ser. No. 12/819,602, entitled "Method and System for LIDAR Utilizing Quantum Properties," filed Jun. 21, 2010, also claims priority of U.S. patent application Ser. No. 12/343,384 filed Dec. 23, 2008, entitled "Method and System for Quantum Imaging Using Entangled Photons Pairs," now U.S. Pat. No. 7,847,234, issued Dec. 7, 2010. The present application through application Ser. No. 13/477,890 (U.S. Pat. No. 8,811,768), and application Ser. No. 13/198,133 (now U.S. Pat. No. 8,373, 101) entitled "Method and System for Non-line-of-sight Imaging" claims the benefit of U.S. application Ser. No. 12/837,668 entitled "Method and System for Creating an Image Using the Quantum Properties of Sound or Quantum Particles, filed Jul. 16, 2010, now U.S. Pat. No. 8,053,715, which is a divisional application of U.S. Pat. No. 7,812,303. The present application also claims priority of U.S. patent application Ser. No. 14/303,078 titled "System and processor implemented method for improved image quality and generating an image of a target illuminated by quantum particles," by R. Meyers & K. Deacon, filed 12 Jun. 2014, U.S. patent application Ser. No. 14/086,463 titled "System and Processor Implemented Method for Improved Image Quality and Enhancement," by R. Meyers & K. Deacon, filed Nov. 21, 2013, U.S. patent application Ser. No. 14/022,148 titled "System and Method for Image Improved Image Enhancement," by R. Meyers & K. Deacon, filed Sep. 9, 2013, and U.S. patent application Ser. No. 13/838,249 (now U.S. Pat. No. 8,594,455 titled "System and Method for Image Enhancement and Improvement," by R. Meyers & K. Deacon, filed Mar. 15, 2013. All of the patent applications and patents mentioned in this paragraph are hereby incorporated by reference.

STATEMENT OF GOVERNMENT INTEREST

The embodiments herein may be manufactured, used, and/or licensed by or for the United States Government without the payment of royalties thereon.

BACKGROUND OF THE INVENTION

Image processing is a form of signal processing for which the input is an image, such as, for example, a photograph or video frame, and the output is either an image (or series of images) or a set of characteristics or parameters related to the image (or series of images). Forms of image processing include, for example, face detection, feature detection, medical image processing, computer vision (extraction of information from an image by a computer), microscope image processing, etc.

Image resolution relates to the detail that an image possesses. For satellite images, the resolution generally correlates to the area represented by each pixel. Generally speaking, an image is considered to be more accurate and detailed as the area represented by each pixel is decreased. As used herein, the term images include digital or analog images, film images, and/or other types of images. When an image is captured by a monochrome camera, a single charge-coupled device (CCD) or complementary metal-oxide semiconductor (CMOS) sensor is used to form an image via the light intensity projected onto the sensor. Cameras taking pictures from great distances, such as aerial photos, may not obtain detailed information about the subject matter. Also, the taking of photographs may be subject to motion of the camera and/or jitter. Consequently, subtle or detail information are not present in the images.

Quantum imaging is a relatively new science that is developing new technology such as Quantum Ghost Imaging (QGI) to exploit quantum optical information. The exploitation of quantum optical information leads to increased resolution over conventional classical optical imaging. Furthermore, quantum imaging is adaptable to adverse imaging situations and there is a benefit to exploiting quantum optical information to image objects through partially obscuring media, i.e., optical turbulence, obstructions, smoke, and fog. Imaging through obscuring media is difficult; such as the difficulty of driving in foggy weather.

Quantum entanglement is a quantum mechanical phenomenon in which the quantum states of two or more quantum particles are linked together such that the quantum state of one quantum particle appears to interact with its counterpart; even though the individual quantum particles may be spatially separated. This apparent interconnection leads to correlations between observable physical properties of remote systems, since the interaction of the remote system with quantum state of one of a pair can be observed though observation of the counterpart. For example, according to quantum mechanics, the spin of a quantum particle is indeterminate until such time as some physical intervention is made to measure the spin; which, in general, could equally be spin-up or spin-down. However, when two members of a spin entangled pair are measured, they will either be correlated or anti-correlated using spin measurements, regardless of the distance between the two particles. It is normally taught in quantum theory that no hidden variable theory can account for these results of quantum mechanics. The statistics of multiple measurements must generally relate to an inequality (called Bell's inequality), which is violated both by quantum mechanical theory and experimental results.

The non-classical two-photon interaction or quantum entanglement was described by Albert Einstein et al. (Einstein, Podolsky, Rosen (hereinafter Einstein, et al.) paradox), "Can Quantum-Mechanical Description of Physical Reality Be Considered Complete?" Physical Review, Volume 47, May 15, 1935, pgs. 777-800. The paradox of quantum entanglement, as described therein, relates to the concept that as a result of the process of measurement of a first system, using quantum mechanics, two different physical quantities are obtainable in the second system, despite the fact that at the time of the measurements, the two systems no longer interact and the second system is not disturbed in any way by the first. Einstein, et al, were unable to reconcile this quantum mechanical description of reality with the so-called classical physics determination that no "real" change can take place in the second system as a consequence of anything that may be done to the first system after the two systems no longer interact.

The theoretical work reported by Klyshko in "Combined EPR and Two-Slit Experiments: Interference of Advanced Waves", Physics Letters A, Volume 132, number 6, 7, pp. 299-304 (1988) (see also, Soy. Phys. Usp. 31, 74) suggested a non-classical two-photon interaction could exist.

The first two-photon imaging experiment was reported by Pittman et al., in "Optical Imaging by Means of Two-photon Quantum Entanglement," Physical Review, A, Vol. 52, No. 5, November 1995. According to the Pittman article, a two-photon optical imaging experiment was performed to test the two-particle entanglement as described by Albert Einstein et al., referenced above, to determine if there was a correlation in position and in momentum for an entangled two-photon system; using "test beam or path" and "reference beam or path" photon pairs. Specifically, an aperture placed in front of a fixed detector was illuminated by a signal beam through a convex lens. A sharp magnified image of the aperture was found in the coincidence counting rate when a mobile detector was scanned in the transverse plane of the reference beam at a specific distance in relation to the lens. The experiment was named "ghost imaging" due to its surprising nonlocal feature.

Additional experiments are reported in Pittman, et al. "Optical Imaging by Means of Two-Photon Entanglement," Phys. Rev. A, Rapid Comm., Vol. 52, R3429 (1995) and ghost interference by Strekalov, et al, "Observation of Two-Photon 'Ghost' Interference and Diffraction," Phys. Rev. Lett., Vol. 74, 3600 (1995), which together stimulated the foundation of quantum imaging in terms of multi-photon geometrical and physical optics.

The above publications are merely examples of the development and attempt to understand the science of quantum mechanics as it relates to photons. The present invention in effect uses similar principles and extensions thereof relating to quantum interactions.

SUMMARY OF THE INVENTION

The present invention is directed to a system for generating an image of a target utilizing entangled quantum particle pairs comprising:
 at least one processor;
 at least one source of entangled quantum particles configured to sequentially output pairs of entangled particles through first and second channels, the first channel being configured to output first pairs of entangled quantum particles, the second channel being configured to output second pairs of entangled quantum particles, the first and second pairs of entangled quantum particles being entangled;
 a first beam splitter operatively connected to the first channel of the at least one source of entangled quantum particles; the first beam splitter configured to split the first pairs of entangled particles for entry into first and second spatial detectors;
 at least one focusing device operatively connected to the second channel configured to direct the second pairs of entangled quantum particles towards a distant target;
 the first and second spatial detectors being operatively connected to the at least one processor; each of the first and second spatial detectors detecting one particle of the first pairs of entangled quantum particles; the at least one processor operating to record the detection of entangled quantum particles by the first and second spatial detectors and create image data representing the target;
 at least one display operatively connected to the at least one processor for displaying an image of the target.

Optionally, the system may further comprise:
 a receiver operatively connected to the at least one processor configured to receive second entangled quantum pairs reflected by the target;
 a second beam splitter operatively connected to the receiver, the second beam splitter having third and fourth outputs configured such that one particle from the second pairs of entangled particles are outputted from the third and fourth outputs;
 third and fourth spatial detectors operatively connected to the third and fourth outputs and the at least one processor; the third and fourth spatial detectors operating to detect entangled quantum particles reflected by the target, the at least one processor operating to record the detection of entangled quantum particles by the third and fourth detectors, perform timing measurements and create image data of the target for display on the at least one display.

Optionally, the second pairs are either reflected or absorbed by the target and the effect of the reflection or absorption is transferred to the corresponding first pairs of entangled quantum particles through the properties of quantum entanglement. Optionally, the focusing device and the receiver are telescopes, and the at least one processor is operatively connected to the at least one source of entangled quantum particles.

The present invention is also directed to a method for generating an image of a target utilizing entangled quantum particle pairs comprising:
 providing at least one source of entangled quantum particle pairs having first and channels; the at least one source of entangled quantum particle pairs outputting first and second pairs of entangled quantum particles, the first pairs of entangled quantum particles being entangled with the second pairs of entangled quantum particles;
 outputting first pairs of entangled quantum particles through the first channel and into a first beam splitter;
 outputting second pairs of entangled quantum particles through a second channel towards a target;
 utilizing the first beam splitter, splitting the first pairs of entangled quantum particle pairs such that the first particle of each pair enters into a first spatial detector and the second particle of each pair enters into a second spatial detector;
 detecting coincidences utilizing the first and second spatial detectors and at least one processor to create image data representing the target;
 displaying an image of the target utilizing the image data.

Optionally, the method further comprises the steps of:
 providing a receiver configured to receive second entangled quantum pairs reflected by the target operatively connected to the at least one processor;

providing a second beam splitter operatively connected to the receiver, the second beam splitter having third and fourth outputs configured such that one particle from the second pairs of entangled particles are outputted from the third and fourth outputs;

providing third and fourth spatial detectors operatively connected to the third and fourth outputs and the at least one processor;

detecting entangled quantum particles reflected by the target using the third and fourth spatial detectors, using the at least one processor, recording the detection of entangled quantum particles by the third and fourth detectors, performing coincidence measurements and creating image data of the target for display based upon the coincidence measurements.

Optionally, the second pairs of entangled quantum particles are either reflected or absorbed by the target and the effect of the reflection or absorption is transferred to the corresponding first pairs of entangled quantum particles through the properties of quantum entanglement. Optionally, the second pairs of entangled quantum particles are directed towards a target using a telescope, the receiver is a telescope, and the at least one processor is operatively connected to the at least one source of entangled quantum particles.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The present invention can be better understood when reading the following detailed description with reference to the accompanying drawings, which are incorporated in and form a part of the specification, illustrate alternate embodiments of the present invention, and together with the description, serve to explain the principles of the invention. In the drawings:

FIG. 1 is an illustration a flow chart of an exemplary image improvement.

FIG. 2 is a partial schematic block diagram illustration of the steps for performing a method of exemplary image improvement.

FIG. 7A is an illustration of an image constructed using a bucket that consisted of all of the pixels of a simulated low-resolution multiple photo-sensor bucket array as the bucket measurement.

FIG. 7B an illustration of an intermediate image constructed using a single bucket consisting of 2×2 pixels of a simulated low-resolution multiple photo-sensor bucket array.

FIG. 8A is an illustration of an intermediate image constructed using a single bucket consisting of 2×2 pixels of a simulated low-resolution multiple photo-sensor bucket array.

FIG. 8B is an illustration of a final composite image produced by the sum of all the intermediate images using a set of buckets consisting of 2×2 pixels of a simulated low-resolution multiple photo-sensor bucket array.

FIG. 9A is an illustration of an average image measured by a multiple photo-sensor bucket array.

FIG. 9B is an illustration of an average image measured by a low-resolution multiple photo-sensor bucket array simulated by 2×2 pixel spatial averaging.

FIG. 10A is an illustration of an intermediate image constructed using a single bucket consisting of 4×4 pixels of a simulated low-resolution multiple photo-sensor bucket array.

FIG. 10B is an illustration of an intermediate image constructed using a single bucket consisting of 4×4 pixels of a simulated low-resolution multiple photo-sensor bucket array.

FIG. 11A is an illustration of an average image measured by a low-resolution multiple photo-sensor bucket array simulated by 4×4 pixel spatial averaging.

FIG. 11B is an illustration of a final composite image produced by the sum of all the intermediate images using a set of buckets consisting of 4×4 pixels of a simulated low-resolution multiple photo-sensor bucket array.

FIG. 12A is an illustration of an intermediate image constructed using a single bucket consisting of 8×8 pixels of a simulated low-resolution multiple photo-sensor bucket array.

FIG. 12B is an illustration of an intermediate image constructed using a single bucket consisting of 8×8 pixels of a simulated low-resolution multiple photo-sensor bucket array.

FIG. 13A is an illustration of an average image measured by a low-resolution multiple photo-sensor bucket array simulated by 8×8 pixel spatial averaging.

FIG. 13B is an illustration of a final composite image produced by the sum of all the intermediate images using a set of buckets consisting of 8×8 pixels of a simulated low-resolution multiple photo-sensor bucket array.

FIG. 14A is an illustration of an intermediate image constructed using a single bucket consisting of 8×8 with overlap of 4 pixels of a simulated low-resolution multiple photo-sensor bucket array.

FIG. 14B is an illustration of an intermediate image constructed using a single bucket consisting of 8×8 with overlap of 4 pixels of a simulated low-resolution multiple photo-sensor bucket array.

FIG. 15A is an illustration of an average image measured by a low-resolution multiple photo-sensor bucket array simulated by 8×8 with overlap of 4 pixel spatial averaging.

FIG. 15B is an illustration of a final composite image produced by the sum of all the intermediate images using a set of buckets consisting of 8×8 overlap of 4 pixels of a simulated low-resolution multiple photo-sensor bucket array.

FIG. 16A is an illustration of a final composite image produced by the sum of all the intermediate images using a set of buckets simulating a low resolution multiple photo-sensor bucket array that consisted of 1 randomly spatially located pixel for 1400 shots.

FIG. 16B is an illustration of a final composite image produced by the sum of all the intermediate images using a set of buckets simulating a low resolution multiple photo-sensor bucket array that consisted of 2 randomly spatially located pixels for 1400 shots.

FIG. 17A is an illustration of a final composite image produced by the sum of all the intermediate images using a set of buckets simulating a low resolution multiple photo-sensor bucket array that consisted of 2 randomly spatially located pixels for 500 shots.

FIG. 17B is an illustration of a final composite image produced by the sum of all the intermediate images using a set of buckets simulating a low resolution multiple photo-sensor bucket array that consisted of 1000 randomly spatially located pixels for 10 shots.

FIG. 18A is an illustration of a final composite image produced by the sum of all the intermediate images using a set of buckets simulating a low resolution multiple photo-sensor bucket array that consisted of 20 randomly spatially located pixels for 150 shots.

FIG. 18B is an illustration of a final composite image produced by the sum of all the intermediate images using a set of buckets simulating a low resolution multiple photo-sensor bucket array that consisted of 100 randomly spatially located pixels for 150 shots.

FIG. 19A is an illustration of the final composite image produced by the sum of all the intermediate images using a set of buckets simulating a low resolution multiple photo-sensor bucket array that consisted of 10 randomly spatially located pixels for 150 shots.

FIG. 19B is an illustration of the final composite image produced by the sum of all the intermediate images using a set of buckets simulating a low resolution multiple photo-sensor bucket array that consisted of 1000 randomly spatially located pixels for 150 shots.

FIGS. 20-31 are schematic block diagram illustrations of the steps to compute the fluctuation, or deviation from the mean value of the series of low resolution measurements. On the figures "positive" refers to deviations that are above the mean and "negative" refers to deviations that are below the mean.

FIG. 20 is schematic block diagram illustration of the steps to compute the fluctuation, or deviation from the mean value of the series of the low resolution measurements.

FIG. 21 is schematic block diagram illustration of the steps to compute the fluctuation, or deviation from the mean value of the series of the high resolution measurements.

FIG. 22 is a partial schematic block diagram illustration which shows how to generate a third set of data which is referred to here at SET 3. The illustrated steps are performed on the above mean, above mean sets of frames.

FIG. 23 is a partial schematic block diagram illustration that is a continuation of FIG. 22.

FIG. 24 is a partial schematic block diagram illustration showing how to generate a fourth set of data which is referred to here at SET 4. The illustrated steps are performed on the below mean, below mean sets of frames.

FIG. 25 is a partial schematic block diagram illustration that is a continuation of FIG. 24.

FIG. 26 is a partial schematic block diagram illustration of the steps how to generate a fifth set of data which is referred to here at SET 5. The illustrated steps are performed on the above mean, below mean sets of frames.

FIG. 27 is a continuation of the schematic block diagram illustration of FIG. 26.

FIG. 28 is a partial schematic block diagram illustration showing how to generate a sixth set of data which is referred to here at SET 6. The steps are performed on the below mean, above mean sets of frames.

FIG. 29 is a continuation of the schematic block diagram illustration of FIG. 28.

FIG. 30 is a partial schematic block diagram illustration of the steps for performing an alternate preferred method in which the improved final image is determined by adding the above-mean, above mean image to the below-mean, below-mean images, subtracting the above-mean, below-mean image, and subtracting the below-mean, above mean image.

FIG. 31 is a partial schematic block diagram illustration of the steps for performing an alternate method in which the improved final image is determined by adding the above-mean, above mean image, the below-mean, below-mean image, the above-mean, below-mean image, and the below-mean, above mean image.

Figure 3:
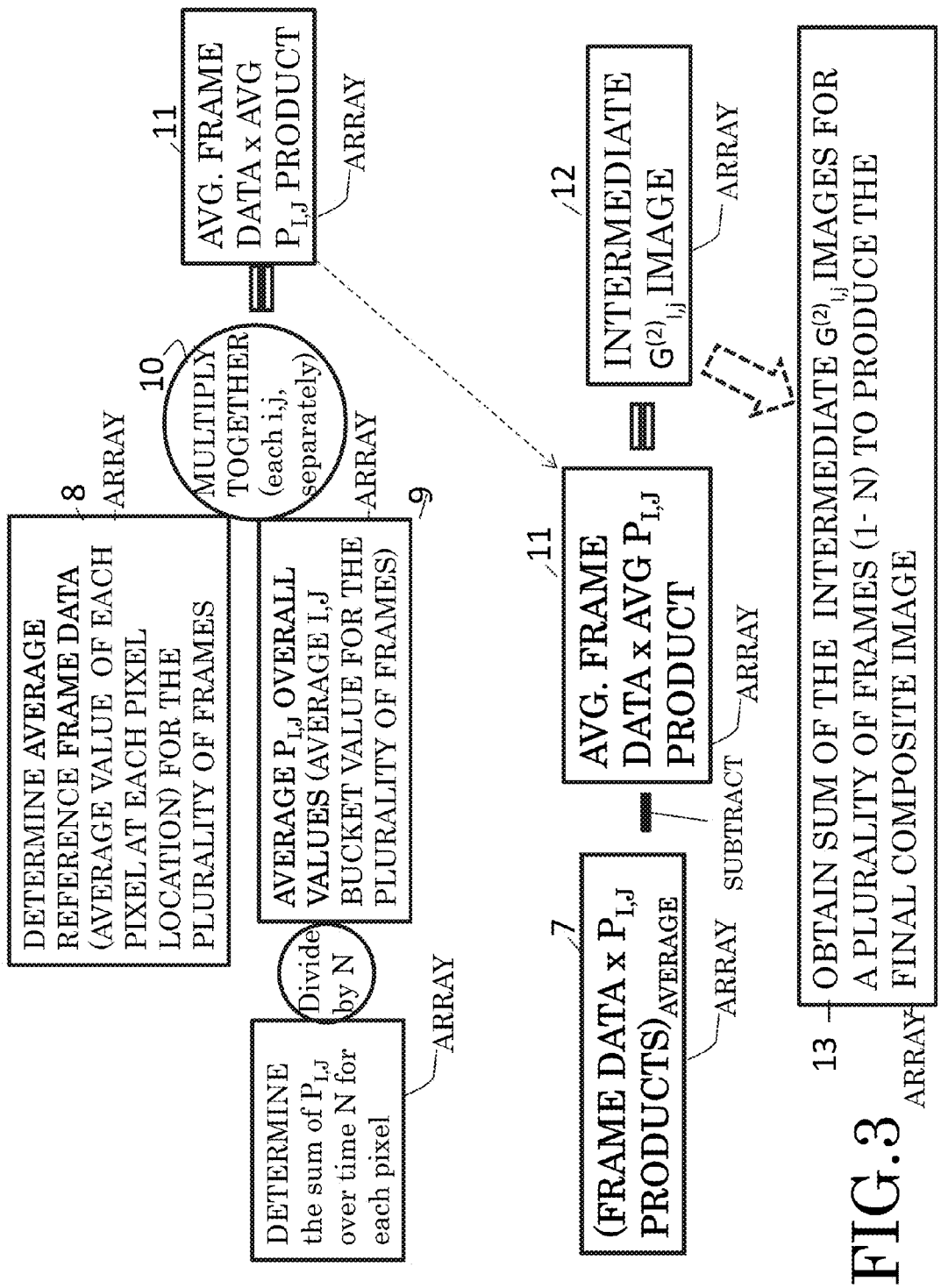
FIG. 3 is a partial schematic block diagram illustration of the steps for performing image improvement. Taken together, FIGS. 1, 2, and 3 outline steps for image improvement.

A more complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios. Proportional relationships are shown as approximates.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. For example, when referring first and second photons in a photon pair, these terms are only used to distinguish one element, component, region, layer or section from another region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Furthermore, the term "outer" may be used to refer to a surface and/or layer that is farthest away from a substrate.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will also be appreciated by those of skill in the art that references to a structure or feature that is disposed "adjacent" another feature may have portions that overlap or underlie the adjacent feature.

Illustrated in FIG. 1 is a methodology for resolution improvement performed by the at least one processor comprises the following steps not necessarily in the order recited:

A. Collect a set of N high resolution measurements of the illuminating source I(t) and low resolution measurements of the target object P(t).

B. Compute for each pixel or grouping of pixels in the low resolution set of measurements the product of the low resolution pixel with the measured illumination pixels $I(t)*P_{i,j}(t)$ individually for each i,j.

C. Obtain a sum of the $I(t)*P_{i,j}(t)$ individually for each i,j over the ensemble of measurements.

D. Divide the set of summed products by the number of measurements N to obtain $<I(t)*P_{i,j}(t)>$ where $< >$ denotes the average over the ensemble of measurements.

E. Compute a sum of the ensemble of I(t) measurements and divide by the number of measurements N to obtain $<I(t)>$.

F. Compute for each low resolution pixel the sum of $P_{i,j}$ over the ensemble of measurements N and divide by N to obtain $<P_{i,j}>$.

G. Compute an intermediate $G^{(2)}$ image for each i,j low resolution measurement using the following equation $G_{i,j}^{(2)} = <I*P_{i,j}> - <I> <P_{i,j}>$.

H. Sum the intermediate $G_{i,j}^{(2)}$ images into the final composite $G^{(2)}$ image of the target object, $Image_{final} = \Sigma G_{i,j}^{(2)}$ Note that the steps in FIG. 1 are comparable to the numbered boxes in FIGS. 2 and 3, as denoted by the reference to "Box_" correlating to the Box number of FIGS. 2 and 3.

Referring now to FIG. 2 in Box 1 a series or collection of high resolution measurements (or frames) of the illuminating light source (which may be, for example, the sun) are inputted into the memory or input of a processor or image processor. As used herein the terminology "processor" or "image processor" as used in the following claims includes a computer, multiprocessor, CPU, minicomputer, microprocessor or any machine similar to a computer or processor which is capable of processing algorithms.

In Box 2, using the input from Box 1, the frame data or value of each pixel at each pixel location is determined for each frame. In Box 3, the pixel values in the low resolution set of measurements $P_{i,j}$ is determined. The low resolution frames may comprise photographs of the same region of interest. The region of interest may be a scene, landscape, an object, a subject, person, or thing. Where the low resolution source is a low resolution camera, the value of a pixel correlates to a "bucket value" determination and correlates to the light intensity measured by the detector. In the case of an electronic display formed by pixels, the intensity of each pixel value at each pixel location $P_{i,j}$ is determined. At Box 4, the values in Box 2 are multiplied by the values determined in Box 3. Box 5 represents the Frame Data×$P_{i,j}$ Product. Inasmuch as the Boxes 2 and 3 are arrays of pixel values, the Box 5 Product is also an array of values. At Box 6, the products of Box 5 are repeatedly calculated for each frame in a selected plurality of frames and summed together. As an example, one hundred frames may be selected. At Box 7, the summation Box 6 (Products for the determined in Box 6) is divided by the number of frames (such as for example one hundred) to determine the Frame Data×$P_{ij}$ Products Average for the plurality of frames. The Product Average in Box 7 is an array containing pixel values at each pixel location within the frame.

FIG. 3 is a continuation of FIG. 2. Note that Box 7 is carried over from FIG. 2 into FIG. 3. In Box 8, the average frame data (or average value of each pixel at each pixel location) is determined for the plurality of frames (e.g. 100) by averaging the pixel values at each pixel location for the plurality of frames to determine an array of average pixel values. In Box 9A the sum of $P_{ij}$ over time N for each pixel is determined. $P_{ij}$ represents the pixel location within each frame of the low resolution images (or bucket detector values). Prior to Box 9B, the result of Box 9A is divided by N. In Box 9B, the average $P_{ij}$ for the plurality of low resolution frames is determined. This correlates to the average of the light intensity of each pixel at each pixel location $P_{ij}$ in the set of frames N. In the case of a picture, the correlates to the reflected illumination at each pixel location $P_{ij}$. In the case of an electronic display formed by pixels, the average pixel intensity or pixel value at each pixel location is determined.

Box 10 represents the multiplication of Boxes 8 and 9A to form the Average Frame Data×Average $P_{ij}$ Product (Box 11), which is an array. As shown in the bottom portion of FIG. 3, the Average Frame Data×Average $P_{ij}$ Product is subtracted from the Frame Data×$P_{ij}$ Products Average to form the intermediate $G^{(2)}$ij Image of Box 12. In Box 13 the sum of the intermediate $G^{(2)}$ij Images for the frames 1–N is calculated to produce the final composite image.

In accordance with the method described, multiple photo-sensor buckets scanned or in an array and high resolution images of the illuminating light source. Depending on the object and the light source that it is scattering and reflecting it is possible that light is scattering or reflecting from any location on the subject such that any or all of the photo-sensors in the array has a probability of measuring one or more photons of light. A low resolution camera can be used as the multiple photo-sensor bucket array. A higher resolution $G^{(2)}$ image of the target can be produced using high-resolution images of the illumination source coupled with information from the multiple photo-sensor bucket array. Use of the multiple photo-sensor bucket array can improve the convergence rate of the high resolution $G^{(2)}$ image. Each photo-sensor in the multiple photo-sensor bucket array may measure light scattered and reflected from distinct portions of the target object with appropriate optics that images the subject onto the multiple photo-sensor bucket array.

A concept is that if the nonspatial information resolving single-pixel "bucket" detector that measures light from the target object that is typically used for $G^{(2)}$ imaging was replaced with a low resolution spatial information resolving device such as a Charge Coupled Device (CCD) camera and the detector that measures the light from the source of illumination is a high resolution spatial information resolving device, i.e., a high resolution CCD, then one could use the techniques of $G^{(2)}$ imaging to generate an image that would be at the resolution and quality of the high-resolution device using the extra information measured by the low-resolution target object detector. This may be accomplished by treating each nonspatial information resolving pixel of the low-resolution detector as a separate "bucket" measurement to create a $G^{(2)}$ image. The generation of $G^{(2)}$ images is performed over the entire set of pixels of the low resolution camera and each low-resolution $G^{(2)}$ image is accumulated into a composite $G^{(2)}$ image that provides the final result. It should be noted that prior to generating a low-resolution pixel $G^{(2)}$ image, the low-resolution pixel value can be tested to determine by some metric if a $G^{(2)}$ image should be computed using that low-resolution pixel, i.e., an option includes not computing a $G^{(2)}$ image if all the values at that low resolution pixel are 0 or below some threshold value.

A single bucket detector may be used to scan over different areas of a target. At each step of the scan a $G^{(2)}$ image would be computed and accumulated into a composite $G^{(2)}$ image for all positions that the detector scanned.

A third embodiment utilizes the concept occurring when a set of random or pseudo-random pixels of the multiple photo-sensor bucket array measure light from the target subject. This random set of pixels may be different from one measurement time to another measurement time and these sets of random bucket pixels are used to compute sets of $G^{(2)}$ images that are accumulated into a higher resolution and higher quality composite $G^{(2)}$ image.

It should be noted that the calculation of the $G^{(2)}$ image may be accomplished by using optimization methods such as Compressive Sensing techniques.

Figure 4:
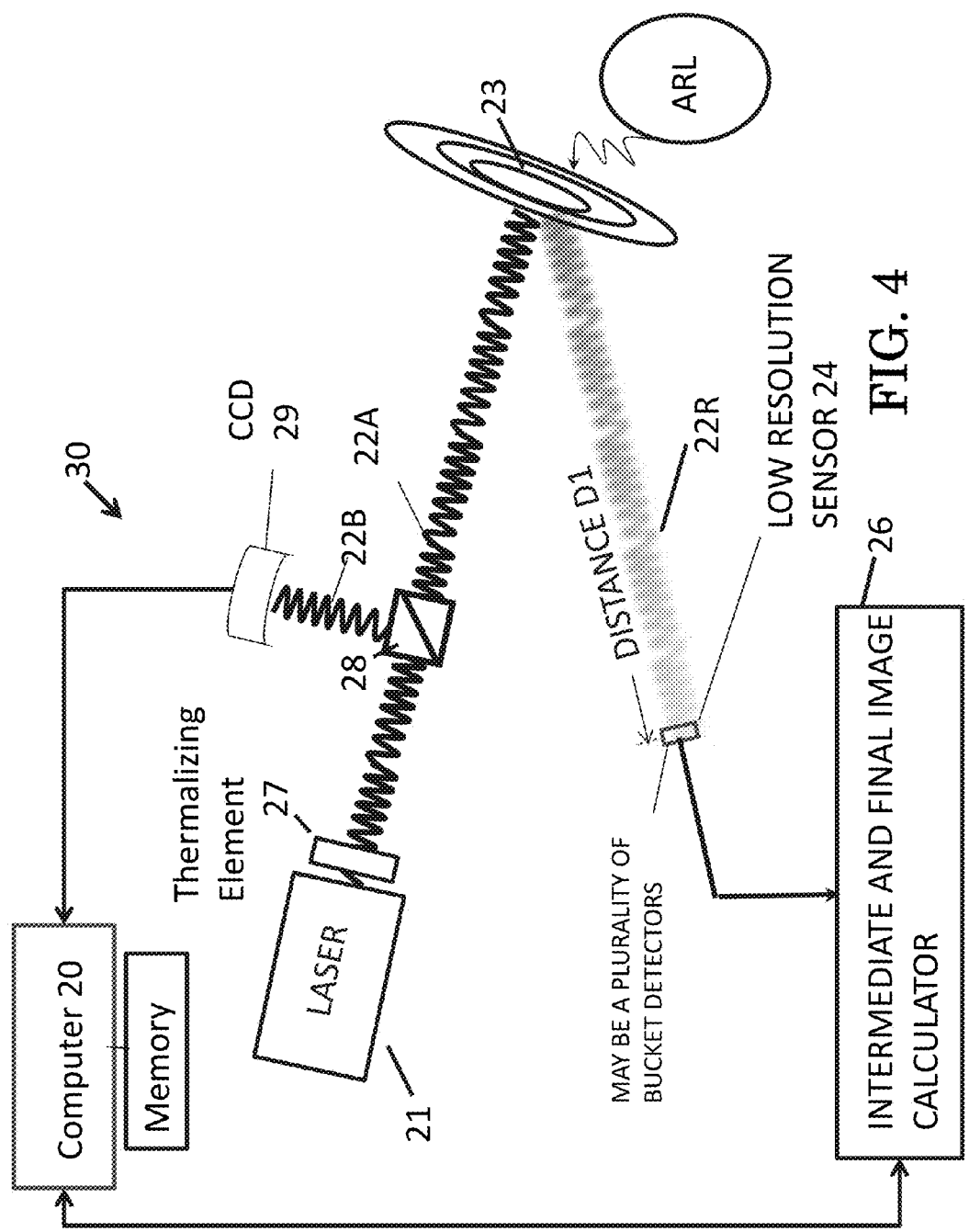
FIG. 4 is schematic system block diagram of a embodiment utilizing the principles of quantum entanglement in conjunction with the detection of a target comprising, inter alia, a thermalizing element 17.

FIG. 4 is an illustration of a system using entangled photon pairs in which a first part of entangled pair is sent towards a target 23 while a second part is sent along a reference path 22B. If the first part of the entangled photon pair is absorbed or reflected by the target, it will affect a property (e.g., spin, polarization, transverse momentum, angular momentum, color) of the photon. The influence by the target is also reflected in the reference photons. In FIG. 4 incoherent, partially coherent, chaotic or entangled light source is reflected from a subject target into a bucket detector which does not process spatial information and in effect, merely measures the "quantity" of light reflected from the subject into a plurality of bucket detectors 24. A detector (CCD) 29 is a spatial detector illuminated by the light source. Using spatial information from the second detector in conjunction with the light measurement from the first detector, an image is generated using coincidence circuitry.

Figure 5:
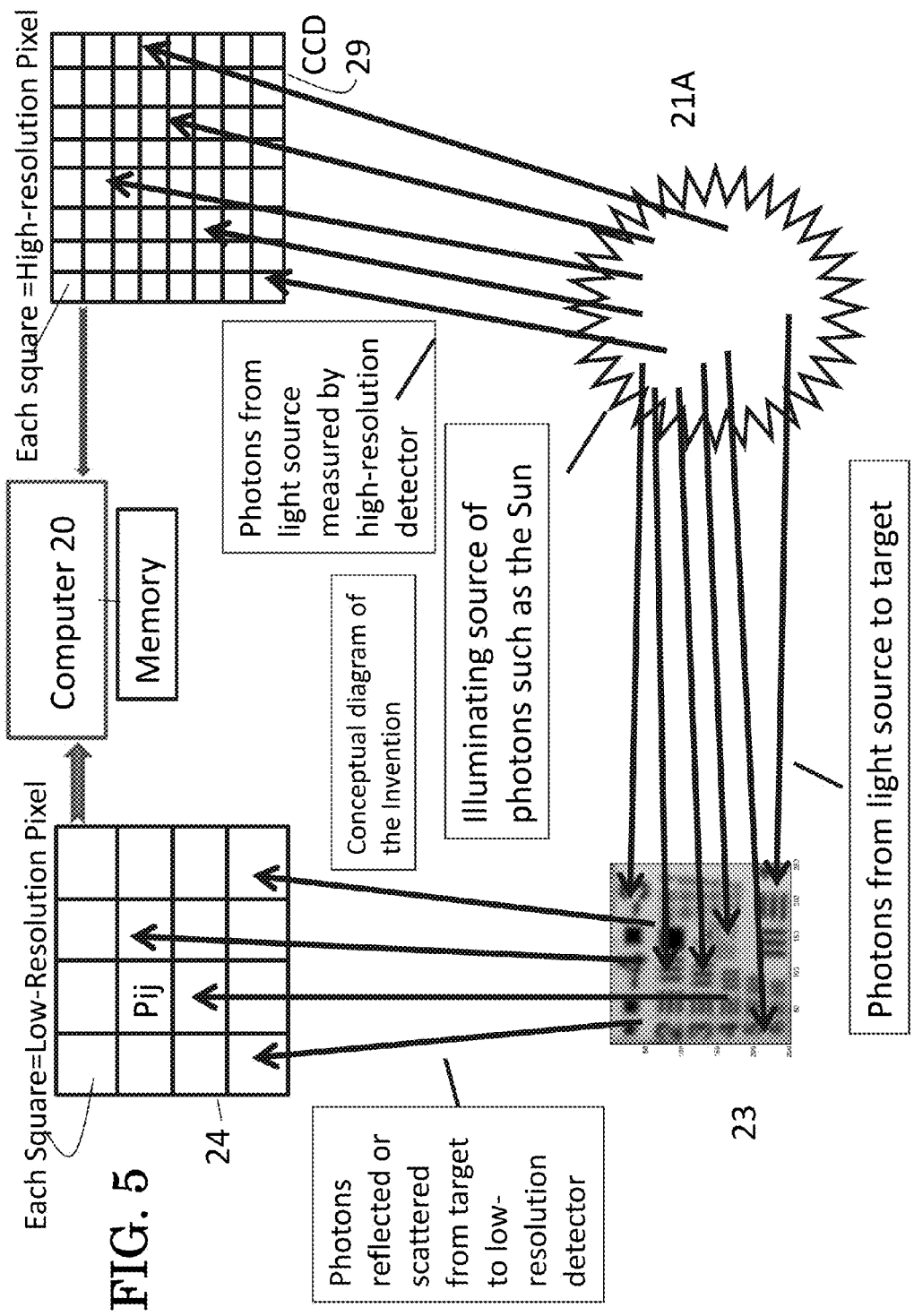
FIG. 5 is a conceptual diagram of an embodiment utilizing the principles of quantum entanglement, such as for example, that shown in FIG. 4.

Shown in FIG. 4 is a laser 21 that sends light through a thermalizing element 27 which creates a light pattern. A beam splitter 28 is used to split the beam from the laser 21 into a target path 22A and a reference path 22B. The pattern of the beam is recorded by a charge coupled device (CCD) 29 or the like which records spatial information concerning the light pattern as discussed more fully in U.S. application Ser. No. 12/330,401, hereby incorporated by reference. In its simplest terms, a charge coupled device (CCD) is a device for the movement of electrical charge from the detector area (29) to an area where the charge can be manipulated, for example conversion into a digital value. CCDs may be implemented as shift registers that move charge between capacitive bins in the device. The CCD device may be made up of semiconductors arranged in such a way that the electric charge output of one semiconductor charges an adjacent one. The CCD device may be integrated with an image sensor, such as a photoelectric device to produce the charge that is being read for digital imaging. The CCD device 29 may optionally be a camera, photodetector array or a photographic device capable of imaging the beam pattern 22B. The beam pattern comprising the spatial information concerning the light beam 22B is sent to computer 20. Light Beam 22A is directed to the target 23 and the returned and scattered light is collected by a first detector or sensor 24. Detector 24 may be a plurality of bucket detectors, or any kind of detectors which have the capability of detecting a photon strike. Detectors 24 may be of a large variety of photo detectors well known to those of ordinary skill in the art. A feature of the embodiments of FIGS. 4 and 5 is that the detectors 24, individually, need not record spatial information regarding the target 23. However, cumulatively, spatial information is derived; although at low resolution. The spatial information derived by spatial detector 29 is transmitted to the computer 20 which combines and correlates this spatial information with the coincidence data received from detectors 24. For example, the data recorded by detectors 24 may be transmitted to computer 20 in a form resembling that depicted in FIG. 5, for example, where roughly 16 "bucket" measurements are represented.

The spatial information from detector 29 is combined with the coincidence information from the detectors 24 in computer 20. Computer 20 may be a microprocessor, processor, multiprocessor, CPU, mainframe, or any computing element capable of combining the spatial information from the detector 29 with the coincidence information from detectors 24. Further description of the coincidence detection feature is found in U.S. Pat. Nos. 7,536,012 and 7,812,303, both of which are hereby incorporated by reference. Since the photonic information detected by each particular detector 24 need not encompass spatial information, but simply indicate the occurrence of a photon returned from the target 23, this capability facilitates the use of the embodiment systems in environments in which the returned photons may be impacted by environmental conditions such as fog, smoke, atmospheric particles and the like.

A quantum photon mathematical equation will project the reference light intensity from the CCD 29. This will be combined with "bucket" photon information (such as that exemplified in FIGS. 4 and 5) for an ensemble of pulses to produce coincidence measurements needed for "ghost" imaging. The terminology "ghost" relates to the feature that the spatial information is not reflected from the target but is either derived from the modulation of the laser beam (not shown) or the spatial information obtained through the use of beam splitter 28 and detector 29 which records spatial information from a beam which has not "seen" or illuminated the target.

FIG. 5 is a conceptual diagram showing a light source 21A which may be the sun (or a laser 21 as shown in FIG. 4) that illuminates both the target 23 (which may be for example, the standard Air Force USAF resolution test chart). Light is reflected from the target into an array of "bucket" detectors as represented by an a 4×4 array 24 in FIG. 5. Photons from the light source 21A are also measured by CCD 29, in a manner as described in connection with FIG. 4. The high resolution array is represented by an 8 by 8 array, although any of a plurality of high resolution arrays may be used, such as in the form of a high resolution camera or the like. Note that light rays or photons reflected from the target 23 do not enter CCD 29. CCD 29 derives spatial information from the light sources 21A as opposed to target 23.

Figure 6:
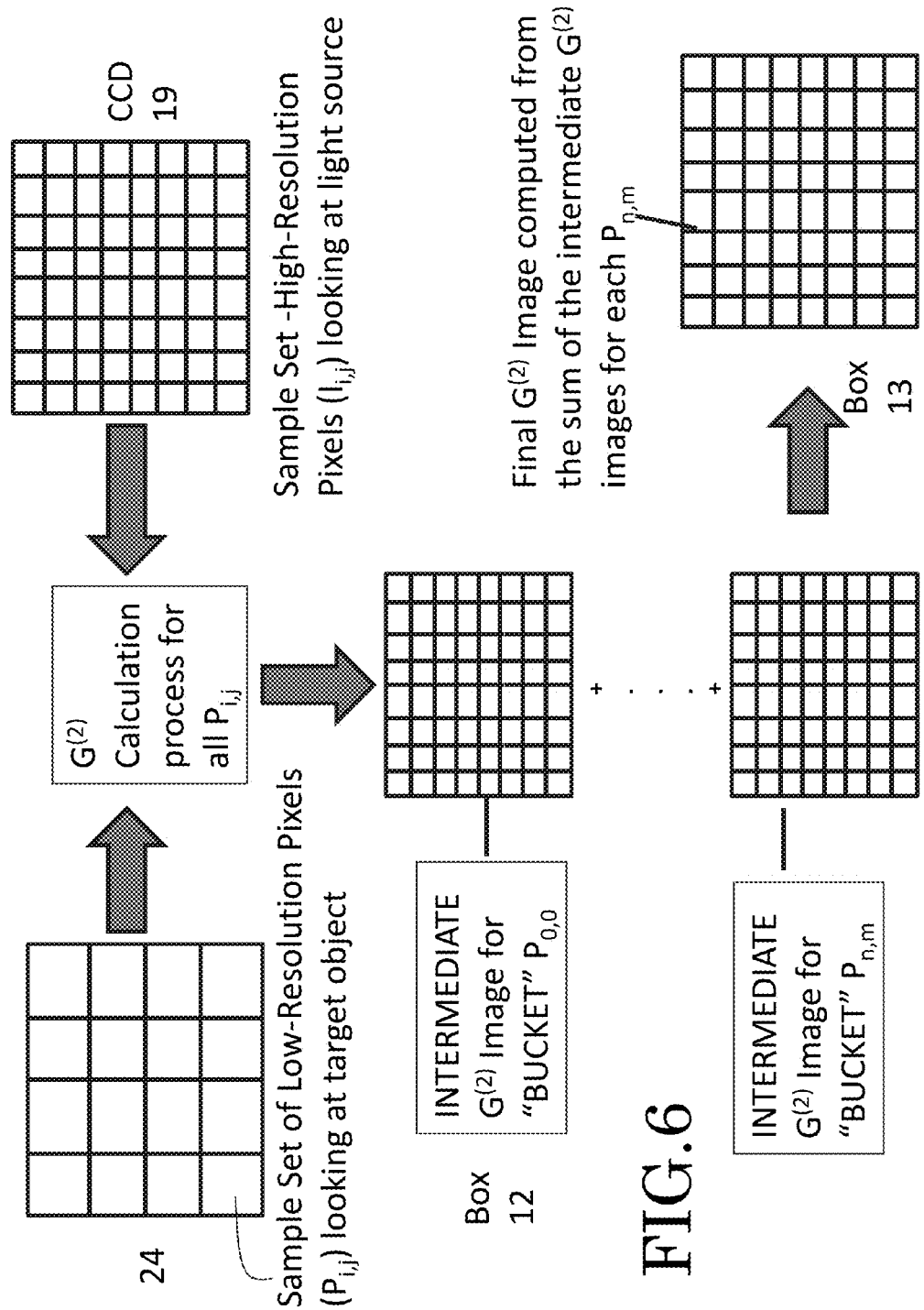
FIG. 6 is a conceptual diagram of an embodiment utilizing the principles of quantum entanglement, showing, inter alia, the summation of intermediate $G^{(2)}$ images.

FIG. 6 is a further conceptual diagram of a further example. Represented in FIG. 6 are the high resolution CCD 29 and the low resolution source 24. The low resolution source may be any source of low resolution pixels. For example, it could be an analog photograph with reflected light correlating to the pixel values. In FIG. 6, the intermediate $G^{(2)}$ images as represented by Box 12 in FIG. 3, are summed together to form the Final $G^{(2)}$ images (designated as Box 13). Optionally, the intermediate $G^{(2)}$ images may be weighted such that different values are assigned to different intermediate images. For this reason the image could be optimized, for example, for transmission or specific feature extraction. For example, if the background surrounding an object is of more importance than the object, this information would be weighted accordingly.

By way of example, FIG. 7A correlates to the image as produced using the methodology described in FIG. 5A of U.S. Pat. No. 7,812,303 and FIG. 7B correlates to an image produced through to the processing stage as depicted at Box 12 of FIG. 3.

As further examples of image processing, FIG. 8A is an image produced as represented at Box 12 and FIG. 8B correlates to the image produced when the process reaches Box 13.

As further examples of image processing, FIG. 9B is a low resolution image correlating to Box 9 of FIG. 3 where blocks of 2×2 pixels are processed together. FIG. 9A is 1 by 1 a spatially averaged set of pixels of the target subject which correlates to an equivalent high resolution image.

FIGS. 10A and 10B correlate to the image produced at the processing stage represented by Box 12 of FIG. 3. FIG. 10A is an illustration of an intermediate image constructed using a single bucket consisting of 4×4 pixels of a simulated low-resolution multiple photo-sensor bucket array. FIG. 10B is an illustration of an intermediate image constructed using a single bucket consisting of 4×4 pixels of a simulated low-resolution multiple photo-sensor bucket array.

FIGS. 11A and 11B correlate to the images produced at the processing stages represented by Box 9 and Box 13 of FIG. 3, respectively. FIG. 11A is an illustration of an average image measured by a low-resolution multiple photo-sensor bucket array simulated by 4×4 pixel spatial averaging. FIG. 11B is an illustration of a final composite image produced by the sum of all the intermediate images using a set of buckets consisting of 4×4 pixels of a simulated low-resolution multiple photo-sensor bucket array.

FIGS. 12A and 12B correlate to the images produced at the processing stages represented by Box 12 of FIG. 3. FIG. 12A is an illustration of an intermediate image constructed using a single bucket consisting of 8×8 pixels of a simulated low-resolution multiple photo-sensor bucket array. FIG. 12B is an illustration of an intermediate image constructed using a single bucket consisting of 8×8 pixels of a simulated low-resolution multiple photo-sensor bucket array.

FIGS. 13A and 13B correlate to the images produced at the processing stages represented by Box 9 and Box 13 of FIG. 3, respectively. FIG. 13A is an illustration of an average image measured by a low-resolution multiple photo-sensor bucket array simulated by 8×8 pixel spatial averaging. FIG. 13B is an illustration of a final composite image produced by the sum of all the intermediate images using a set of buckets consisting of 8×8 pixels of a simulated low-resolution multiple photo-sensor bucket array.

FIGS. 14A and 14B correlate to the images produced at the processing stages represented by Box 12 of FIG. 3. FIG. 14A is an illustration of an intermediate image constructed using a single bucket consisting of 8×8 with overlap of 4 pixels of a simulated low-resolution multiple photo-sensor bucket array. FIG. 14B is an illustration of an intermediate image constructed using a single bucket consisting of 8×8 with overlap of 4 pixels of a simulated low-resolution multiple photo-sensor bucket array.

FIGS. 15A and 15B correlate to the images produced at the processing stages represented by Box 9 and Box 13 of FIG. 3, respectively. FIG. 15A is an illustration of an average image measured by a low-resolution multiple photo-sensor bucket array simulated by 8×8 with overlap of 4 pixel spatial averaging. FIG. 15B is an illustration of a final composite image produced by the sum of all the intermediate images using a set of buckets consisting of 8×8 overlap of 4 pixels of a simulated low-resolution multiple photo-sensor bucket array.

FIGS. 16A and 16B correlate to the images produced at the processing stages represented by Box 13 of FIG. 3. FIG. 16A is an illustration of a final composite image produced by the sum of all the intermediate images using a set of buckets simulating a low resolution multiple photo-sensor bucket array that consisted of 1 randomly spatially located pixel for 1400 shots. FIG. 16B is an illustration of a final composite image produced by the sum of all the intermediate images using a set of buckets simulating a low resolution multiple photo-sensor bucket array that consisted of 2 randomly spatially located pixels for 1400 shots.

FIGS. 17 through 19 correlate to the images produced at the processing stages represented by Box 13 of FIG. 3.

FIG. 17A is an illustration of a final composite image produced by the sum of all the intermediate images using a set of buckets simulating a low resolution multiple photo-sensor bucket array that consisted of 2 randomly spatially located pixels for 500 shots.

FIG. 17B is an illustration of a final composite image produced by the sum of all the intermediate images using a set of buckets simulating a low resolution multiple photo-sensor bucket array that consisted of 1000 randomly spatially located pixels for 10 shots.

FIG. 18A is an illustration of a final composite image produced by the sum of all the intermediate images using a set of buckets simulating a low resolution multiple photo-sensor bucket array that consisted of 20 randomly spatially located pixels for 150 shots.

FIG. 18B is an illustration of a final composite image produced by the sum of all the intermediate images using a set of buckets simulating a low resolution multiple photo-sensor bucket array that consisted of 100 randomly spatially located pixels for 150 shots.

FIG. 19A is an illustration of the final composite image produced by the sum of all the intermediate images using a set of buckets simulating a low resolution multiple photo-sensor bucket array that consisted of 10 randomly spatially located pixels for 150 shots.

Figure 20:
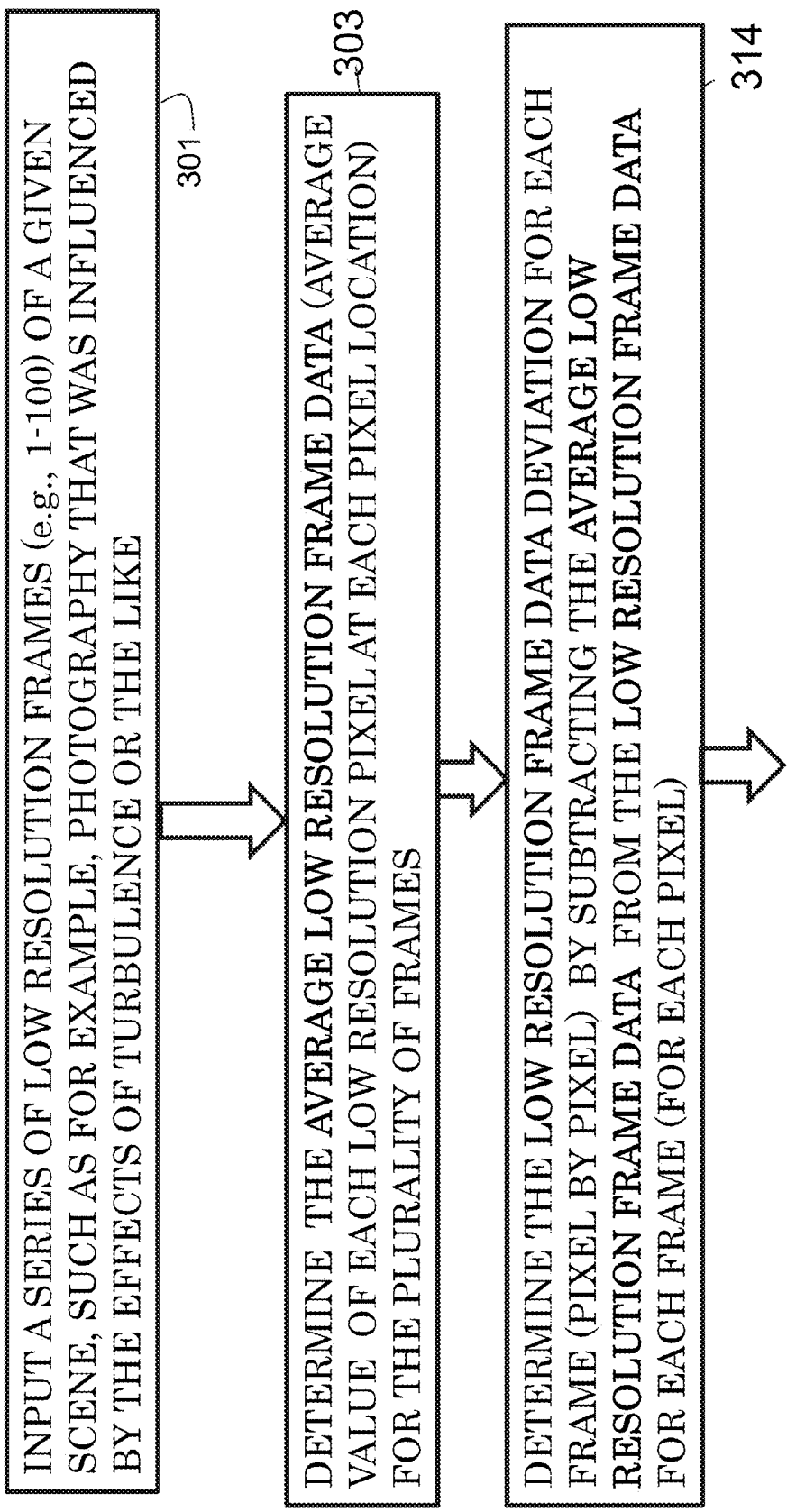

FIG. 19B is an illustration of the final composite image produced by the sum of all the intermediate images using a set of buckets simulating a low resolution multiple photo-sensor bucket array that consisted of 1000 randomly spatially located pixels for 150 shots. In FIG. 20, Box 301, a series of low resolution frames are entered into the memory or input of a processor or image processor. Throughout FIGS. 20-31, the frames referenced as "low resolution" frame data may comprise, for example, photographs, CCD images, and/or electronic camera images of the same region of interest. The term "low resolution" is used to differentiate the image outputted from a high megapixel camera; but may apply to a zoom feature using a high resolution image where fewer pixels are used to represent an object in the image. Resolution is a term used to describe the number of pixels used to display an image or object. For higher resolution, more pixels are used to create the image, resulting in a crisper, clearer image.

The region of interest may be a scene, landscape, an object, a subject, person, or thing. In Box 303, the low resolution Average Frame Data is determined by computing the average value of each pixel at each pixel location for the plurality of frames. In Box 314 the low resolution Deviation Frame Data is determined by subtracting the low resolution Average Frame Data from the low resolution Frame Data for all pixels in each frame for the plurality of frames.

The method proceeds to FIG. 21. On a quantum level, to get the improved image, the issue is what high resolution light measured from the illuminating source contributed to the low resolution light measured from the target in a quantative manner. In Box 315, a series of high resolution frames are entered into the memory or input of a processor or image processor. The frames may comprise photographs of the illuminating source of the region of interest. For example, in a surveillance application, the central station may measure high resolution measurements of the sun, while many low resolution images are taken by distributed cameras in distant areas. Combining the low resolution image data in accordance with the procedures detailed herein results in a higher resolution image from each low resolution camera. The region of interest may be a scene, landscape, an object, a subject, person, or thing. In Box 316 the high resolution Average Frame Data is determined by computing the average value of each pixel at each pixel location for the plurality of frames of the source of illumination. In Box 317 the high resolution Deviation Frame Data is determined by subtracting the high resolution Average Frame Data from the high resolution frame data for all pixels (i.e., value of each pixel) in each frame for the plurality of frames.

The method proceeds to FIG. 22 which shows how to generate a third set of data which is referred to here at SET 3. SET 3 data includes conditional product terms using low resolution pixels having a positive intensity deviation and high resolution positive deviation frame data pixels. SET 3 may be determined as follows: In Box 318 low resolution pixels with a Positive Intensity Deviation multiply the high resolution Positive Frame Data Deviation pixels within that set of frames. Positive intensity deviation is defined occurring when the deviation is greater than zero at the pixel location. In Box 319, for each pixel location, the processor calculates (a) the square of the low resolution Positive Intensity Deviation, (b) the product of the low resolution Positive Intensity Deviation×the high resolution Positive Deviation Frame Data pixels, (c) the square of the low resolution Positive Deviation Frame Data pixels are recorded and accumulated and (d) the square of the high resolution Positive Deviation Frame Data pixels are recorded and accumulated. In part (a) each time a pixel position is used, it is recorded and accumulated. The number of times the pixel is used is recorded, which will be used to compute the averages. As an example of the square of the low resolution Positive Intensity Deviation, if the low resolution pixel value is 8, the average pixel value is 6, the square of the low resolution pixel positive intensity deviation is 2×2 or 4. If the high resolution pixel value is 20, the average pixel value is 16, the square of the high resolution pixel positive intensity deviation is 4×4 or 16. In this example of the product of the low resolution Positive Intensity Deviation× the high resolution Positive Deviation Frame Data pixels would 8. These products are computed for each pixel in each frame for the low resolution and high resolution images, respectively. Thus, there is an array for each product computed in Box 319. In Boxes 320A-C, the pre-normalized Positive-Positive Product pixel values (Box 320A), are determined by dividing the product of the low resolution Positive Intensity Deviation pixels×the high resolution Positive Deviation Frame Data pixels by the number of times the pixel is used for the calculation of the positive low resolution deviation times the positive high resolution deviation values (the product). The average of the squares of the low resolution Positive Intensity is determined by dividing by the number of times the pixel was used for the calculation of the product (Box 320B). The average of the squares of the high resultion Positive Deviation Frame Data pixels is determined by dividing by the number of times the pixel was used for the calculation of the product (Box 320C).

Figure 23:
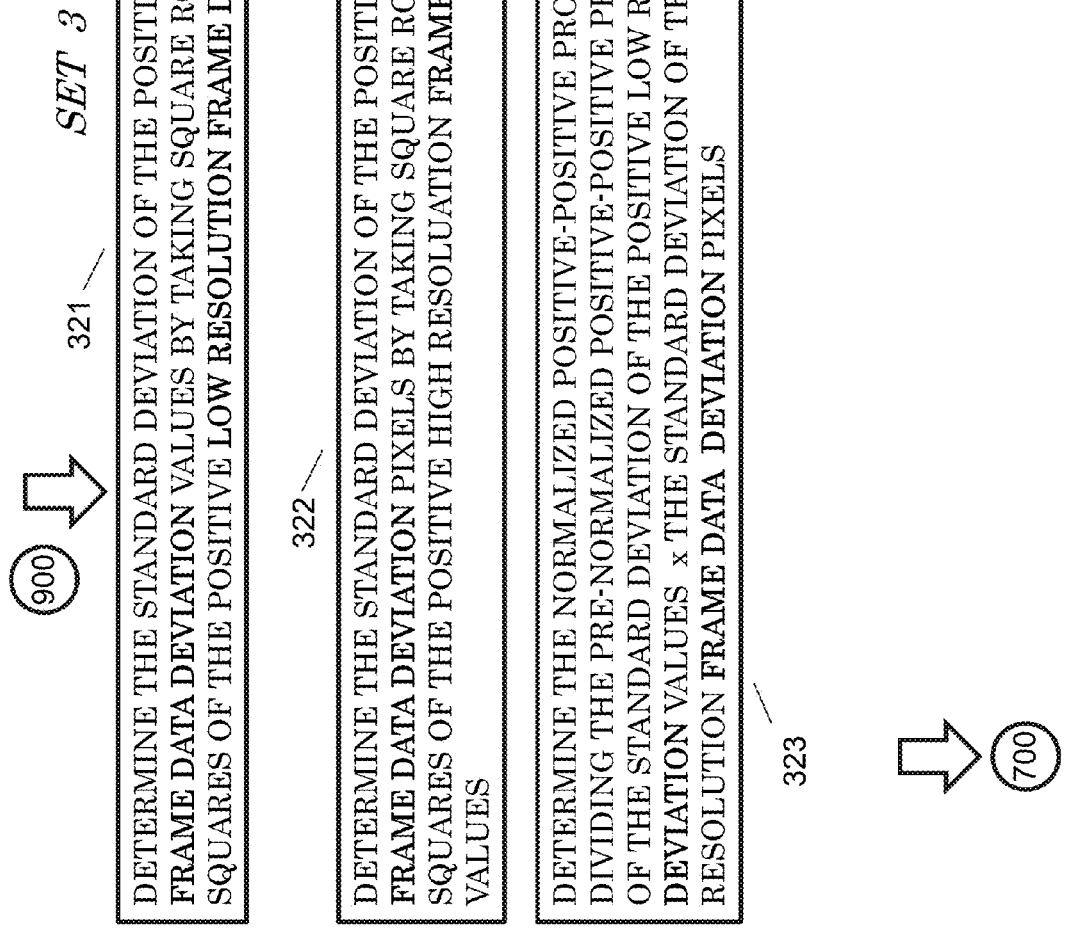

Continuing to FIG. 23, the method proceeds to Box 321. In Box 321 the standard deviation of the low resolution Positive Intensity Deviation is determined by taking the square root of the average of the squares of the low resolution Positive Intensity Deviations (determined in Box 320B). In Box 322 the standard deviations of the high resolution Positive Deviation Frame Data pixels is computed by taking the square root of the average of the squares of the high resolution Positive Deviation Frame Data pixels (determined in Box 320C). Box 323 determines the Normalized Positive-Positive Product pixel values by dividing the pre-Normalized Positive-Positive Product (Box 320A), by the product of the standard deviation of the low resolution Positive Intensity Deviations (Box 321), and the standard deviation of the high resolution Positive Deviation Frame Data pixels (Box 322).

The method proceeds via path 800 to FIG. 24 which shows how to generate a fourth set of data which is referred to here at SET 4. SET 4 frame data includes conditional product terms using frames having a low resolution negative intensity deviations and high resolution negative deviation frame data pixels. SET 4 may be determined as follows: In Box 400 pixels with a low resolution Negative Intensity Deviation multiply the value of the low resolution Intensity Deviation by the high resolution Negative Frame Data Deviation pixels within that set of frames. In Box 401, for each pixel location, the processor calculates (a) the square of the low resolution Negative Intensity Deviation, (b) the product of the low resolution Negative Intensity Deviation×the high resolution Negative Deviation Frame Data pixels, (c) the square of the low resolution Negative Deviation Frame Data pixels are recorded and accumulated and (d) the square of the high resolution Negative Deviation Frame Data pixels are recorded and accumulated. In Boxes 402 A-C the pre-normalized Negative-Negative Product pixel values (Box 402A) are determined by dividing the product of the low resolution Negative Intensity Deviations×the high resolution Negative Deviation Frame Data pixels by the result of 401(a). In Box 402B, the average of the squares of the low resolution Negative Intensity is determined by dividing 401(b) by 401(a). In Box 402C, the average of the squares of the high resolution Negative Deviation Frame Data pixels is determined by dividing 401(d) by 401(a).

From Box 402 in FIG. 24, the method can proceed via path 901 to FIG. 25. In Box 403 the standard deviation of the low resolution Negative Intensity Deviation is determined by taking the square root of the average of the squares of the low resolution Negative Intensity Deviation (determined in Box 402A). In Box 404 the standard deviations of the high resolution Negative Deviation Frame Data pixels is computed by taking the square root of the average of the squares of the high resolution Negative Deviation Frame Data pixels (determined in Box 402B. Box 405 determines the Normalized Negative-Negative Product pixel values by dividing the pre-Normalized Negative-Negative Product, (determined in Box 402A), by the product of the standard deviation of the low resolution Negative Intensity Deviation (determined by Box 403), and the standard deviation of the high resolution Negative Deviation Frame Data pixels (determined by Box 404). At the conclusion of Box 405, the method proceeds via path 700 to FIG. 30 for determining an improved image data 701, or to FIG. 31 for determining alternative improved image data 702 by an alternative embodiment.

Returning to FIG. 22, the method also can concurrently proceeds via path 800 to FIG. 26 which shows how to generate a fifth set of data which is referred to here at SET 5. SET 5 frame data includes conditional product terms using pixels having a low resolution negative intensity deviation and high resolution positive deviation frame data pixels. SET 5 may be determined as follows: In Box 800 pixels with a low resolution Negative Intensity Deviation multiply the values of the low resolution Intensity Deviation by the high resolution Positive Frame Data Deviation pixels within that set of frames. In Box 801, the processor records and accumulates (a) pixel locations, (b) the square of the low resolution Negative Intensity Deviations, (c) the product of the low resolution Negative Intensity Deviations×the high resolution Positive Deviation Frame Data pixels and (d) the square of the high resolution Positive Deviation Frame Data pixels are recorded and accumulated. In Box 802 A-C, the pre-normalized Positive-Negative Product pixel values (Box 802A), are determined by dividing the product of the low resolution Negative Intensity Deviations×the high resolution Positive Deviation Frame Data pixels by the result of Box 801A. The average of the squares of the low resolution Negative Intensity (Box 802B) is determined by dividing the result of Box 801B by the result of Box 801A. The average of the squares of the high resolution Positive Deviation Frame Data pixels (Box 802C) is determined by dividing 801(d) by 801(a).

From Box 802 in FIG. 26, the method can proceed via path 902 to FIG. 27. In Box 803 the standard deviation of the low resolution Negative Intensity Deviations is determined by taking the square root of the average of the squares of the low resolution Negative Intensity Deviations determined in Box 802B. In Box 804 the standard deviations of the high resolution Positive Deviation Frame Data pixels is computed by taking the square root of the average of the squares of the high resolution Positive Deviation Frame Data pixels, determined in Box 802C. Box 805 determines the Normalized Positive-Negative Product pixel values by dividing the pre-Normalized Positive-Negative Product determined in Box 802A, by the product of the standard deviation of the low resolution Negative Intensity Deviations (determined Box 803), and the standard deviation of the high resolution Positive Deviation Frame Data pixels (determined in Box 804).

Figure 31:
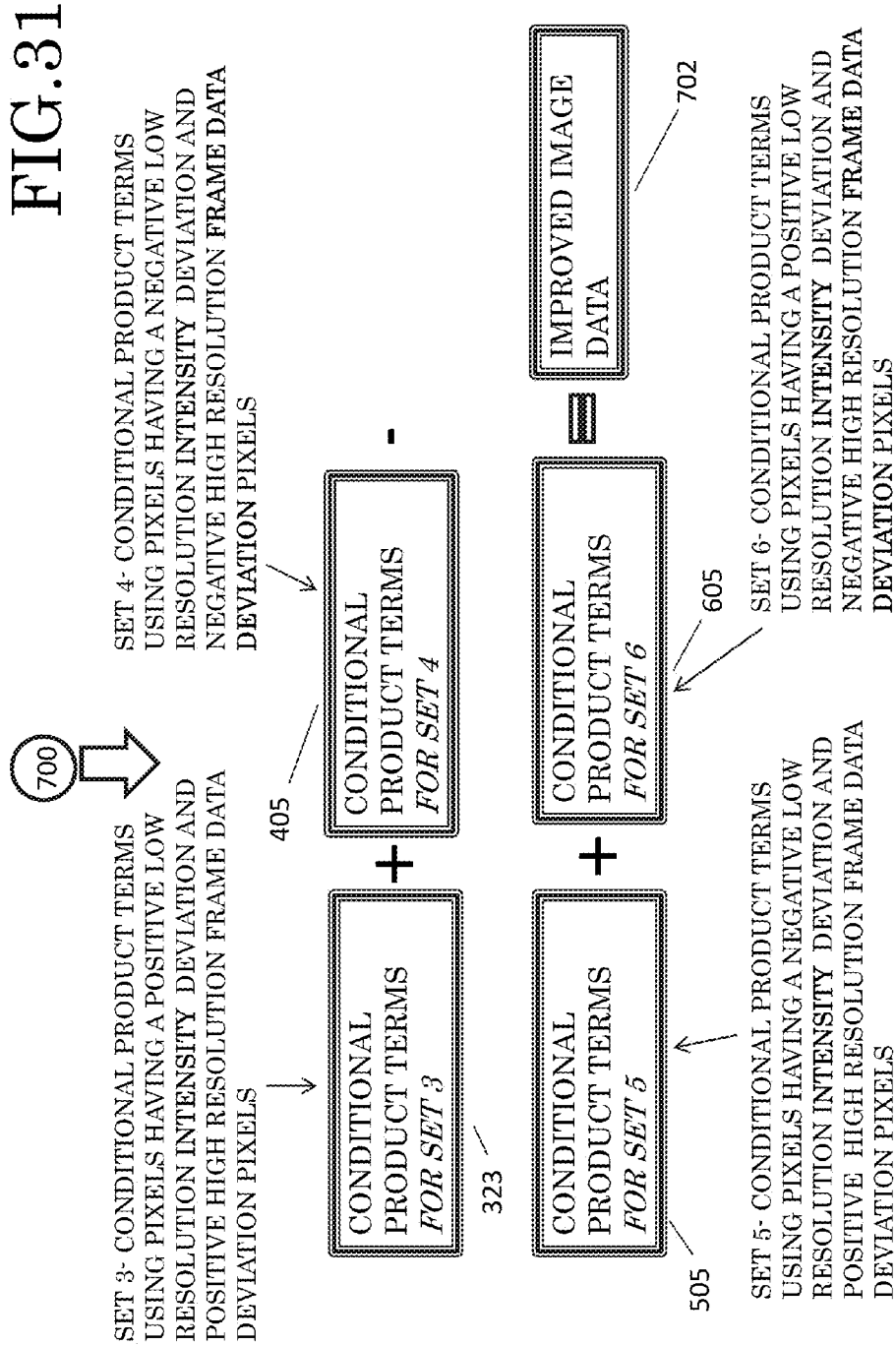

At the conclusion of Box 805 in FIG. 27, the method proceeds via path 700 to FIG. 30 for determining an improved image data 701, or to FIG. 31 for determining alternative improved image data 702 by an alternative embodiment.

Figure 28:
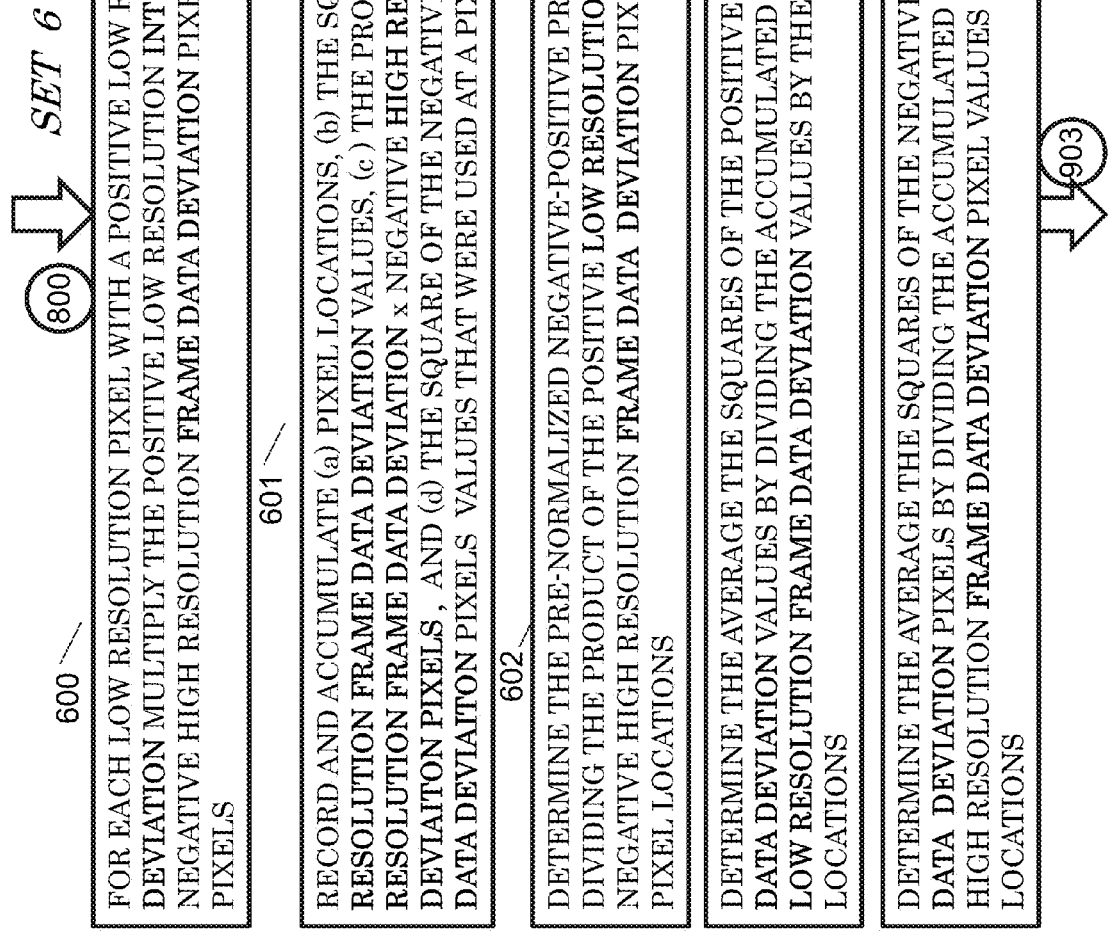

Similar as discussed above with respect to the fifth set of data (SET 5), returning to FIG. 22, the method also can concurrently proceed via path 800 to FIG. 28 which shows how to generate a sixth set of data which is referred to here at SET 6. SET 6 frame data includes conditional product terms using frames having a low resolution positive intensity deviation and a high resolution negative deviation frame data pixels. SET 6 may be determined as follows: In Box 600 pixels with a low resolution Positive Intensity Deviation multiply the value of the low resolution Intensity Deviation by the high resolution Negative Frame Data Deviation pixels within that set of frames. In Box 601, (a) the pixel locations are recorded and accumulated, (b) the square of the low resolution Positive Intensity Deviation is determined, recorded and accumulated, (c) the product of the low resolution Positive Intensity Deviations×the high resolution Negative Deviation Frame Data pixels is determined, recorded and accumulated, and (d) the square of the high resolution Negative Deviation Frame Data pixels are determined, recorded and accumulated. In Box 602 A, the pre-normalized Negative-Positive Product pixel values are determined by dividing the product of the low resolution Positive Intensity Deviations×the high resolution Negative Deviation Frame Data pixels by determined in Box 601(a). In Box 602B, the average of the squares of the low resolution Positive Intensity is determined by dividing the result of Box 601(b) by the result of Box 601(a). In Box 602C, the average of the squares of the high resolution Negative Deviation Frame Data pixels is determined by dividing the result of Box 601(d) by the result of Box 601(a).

From Box 602 in FIG. 28, the method can proceed via path 903 to FIG. 28. In Box 603 the standard deviation of the low resolution Positive Intensity Deviation is determined by taking the square root of the average of the squares of the low resolution Positive Intensity Deviations (determined in Box 602A). In Box 604 the standard deviations of the high resolution Negative Deviation Frame Data pixels is computed by taking the square root of the average of the squares of the high resolution Negative Deviation Frame Data pixels (determined in Box 602B). Box 605 determines the Normalized Negative-Positive Product pixel values by dividing the pre-Normalized Negative-Positive Product, (determined in Box 602A), by the product of the standard deviation of the low resolution Positive Intensity Deviations (Box 603), and the standard deviation of the high resolution Negative Deviation Frame Data pixels (Box 604).

At the conclusion of Box 605 in FIG. 29, the method proceeds via path 700 to FIG. 30 for determining an improved image data 701, or to FIG. 31 for determining alternative improved image data 702 by an alternative embodiment.

FIG. 30 is a partial schematic block diagram illustration of the steps for performing an alternate method in which the improved final image is determined by adding the above-mean, above mean (positive deviation low resolution-positive deviation high resolution) image to the below-mean, below-mean (negative deviation low resolution-negative deviation high resolution) images, subtracting the above-mean, below-mean (positive deviation low resolution-negative deviation high resolution) image, and subtracting the below-mean, above mean (negative deviation low resolution-positive deviation high resolution) image. In FIG. 30, improved image data 701 is determined by adding "SET 3" 323 to "SET 4" 405 and subtracting "SET 5" 505 and subtracting "SET 6" 605.

FIG. 31 is a partial schematic block diagram illustration of the steps for performing an alternate method in which the improved final image is determined by adding the above-mean, above mean (positive deviation low resolution-positive deviation high resolution) image to the below-mean, below-mean (negative deviation low resolution-negative deviation high resolution) images, adding the above-mean, below-mean (positive deviation low resolution-negative deviation high resolution) image, and adding the below-mean, above mean (negative deviation low resolution-positive deviation high resolution) image. In FIG. 31, an alternate embodiment of improved image data 702 is determined by adding "SET 3" 323, "SET 4" 405, "SET 5" 805 and "SET 6" 605 together.

With respect to FIGS. 30-31, SETS 3-6 are arbitrarily named, In fact, SETS 3-6 could have renumbered SETS 1-4 corresponding to first, second, third and fourth data sets, but the invention could be accomplished by using a lesser number of sets or different combinations of an equal or lesser number of sets.

Figure 32:
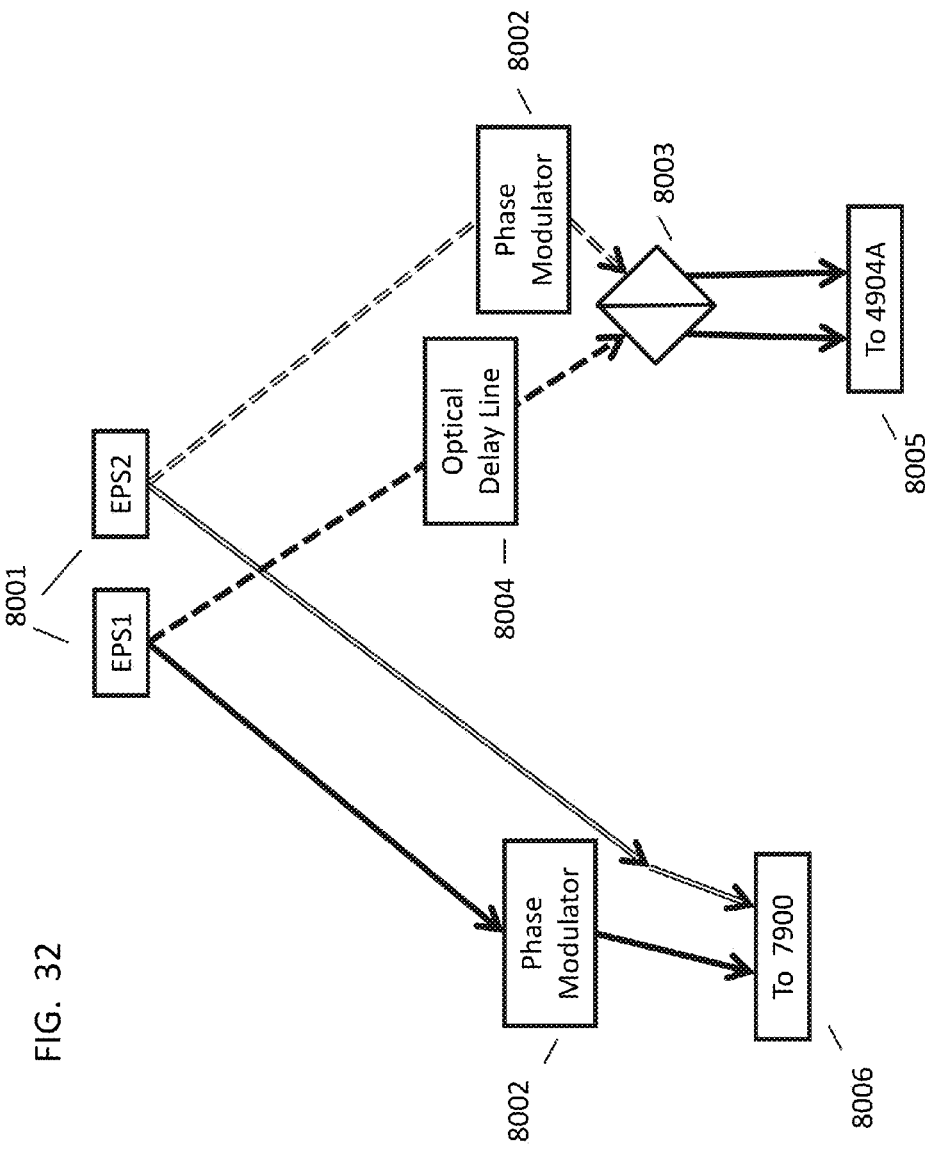
FIG. 32 is a schematic block diagram of an embodiment for the generation of related entangled photon pairs.
Figure 34:
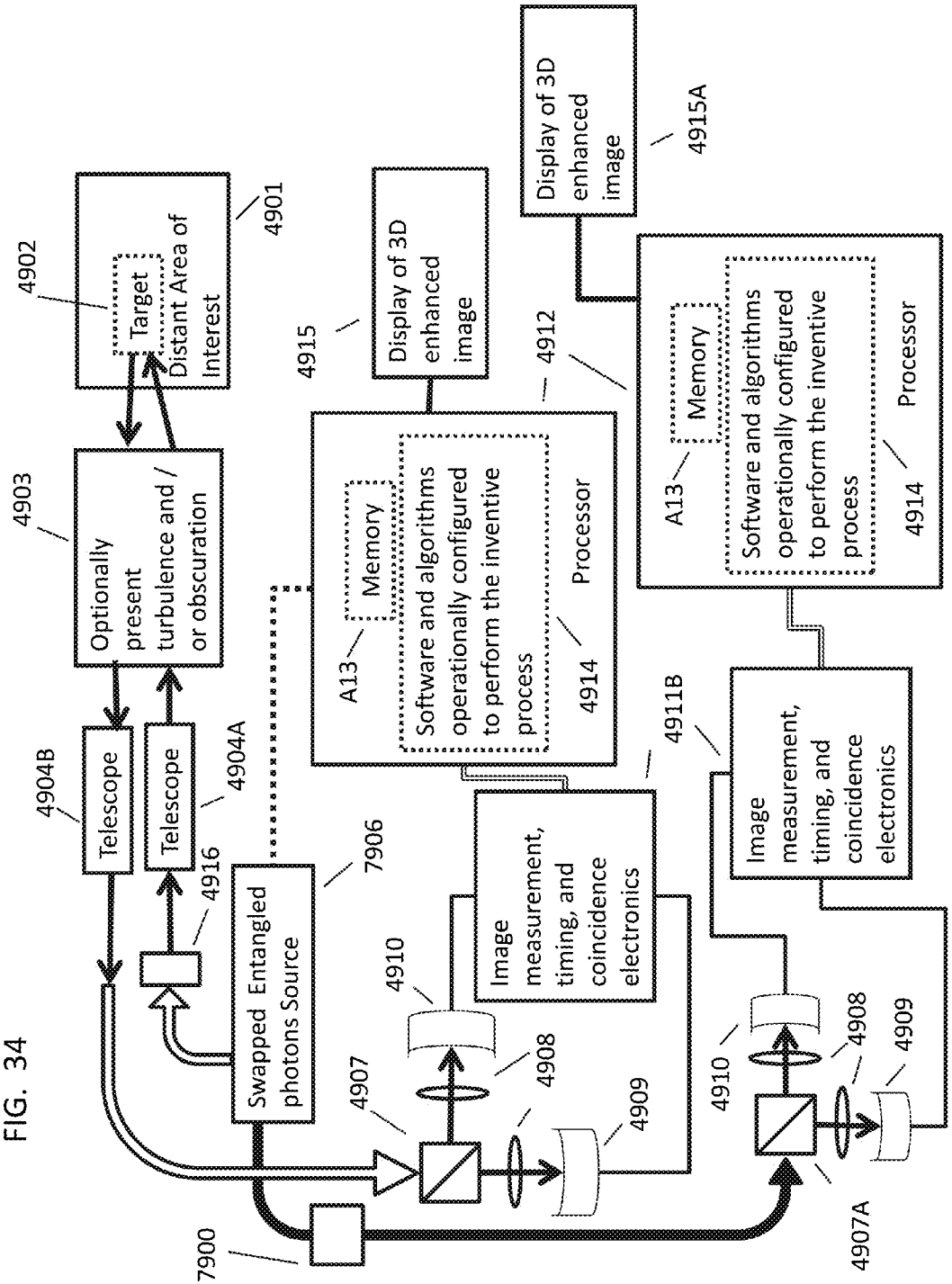
FIG. 34 is a schematic block diagram of a preferred embodiment of the present invention for image and ranging improvement.

FIG. 32 shows an exemplary embodiment of an entangled photon source which may be used for Box 7906 in FIG. 34. In particular, FIG. 32 presents an expanded view of one embodiment for the generation of entanglement swapped photon pairs. Element 8001 includes two entangled photon sources EPS1 and EPS2. Optional phase modulators 8002 operate to modify the phase relationship between the photon pairs generated by EPS1 and EPS2 respectively. Element 8003, which may be for example a beam splitter, a grating, surface or the like, operates to interfere at least one photon of at least one entangled photon pair from EPS1 with at least one photon of at least one entangled photon pair from EPS2. An optional optical delay line 8004 operates to ensure photon overlap on beam splitter 8003 for optimizing interference. Box 8005 represents that the photon pairs that have interfered on element 8003 are directed towards telescope 4904A and then to target A02. Box 8006 represents that the remaining photons from EPS1 and EPS2 are directed towards element 4907 and measurement devices 4909 and 4910 shown on FIG. 34.

Figure 33:
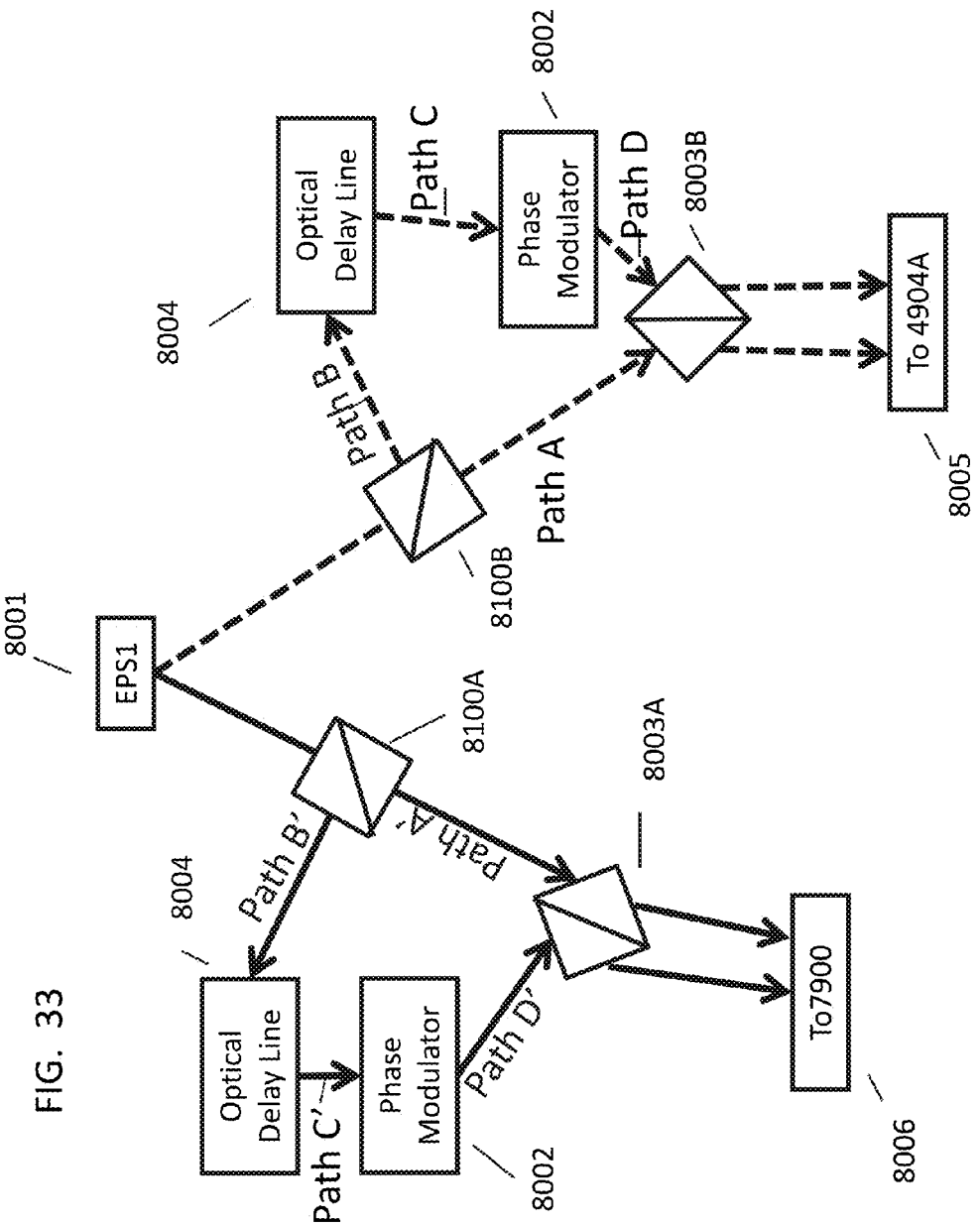
FIG. 33 is a schematic block diagram of an alternate embodiment for the generation of related entangled photon pairs.

FIG. 33 shows an alternate exemplary embodiment for the generation of entanglement swapped photon pairs which may be substituted for entangled photon source represented by Box 7906 in FIG. 34. Entangled photon source 8001 (EPS1) is a source of entangled photon pairs that may be configured to "pulse" photons in time. Optional phase modulators 8002 may be utilized to modify the phase relationship between photon pairs generated at different times by entangled photon source 8001. Elements 8100A and 8100B, representing, for example, a beam splitter, surface, grating or the like, operate to direct at least one photon of the entangled photon pair towards elements 8003A and 8003B, respectively. Elements 8003A and 8003B may be beam splitters, gratings, surfaces or the like. Elements 8003A and 8003B operate to interfere at least one photon of at least one entangled photon pair from a first time $t_1$ from Entangled photon source 8001 (EPS1) with at least one photon of at least one entangled photon pair from a second time $t_2$. Box 8004 is an optical delay line that operates to ensure photon overlap on element 8003 for optimizing interference. If the time to travel the path length BCD is equal to the time $t_2-t_1$, interference will occur between a photon emitted at times $t_1$ and a photon emitted at $t_2$, that is, the photon emitted at time $t_1$ will traverse the path BCD while the photon emitted at time $t_2$ traversed the path A, resulting in interference between a photon emitted at time $t_1$ with a photon emitted at time $t_2$. Similar interference will occur on paths A' and B'C'D' for the other of the entangled pair of the photons emitted at times $t_1$ and $t_2$. Box 8005 indicates that the photons that have interfered on element 8003B are directed towards telescope 4904A and then to target A02. Box 8006 indicates that first time ($t_1$)-second time ($t_2$) entangled photons from EPS1 are directed towards element 4907 and measurement devices 4909 and 4910 shown in FIG. 34. It is noted that the optical path lengths from Boxes 8100A/B to 8003A/B should be approximately an integer multiple of the time between entangled photon pulses generated by 8001 (EPS1), i.e. the time between entangled photon pair pulses is $\Delta t_p$ then the path length is approximately 1, 2, 3, ..., n times delta $t_p$. Optical path lengths may be measured in terms of a distance L or time where the time is the length L divided by the speed of light in the media $c_m$.

FIG. 34 presents a block diagram of a preferred embodiment of a system for image and ranging improvement. Box 4901 indicates a distant target scene area. Target 4902 is a distant targeted area, distant target scene or particular region of interest selected for improvement and enhancement. Box 4903 indicates optionally present turbulence or other obscuring or image degrading effects along photon path between light source and target, and light source and imaging system or photon measurement devices or components. Focuser or telescope or viewer 4904A may optionally be any type of apparatus similar to a telescope, such as binoculars, or direct viewing may be used without departing from the scope of the invention. Focuser or telescope 4904A may zoom in on or expand view of the selected region of interest, as well as zoom out. Focuser or telescope 4904A is used to transmit entangled photon pairs to the region of interest. Focuser or telescope 4904B, although other apparatus or direct viewing may be used without departing from the scope of the invention, may zoom in on or expand view of the selected region of interest. The focuser or telescope 4904B is configured to receive entangled photon pairs reflected or scattered from the region of interest. By providing separate first and second focusers or telescopes, it is possible to provide better results and control independently for light transmitted and received.

Entangled photon source 7906 is an entangled photon source such as of the types illustrated by FIGS. 32 and 33. The entangled photon source generates entangled photon pairs that are entangled in time-energy, H-V polarization or between other conjugate pair properties of the photons. Element 4907, may be for example, a polarizing beam splitter, dichroic-mirror or other optical element that operates to direct one portion of an entangled photon pair towards spatially resolving detector 4910 and directs the remaining portion of an entangled photon pair toward spatially resolving detector 4909. Focusing elements 4908 may be lenses used to focus the photons onto detector 4909 and detector 4910. Spatially resolving detector 4909 measures the time and spatial (x, y) location of one part of an entangled pair that has interacted with the remote scene, target or subject. Spatially resolving detector 4910 measures time and spatial (x, y) location of the second part of an entangled pair that has interacted with the remote scene, target or subject. Box 4911B represents coincidence and timing electronics that operates to register when a pixel on detector 4909 and a pixel on detector 4910 occur inside within a user defined coincidence window $\Delta T_c$. A coincidence window is a time difference within which two photon measurements are defined to be co-incident. The timing electronics further operate to record the time that has elapsed since a user chosen laser pulse and the first coincidence pair detection for ranging calculations. Box 4912 indicates a processor, memory, and algorithms to generate enhanced average second-order images of the region of interest. Memory A13, associated with processor 4912, stores input images, algorithms, intermediate computations, and enhanced second order images of the region of interest. Box 4914 represents software operationally configured to perform the image improvement and enhancement processes. Display 4915A is operatively connected to processor 4912 for displaying the generated enhanced second-order or higher order image of the region of interest. Box 4916 represents optionally-present pointing and aiming (e.g., beam steering) components that may be used to direct the entangled photon pairs to a specific point within the region of interest.

A second set of entangled photon pairs generated by swapped entangled photon source 7906 are directed towards element 4907A, shown in the bottom left corner of FIG. 34. The entangled photons from element 8006 of FIGS. 32 and 33 are directed towards element 4907A via delay line element 7900 and the corresponding set of entangled photons from element 8005 of FIGS. 32 and 33 are directed towards element 4904A through beam steering or pointing element 4916. Element 4907A is similar to 4907 and directs portions of the entering entangled photon pairs towards measurement devices 4909 and 4910. Coincidence measurements of the entangled photons directed to element 4907A are used to generate a reflection image of the target 4902 with information that is provided by the shared entanglement properties of the entangled photons that were directed from swapped entangled photon source 7906 to focusing device or telescope 4904A. It is to be appreciated that this invention will operate to generate an improved image of the target where the target may be partially absorbing and/or partially reflecting. As state above, the entangled photons from element 8006 of FIGS. 32 and 33 are directed towards element 4907A via delay line element 7900 and the corresponding set of entangled photons from element 8005 of FIGS. 32 and 33 are directed towards element 4904A through beam steering or pointing element 4916. Displays 4915 will display an image created by entangled photons reflected by the target 4902 and display 4915A will display an image created by entangled photons that never directly interacted with the target 4902, but due to the properties of entanglement display an image of created by corresponding entangled photons (a) absorbed by target 4902, (b) reflected by the target 4902 due to the properties of entangled photon pairs.

As described above, generally speaking, the progression of image stages in FIG. 3 are represented in the presentation and comparison of images in FIGS. 7 through 19 in order to demonstrate that high resolution images are producible from low resolution images using the above principles.

At least some of the embodiments described above may be based upon the calculation of a $G^{(2)}$ "ghost" image for each bucket detector over the set of all bucket detectors that comprise the low resolution target object detector. Each of the intermediate $G^{(2)}$ images are summed into a final composite image of the target object A "ghost" or $G^{(2)}$ image as used herein may be mathematically expressed as a result of a convolution between the aperture function (amplitude distribution function) of the object $A(\vec{\rho}_o)$ and a $\delta$-function like second-order correlation function $G^{(2)}(\vec{\rho}_o, \vec{\rho}_i)$ $$F(\vec{\rho}_i) = \int_{obj} d\vec{\rho}_o A(\vec{\rho}_o) G^{(2)}(\vec{\rho}_o, \vec{\rho}_i), \quad (1)$$

where $G^{(2)}(\vec{\rho}_o, \vec{\rho}_i) \cong \delta(\vec{\rho}_o - \vec{\rho}_i/m)$, $\vec{\rho}_o$ and $\vec{\rho}_i$ are 2D vectors of the transverse coordinate in the object plane and the image plane, respectively, and m is the magnification factor. The term $\delta$ function as used herein relates to the Dirac delta function which is a mathematical construct representing an infinitely sharp peak bounding unit area expressed as $\delta(x)$, that has the value zero everywhere except at x=0 where its value is infinitely large in such a way that its total integral is 1. The $\delta$ function characterizes the perfect point-to-point relationship between the object plane and the image plane. If the image comes with a constant background, as in this experiment, the second-order correlation function $G^{(2)}(\vec{\rho}_o, \vec{\rho}_i)$ in Eq. (1) must be composed of two parts $$G^{(2)}(\vec{\rho}_o, \vec{\rho}_i) = G_0 + \delta(\vec{\rho}_o - \vec{\rho}_i/m), \quad (2)$$

where $G_0$ is a constant. The value of $G_0$ determines the visibility of the image. One may immediately connect Eq. (2) with the $G^{(2)}$ function of thermal radiation)

$$G^{(2)} = G_{11}^{(1)} G_{22}^{(1)} + |G_{12}^{(1)}|^2, \quad (3)$$

where $G_{11}^{(1)} G_{22}^{(1)} \sim G_0$ is a constant, and $|G_{12}^{(1)}|^2 \sim \delta(\vec{\rho}_1 - \vec{\rho}_2)$ represents a nonlocal position-to-position correlation. Although the second-order correlation function $G^{(2)}$ is formally written in terms of $G^{(1)}$s as shown in equation (3), the physics are completely different. As we know, $G_{12}^{(1)}$ is usually measured by one photodetector representing the first-order coherence of the field, i.e., the ability of observing first-order interference. Here, in equation (3), $G_{12}^{(1)}$ may be measured by independent photodetectors at distant space-time points and represents a nonlocal EPR correlation.

When using a bucket detector, the calculation of a $G^{(2)}$ ghost image for each bucket detector over the set of all bucket detectors that comprise the low resolution target object detector is used as a basis. Each of the intermediate $G^{(2)}$ images are summed into a final composite image of the target object $$\text{Image}_{final} = \Sigma G_i^{(2)} \quad (4)$$

where $\Sigma$ indicates a summation operation. Similarly, when using Compressive Sensing (CS) techniques the R term of Eq. (9) is computed for each bucket for an intermediate image and these intermediate images are then summed as show in Eq. (4) to produce a final image of the target object.

Typically ghost imaging uses two detectors, one to observe the light source and the other, single pixel or bucket detector, to observe the light scattering and reflecting from the target object.

$$G^{(2)} = \langle I(x,y,t)_{source} I(t)_{bucket} \rangle - \langle I(x,y,t)_{source} \rangle \langle I(t)_{bucket} \rangle \quad (5)$$

where $\langle \ \rangle$ denotes an ensemble average. As used herein, and terminology "bucket" in general means a single pixel detector, a detector comprising a plurality or grouping of pixels, a low resolution imaging device, a low resolution scanning detector (or device) or the like. The terminology $I(t)_{bucket}$ means the measurements taken from a single pixel detector, a detector comprising a plurality or grouping of pixels, a low resolution imaging device, a low resolution scanning detector (or device) or the like.

A relatively new mathematical field named Compressive Sensing (CS) or Compressive Imaging (CI) can be used to good effect within the context of $G^{(2)}$ imaging. The use of compressive techniques in the context of Ghost Imaging was performed by the Katz group (see O. Katz, et al., "Compressive Ghost Imaging," Appl. Phys. Lett., 95, 131110 (2009)) (hereby incorporated by reference) who demonstrated a ghost like imaging proposal of Shapiro (see J. Shapiro, "Computational Ghost Imaging," Phys. Rev. A 78 061802 (R) (2008)) (hereby incorporated by reference).

The use of CS and Compressive Imaging (CI) herein is based on finding approximate solutions to the integral equations using the Gradient Projection for Sparse Reconstruction (GPSR) mathematical methodology where $$JR = B \quad (6)$$

and $$R = R(x,y) \quad (7)$$

is the object reflectance. The term J is a matrix, where the rows are the illumination patterns at time k and the B vector:

$$B = [B_k] \quad (8)$$

represents the bucket values. In cases where the system is underdetermined (too few $[B_k]$), then $L_1$ constraints are applied to complete the system and sparseness is used:

$$\operatorname*{argmin}_R = \frac{1}{2}\|B - JR\|_2^2 + \tau\|R\|_1 \quad (9)$$

The CS computational strategy takes advantage of the fact that it is normally true in images that not all pixels in an image contain new information and the system is said to be sparse on some basis since fewer degrees of freedom are needed to describe the system than the total number of pixels in the image. The parameter $\tau$ in Eq. (9) is often a constant.

The problem is then solvable using, for example, an L1 minimization as described further in "Compressed Sensing, IEEE Transactions on Information Theory, Vol. 52, NO. 4, APRIL 2006" and "Gradient Projection for Sparse Reconstruction: Application to Compressed Sensing and Other Inverse Problems, IEEE J. Sel. Top. in Sig., Proc. 1, 586 2007." (both of which are hereby incorporated by reference).

In another embodiment, when illuminating light source comprises entangled photons, in order to resolve the issue of multiple counts (i.e., counts originating from background photons), the following sequence is preformed:

providing a high speed time stamped series of low resolution frames of a given region of interest from the array of pixel locations;

providing a high speed time stamped series of high resolution images of a light source from the spatial detector;

the high speed time stamped frames being such that there is only one photon counted (or measured) on a pixel in both the low resolution frame and the high resolution frame per unit time (if more than one pixel is counted, the frame of pixels is discarded—This is to ensure proper discrimination of entangled photons from background light.)

determining the value of each pixel at each location per unit time within each high resolution frame to form first arrays of pixel values;

determining the value of each pixel at each location per unit time within each low resolution frame to form a second array of pixel values;

for each low resolution pixel location in the second array:
determining a third array (which corresponds to the intermediate image) of time coincident values (i.e., when entangled photons are jointly measured) for the low resolution pixel location and each pixel in each high resolution image for the series of frames;

summing together the third arrays to provide a final composite high resolution image.

Applications of the embodiments described herein improve the ability to image through obscuring media (e.g., smoke or clouds), which remains a problem in a variety of fields, such as satellite imaging analysts, firefighters, drivers, oceanographers, astronomers, military personnel, and medical personnel. The embodiments described improve the ability to improve resolution in each of these exemplary instances and represents an opportunity to derive more information from images and presumably the decisions made from such images. By way of example, improved resolution in x-ray or endoscopy medical imagery facilitates lower radiation dosing and diagnosis of abnormal morphologies earlier than currently possible with conventional imaging methodologies. Conventional imaging techniques have, to a large extent, arrived at the theoretical limits of image resolution owing to wavelength-limited resolution, optical element distortions, and the reflective interaction between photons and an object to be imaged.

As used herein the terminology $G^{(2)}$ technique means where you have two measurements where the actual image is the convolution of the object function $$F(\vec{\rho}_i) = \int_{obj} d\vec{\rho}_o A(\vec{\rho}_o) G^{(2)}(\vec{\rho}_o, \vec{\rho}_i),$$

where the Object function A is convolved with the correlations between two spatially distinct detections.

This application provides further improvements over the embodiments discussed in application Ser. No. 13/477,890. One key difference is that the improved embodiments provide a method to partition the values in the measured data sets, i.e. frames, into two or more groups for the high resolution frame data (reference fields) of the illuminating source and overall frame intensities (bucket values) or low resolution frame data of the region of interest. These groups are then used to compute products, or cross-correlations, between the different groupings. These individual product terms can be mathematically combined, via addition and/or subtraction processes, to generate improve images of the target or scene. This method further adapts the techniques presented in application Ser. No. 13/477,890. For example, in application Ser. No. 13/477,890, each pixel of the low resolution image operated as a "bucket" measurement and intermediate improved images were computed for each low resolution pixel before being added together to provide a final improved image. Deviations of the high resolution reference images and the deviations of the low resolution pixels are operated with to compute intermediate improved images that are then summed to provide a final improved image of the subject. One key advantage to this method is that it is possible with the following embodiments to generate all positive valued images and largely eliminate background and noise effects. Other advantages include the ability to operate on a computed partitioned image using functions such as logarithms and exponentials to further increase contrast or better identify objects and information on their properties.

The following embodiments are predicated on the appreciation that other operations involving the partitioned sets of above average and below average measurements are beneficial to improve image quality in adverse conditions such as turbulence. These operations would include but are not limited to cross-correlations between above average bucket (overall frame intensities) or above average low resolution frame data and below average reference fields. Typically four correlation types are available when data is partitioned into two distinct sets such as above the average and below the average values. In a non-normalized form this can be written as $$R_m = \frac{1}{N_M} \sum_1^{N_M} I_a I_b \quad (7)$$

where $R_m$ is proportional to the correlation between the two data sets $I_a$ and $I_b$. $N_M$ is the number of elements in the data sets being considered. Normalization is usually accomplished by dividing the $R_m$ by the standard deviations of $I_a$ and $I_b$.

$$RN_m = \frac{R_m}{\sigma_{I_a}\sigma_{I_b}} \quad (8)$$

The data sets $I_a$ and $I_b$ are used in the preferred embodiments of the current invention as the deviations from the average or mean. $I_\alpha=(M_\alpha-<M>)$ where the M's indicate the measurement, either an individual pixel value, a low resolution pixel value, or a bucket value and the $<>$ indicates an average over the ensemble of the measurements.

The product terms that comprise a particular $R_m$ are computed conditionally. The $R_m$ can be called conditional product terms. For instance, $R_m$ may be computed for the set of pixel values $I_a$ that are above the mean for those pixels of data with low resolution pixel values $I_b$ that are above the mean. For example:

$$R_m^{++} = \frac{1}{N_m^+} \sum_1^{N_m^+} I_a^+ I_b^+ \tag{10}$$

The other combinations of above/below mean high resolution pixel values and above/below mean low resolution pixel values are computed similarly. These conditional $R_m$ may then be added or subtracted from each other to yield improved images of a scene or target. Furthermore, it should be noted that the particular combination of the $R_m$ below $$R_m^{++}+R_m^{--}-R_m^{+-}-R_m^{-+} \tag{11}$$

A second alterative embodiment may include computing a $G^{(2)}$ improved image. This improved image is then partitioned into pixels that are, for example, above the spatial mean $G^{(2)}$ and pixels that are below the spatial mean $G^{(2)}$. These alternative positive/negative $G^{(2)}$ partitioned improved images can display higher contrast and can be further operated upon by using mathematical operations such as logarithms to increase the dynamic range. It is to be recognized that other partitions are possible to tailor results needed for specific applications.

A third embodiment may include computing a $R_m$ correlation image by calculating the correlation coefficient between the $I_a$ and $I_b$ partitions where the Ia and Ib are not aligned in time or frame. For instance, at a particular pixel i,j there may be 10 frames in which that pixel is above the mean value of that pixel for all frames, and there may only be 5 frames for which the $I_b$ values is above the mean of $I_b$. A correlation coefficient may be computed between these two sets of data using:

$$R(i, j) = \frac{C(i, j)}{\sqrt{C(i, i)C(j, j)}} \tag{12}$$

where R(i,j) is the correlation coefficient between variables i and j. C indicates a covariance calculation between the variables i and j. The data sets are forced to be the same length, as required by the above R(i,j) process, by simply setting N to be the length of the data set with fewer elements and then taking the first N values of the data set that has a greater number of elements. This can lead to cross-time correlations that may prove useful for certain applications. The method of calculating the values of R(i,j) may also use the processes outlined above.

As an example, for imaging measurements of pixel values and bucket values that have been grouped into two sets each of above and below their respective averages, there is a total of 80 possible ways to present for output the results of the computed conditional product terms. For instance, each conditional product term may be presented for display individually with either a positive or negative sign. Thus, individually for the four conditional product terms there is a total of 8 ways to present them for display. Combinations of two conditional product terms with signs allows for 24 options to present for display, combinations of three conditional product terms allows for 32, and combinations of all four conditional product terms allows for 16 ways to present for output and display.

Entanglement Swapping

Entanglement swapping is a quantum process by which particles that are not entangled become entangled with each other. For example, consider that particles 1 (P1) and 2 (P2) are entangled with each other and that particles 3 (P3) and 4 (P4) are entangled with each other. To entangle P1 and P4, particles P2 and P3 are interfered on, for example, a beam splitter and then are measured. The interference and measurement swaps the entanglements P1-P2 and P3-P4 to P1-P4. Particles P2 and P3 are also affected by the measurement device and may be absorbed. The process of entanglement swapping has previously been verified. See, e.g., Jian-Wei Pan, Dik Bouwmeester, et al. "Experimental Entanglement Swapping: Entangling Photons That Never Interacted" Physical Review Letters 80, 3891-3894 May 1998, which described a process of entanglement swapping with experimental verification using entangled photons. Swapping may be considered as the teleportation of an unknown photon/particle state onto another photon/particle.

The process of entanglement swapping has many potential applications in the development of quantum technology. Thus far, relatively few applications have found uses for entanglement swapping. Potential applications for entanglement swapping in quantum technology include quantum computing, quantum communications and, in the current invention, quantum imaging. There are potentially many benefits to using entanglement swapping for quantum imaging that have not yet been described or exploited. The reason for this is that entanglement swapping has required high precision in its implementation and great expense for equipment that achieves the high precision. The lack of robust applications for entanglement swapping has been another drawback to its implementation in technology. This technology is being miniaturized in solid state devices and some components are being tested on chips. These quantum chips, can generated entangled particles and perform interference operations and measurements of quantum states.

It would be beneficial to have an entanglement swapping application that is robust and can be implemented with both available and evolving technologies. One way to make entanglement swapping useful would be to apply it information transfer, sharing or communication without the need for a classical communications channel. For example, the current Internet, radio, and telephone are generally considered to be classical communications channels. Another way to make entanglement swapping useful would be to be able to transfer, share or communicate by quantum means without the sender or receiver needing access to information or resources held by the other. For example, the sender having access to photons P2, P3 and the receiver having access to photons P1, P4 is sufficient to transfer information from sender to receiver. Repetition of this process allows the transfer of images without sending classical information and by only sharing entanglement. This type of communication of information, such as data and/or images, would be difficult to detect by an external observer since there would be no particle or radiation going between the sender and the receiver which an observer would be able to sense and follow. Military and domestic applications requiring stealth and/or security would benefit from this capability. Experiments by the inventors have verified the working principles. The experiments started with entangled pairs of photons configured as described in FIG. 34. Photon pairs equivalent to the first set of entangled photon pairs (transmitted photons) of FIG. 34 were manipulated to enable and disable a swapping of entanglement to the second set of entangled photons pairs and the effects of that manipulation were measured with the coincidence detection of the second set of entangled photon pairs. The second set of entangled photon pair coincidence measurements were reduced when the entanglement swapping was disabled with the first set of entangled photon pairs and the second set of entangled photon pair coincidence measurements increased when entanglement swapping was enabled with the first set of entangled photon pairs.

Benefits of entanglement swapping for quantum imaging may include performing an entanglement swap to optimize photon detection efficiency while simultaneously optimizing transmission properties from an illumination source to a target. Another benefit is that an entanglement swap may be used to measure absorption maps of a target without the need to measure reflected photons. Furthermore, entanglement swapping may be used to help compute the product of the absorption values at two locations on a target.

Using the environment to enable entanglement swapping provides a direct and remote measurement on the environment. For example, absorption of photons by a remote target can be sensed by the enabling of quantum swapping of entangled particles which can be measured remotely without need for the return of photons from the target. It should be noted that besides images of absorption fields of targets any property can be imaged by enabling quantum swapping when the quantum particle is sensitive to the effects of object. Furthermore, with time sequencing this provides range information from, for example, the source of entangled quantum particles to target features. It should be further realized that the source or sources of the entangled quantum particles need not be located with the equipment used to direct particles towards a target (sender) or located with the equipment that measured those entangled particles that never directly interacted with the target (receiver). For example, the source or sources of the entangled particles may be on a satellite that would send the entangled particle pairs to the "sender" equipment and "receiver" equipment. Alternately, both the sender and receiver may have a single entangled quantum particle source and each shares one particle of their entangled particle pairs with the other. The identification of which particles are entangled with each other relative to initial entangled pair creation times may be achieved using an auxiliary time stamp, e.g. a laser pulse encoded with time information for each entangled photon pair created, that propagates with each particle of each entangled particle pair. Also, the use of an entanglement source such as the one described in FIG. 33 does not have an issue (or question) as to the identification of which particles are entangled as there is only a single source that sequentially generates entangled particles. Although not obvious, we consider it possible to use thermal light photon number fluctuations and their correlations and quantum illumination for variations of teleportation and swapping in our current inventions with swapping.

Further benefits of entanglement swapping applied to quantum imaging using measurements of reflected photons may include application to quantum imaging of remote targets and microscopy with the images being generated for the user at a distant location with entangled photons that did not interact directly with the target. The reflected photons may be further used to compute the product of reflectance or the product of reflected intensities of at least two locations on the target. Current imaging systems, such as cameras, are dependent on producing imaging using photons that have directly interacted with the target. The sharing of images taken by a camera normally requires communication by electromagnetic radiation that takes specific paths to communicate a facsimile of the image between sender and receiver. Even quantum teleportation requires a classical communication channel using electromagnetic radiation that takes specific paths to communicate. It would be beneficial to use entanglement swapping to communicate images or quantum images that does not require a classical communications channel to complete the transfer of images between a sender and a distant user at the receiver in order to avoid having the classical communications channel blocked which would also block image communication. Communication information transfer using entanglement swapping would be an entirely quantum process. The speed of quantum information has been recently been reported as being greater than or equal to $1.37*10^4$ times the speed of light See, el Yin et al. "Lower Bound on the Speed of Nonlocal Correlations without Locality and Measurement Choice Loopholes," Physical Review Letters 110, 260407 June 2013. The benefits of utilizing swapping in the process of quantum communications is that communications would be at the speed of the quantum information even if it is faster than the speed of light which can be beneficial for many applications.

Second Order Imaging

Imaging of a scene or subject is typically accomplished by mapping an illuminated scene or subject onto an image sensor where there is a light measurement component such as film, CCD, or other sensing device. Light consists of a plurality of photons that may be measured. The illuminating light may be from one or more light sources either natural or artificial, or both. Common sources of light include for example the sun, coherent, incoherent, or partially coherent light, entangled photons, infrared radiation emitted by atoms and molecules, accelerating charges, lasers, light bulbs, light emitting diodes (LEDs), chaotic laser light, pseudo-thermal light generated by passing laser light through a rotating ground glass or other scattering material, stars, moons, clouds, planets, space objects, fluorescent lamps, electrical discharges, plasmas, bio-luminescence, and stimulated emission. Although it is not absolutely necessary a lens is often used to perform this mapping. Imaging is often susceptible to adverse affects such as obscuration, turbulence, low signal to noise ratio such as when operating in low-light conditions, jitter, and noise. Often, this type of imaging is referred to as "First Order" imaging due to the time, ensemble, or mixed time-ensemble averaging of the sensors involved. For instance, a first-order light intensity image I(x, y, t) can be produced by light interacting with a sensor for some time $\Delta t$, i.e. shutter or integration time. A single instance of this may be referred to as a "frame". Multiple frames of images, $I(x, y, t_i)$, may be averaged over some or all of the frames in a sequence of frames to generate an averaged first-order image of the subject $<I(x, y, t_i)>$ where $<>$ indicates an ensemble average. A second order image involves averages of products of two first-order intensity or normalized intensity measurements. An enhanced image results from the subtraction of products of averages of first order intensities from the average of the product of the intensities. An intensity or normalized intensity can be decomposed into a mean ($<I_1>$) plus a deviation from the mean or average ($\Delta I_1$).

The terms $I_1$ and $I_2$ are intensities or normalized intensities measured by sensors 1 and 2, $I_1=<I_1>+\Delta I_1$ and $I_2=<I_2>+\Delta I_2$ with $I_1$ and $I_2$ being functions of space and time, i.e., x, y, t, $<I_1>$ is the ensemble average of intensity or normalized measurements of sensor 1 and $\Delta I_1$ is the deviation from the mean for the intensity or normalized intensity measurements of sensor 1. $<I_2>$ is the ensemble average of intensity or normalized measurements of sensor 2 and $\Delta I_2$ is the deviation from the mean for the intensity or normalized intensity measurements of sensor 2. The deviation is often called a fluctuation.

There is a trend in modern imaging devices, i.e. cameras, to provide more measured quantum properties at each pixel. Thus, the measurements may include measurements such as wavelength (color or derived color mappings such as RGB, CMY, CMYK, etc.), polarization, Stokes parameters, spatial modes, orbital angular momentum (OAM), spin, etc. For example, a color camera may provide separate wavelength measurements, red (R), green (G), and blue (B) measurement values at each pixel, the polarization Stokes parameters at each pixel, and modern infrared (IR) cameras can provide measurements of long-wave infrared (LWIR) and mid-wave infrared (MWIR) measurement values at each pixel of the imaging device, or combinations of these measurements. In the current invention at least one of the available measured quantities is selected to provide the frame data for the generation of the improved image of the region of interest.

It is to be appreciated that measurements of quantities such as wavelength and polarization are typically dependent on the responsiveness of the measurement device to the quantity being measured. As an example, color cameras typically use band-pass filters arranged in a pattern over the pixels of the measurement device. These filters are usually labeled Red, Green, and Blue (R, G, and B). The wavelengths that each of the R, G, B filters pass is centered at a particular wavelength and also passes nearby wavelengths with wavelengths being more distant from the center wavelength being more highly attenuated. This effect is referred to as the bandwidth of the filter. Polarization filters have similar bandwidths with respect to the orientation of the filter. The responsiveness to wavelength, polarization, etc., of an element on a measurement may also be adjusted by applying, for example, larger or smaller voltages to increase or decrease the degree to which each element (pixel) reacts to the wavelength or polarization of light that interacts with that pixel.

The invention can be used with measurements of quantum particles. There are many quantum particles including but not limited to photons, electrons, neutrons, protons, atoms, ions, mesons, and positrons. Photons, mesons, neutral atoms or molecules are bosons. Fermions include quantum particles such as electrons, ionized atoms and ionized molecules sometimes referred to as ions.

The invention can be used to generate improved images through a variety of gaseous, solid, or liquid media or mixtures of these that are at least partially transparent to quantum particles. These media may include but are not limited to, for instance, glasses, diamond, silicon, water and air. As an example, images captured with an underwater camera can be used as input for the inventive process for enhancement as well as images taken through say an air-water interface such as an imaging system on a boat looking down into the water or a submerged imaging looking into the air above the water.

As used in the following, the terminology photon light source means or is defined to include, thermal photon light, partially coherent, and entangled photon light. As used in the following, the terminology media means or is defined to include vacuum, air, water, turbid fluids, turbulence fluids, soft tissues and partially transmissive solids.

As used herein, the terminology "subject" or "object" or "target" may include a photograph, a thing, a person, animate or inanimate subject, a plurality of objects, the ground, ground covering (e.g., grass), a localized piece or pieces of the environment, surface, physical entity (or entities) or anything that can be observed.

As used herein, the terminology "bucket" refers to a single-pixel (bucket) detector.

As used herein, the terminology "second order" is defined as follows. A second order image involves averages of products of two first-order intensity or normalized intensity measurements. Imaging of a scene or subject is typically accomplished by mapping an illuminated scene or subject onto an image sensor where there is a light measurement component such as film, CCD, or other sensing device. Light consists of a plurality of photons that may be measured. The illuminating light may be from one or more light sources either natural or artificial, or both. Common sources of light include for example the Sun, coherent, incoherent, or partially coherent light, infrared radiation emitted by atoms and molecules, accelerating charges, lasers, light bulbs, light emitting diodes (LEDs), chaotic laser light, pseudo-thermal light generated by passing laser light through a rotating ground glass or other scattering material, stars, moons, clouds, planets, space objects, fluorescent lamps, electrical discharges, plasmas, bio-luminescence, and stimulated emission. Although it is not absolutely necessary a lens is often used to perform this mapping. Imaging is often susceptible to adverse affects such as obscuration, turbulence, low signal to noise ratio such as when operating in low-light conditions, jitter, and noise. Often, this type of imaging is referred to as "First Order" imaging due to the time, ensemble, or mixed time-ensemble averaging of the sensors involved. For instance, a first-order light intensity image $I(x, y, t)$ can be produced by light interacting with a sensor for some time $\Delta t$, i.e. shutter or integration time. A single instance of this may be referred to as a "frame". Multiple frames of images, $I(x, y, t_i)$, may be averaged over some or all of the frames in a sequence of frames to generate an averaged first-order image of the subject $<I(x, y, t_i)>$ where $<>$ indicates an ensemble average. A second order image involves averages of products of two first-order intensity or normalized intensity measurements. An enhanced image results from the subtraction of products of averages of first order intensities from the average of the product of the intensities. An intensity or normalized intensity can be decomposed into a mean plus a deviation from the mean or average.

$I_1 = <I_1> + \Delta I_1$ and $I_2 = <I_2> + \Delta I_2$ with $I_1$ and $I_2$ being functions of space and time, i.e. x, y, t. Where $I_1$ and $I_2$ are intensities or normalized intensities measured by sensors 1 and 2. $<I_1>$ is the ensemble average of intensity or normalized measurements of sensor 1 and $\Delta I_1$ is the deviation from the mean for the intensity or normalized intensity measurements of sensor 1. $<I_2>$ is the ensemble average of intensity or normalized measurements of sensor 2 and $\Delta I_2$ is the deviation from the mean for the intensity or normalized intensity measurements of sensor 2. The deviation is often called a fluctuation. Mathematically the second-order enhanced image can be represented by
$<I_1 I_2> = <<I_1><I_2> + \Delta I_1 I_2 + \Delta I_2 <I_1> + \Delta I_1 \Delta I_2>$. Simplifying this expression yields $<I_1 I_2> = <I_1><I_2> + <\Delta I_1 \Delta I_2>$. Similarly $$<\Delta I_1 \Delta I_2> = <(I_1 - <I_1>)(I_2 - <I_2>)>$$
$$= <I_1 I_2 - I_1 <I_2> - I_2 <I_1> + <I_1><I_2>>$$
$$= <I_1 I_2> - 2<I_1><I_2> + <I_1><I_2>.$$

$$<\Delta I_1 \Delta I_2> = <I_1 I_2> - <I_1><I_2>$$

$I_1$ and $I_2$ refer to intensities measured by at least two sensors where one of the sensors measures spatial information of the light coming from the scene or subject (the "Reference" sensor) and the other sensor would measures a quantity representative of the intensity coming from the scene or subject, i.e. a "the bucket" sensor. One of the sensors may be a "virtual" sensor wherein, for instance, the representative intensity coming from the scene or subject is comprised of spatially integrating all or a selected subset of pixels on a CCD or CMOS camera or even consist of a single pixel from a CCD or CMOS camera. There are several ways to normalize intensity. One way is to divide the Reference pixel intensity values by a non-zero value "bucket" intensity, $J_1=I_1/I_2$. This normalization would give $J_1=<J_1>+\Delta J_1$ and $I_2=<I_2>+\Delta I_2$ with $J_1$ and $I_2$ being functions of space and time, i.e. x, y, t. Where $J_1$ and $I_2$ are normalized intensities and intensities measured by sensors 1 and 2. $<J_1>$ is the ensemble average of intensity or normalized measurements of sensor 1 and $\Delta J_1$ is the deviation from the mean for the normalized intensity measurements of sensors 1 and 2. $<I_2>$ is the ensemble average of intensity or normalized measurements of sensor 2 and $\Delta I_2$ is the deviation from the mean for the intensity or normalized intensity measurements of sensor 2. The deviation is often called a fluctuation. When normalizing, mathematically the second-order enhanced image can be described by $<J_1I_2>=<<J_1><I_2>+\Delta J_1<I_2>+\Delta I_2<J_1>+\Delta J_1\Delta I_2>$. Simplifying this expression yields $<J_1I_2>=<J_1><I_2>+<\Delta J_1 \Delta I_2>$, rearranging terms yields $<\Delta J_1\Delta I_2>=<J_1I_2>-<J_1><I_2>$ wherein the enhanced image is contained in $<\Delta J_1\Delta I_2>$. The enhanced image may be normalized by the product of the standard deviations of $I_1$ and $I_2$ to generate an enhanced image that displays the correlation of $I_1$ and $I_2$. Other alternative ways to normalize the enhanced image include dividing $<\Delta I_1\Delta I_2>$ or $<\Delta I_1\Delta I_2>$ by the product $<J_1><I_2>$ or $<I_1><I_2>$ respectively. The enhanced image is contained in $<\Delta I_1\Delta I_2>$ which has a δ-function like correspondence between points on the object and points on the image sensor and is largely unaffected by the degrading effects of turbulence, obscuration, low signal to noise ratio such as when operating in low-light conditions, jitter, and noise, as further explained in Meyers et al., "Turbulence-free ghost imaging," Appl. Phys. Lett. 98, 111115, 2011, herein incorporated by reference.

The terminology "at least second order" means an enhanced image contained in $<\Delta I_1\Delta I_2>$ or $<\Delta I_1\Delta I_2\Delta I_3>$ or $<\Delta I_1\Delta I_2 \ldots \Delta I_N>$ where N is an integer, and where $I_3$ represents an image utilizing a third sensor and $I_N$ represents an image utilizing the nth sensor.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

Patents, patent applications, or publications mentioned in this specification are incorporated herein by object to the same extent as if each individual document was specifically and individually indicated to be incorporated by object.

The foregoing description of the specific embodiments are intended to reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. A system for generating an image of a target utilizing entangled quantum particle pairs comprising:
    at least one processor;
    at least one source of entangled quantum particles configured to sequentially output pairs of entangled particles through first and second channels, the first channel being configured to output first pairs of entangled quantum particles, the second channel being configured to output second pairs of entangled quantum particles, the first pairs of entangled quantum particles being entangled with the second pairs of entangled quantum particles;
    a first beam splitter operatively connected to the first channel of the at least one source of entangled quantum particles; the first beam splitter configured to split the first pairs of entangled particles for entry into first and second spatial detectors;
    at least one focusing device operatively connected to the second channel configured to direct the second pairs of entangled quantum particles towards a distant target;
    the first and second spatial detectors being operatively connected to the at least one processor; each of the first and second spatial detectors detecting one particle of the first pairs of entangled quantum particles, both spatial detectors measuring particles that have not interacted with the target; the at least one processor operating to record the detection of entangled quantum particles by the first and second spatial detectors and create image data representing the target; and at least one display operatively connected to the at least one processor for displaying an image of the target.

2. The system of claim 1 further comprising:
    a receiver operatively connected to the at least one processor configured to receive second entangled quantum pairs reflected by the target;
    a second beam splitter operatively connected to the receiver configured to receive the second entangled quantum pairs reflected from the target, the second beam splitter having third and fourth outputs configured such that one particle from the second pairs of entangled particles are outputted from the third and fourth outputs;
    third and fourth spatial detectors operatively connected to the third and fourth outputs and the at least one processor; the third and fourth spatial detectors operating to detect entangled quantum particles reflected by the target, the at least one processor operating to record the detection of entangled quantum particles by the third and fourth detectors, perform timing measurements and create image data of the target for display on the at least one display.

3. The system of claim 2 wherein the second pairs are either reflected or absorbed by the target and the effect of the reflection or absorption is transferred to the corresponding first pairs of entangled quantum particles through the properties of quantum entanglement, and wherein the focusing device and the receiver are telescopes, and wherein the at least one processor is operatively connected to the at least one source of entangled quantum particles.

4. The system of claim 1 wherein at least two of the first, second, third and fourth detectors are low resolution detectors.

5. The system of claim 1 wherein the at least one processor is configured to determine coincidences based on measurements of the first and second spatial detectors which occur within a predetermined time interval.

6. The system of claim 5 wherein the processor is configured to generate an image of at least second order using the coincidences.

7. The system of claim 1 wherein the processor is configured to apply an image improvement method for generating an image of at least second order using at least one measurable quantum property.

8. The system of claim 1 further comprising a first optical delay element configured to introduce a time delay for the first pairs of entangled particles outputted from the first channel, the first optical delay being configured to control the time the first pairs of entangled quantum particles are detected at the first and second detectors so as to generate an absorption image of the target, a reflection image of the target, or both.

9. A system for generating an image of a target utilizing entangled quantum particle pairs comprising:
at least one processor;
at least one source of entangled quantum particles configured to sequentially output pairs of entangled particles through first and second channels, the first channel being configured to output first pairs of entangled quantum particles, the second channel being configured to output second pairs of entangled quantum particles, the first and second pairs of entangled quantum particles being entangled;
a first beam splitter operatively connected to the first channel of the at least one source of entangled quantum particles; the first beam splitter configured to split the first pairs of entangled particles for entry into first and second spatial detectors;
at least one focusing device operatively connected to the second channel configured to direct the second pairs of entangled quantum particles towards a distant target;
the first and second spatial detectors being operatively connected to the at least one processor; each of the first and second spatial detectors detecting one particle of the first pairs of entangled quantum particles; the at least one processor operating to record the detection of entangled quantum particles by the first and second spatial detectors and create image data representing the target;
at least one display operatively connected to the at least one processor for displaying an image of the target;
wherein the at least one source of entangled quantum particles comprises a single source of entangled particle pairs and third, fourth, fifth and sixth beam splitters, the third and fourth beam splitters each having first and second outputs, the fifth and sixth beam splitters each having first and second inputs and an output, each of the first outputs being operatively connected to the fifth and sixth beam splitters, and the second outputs being operatively connected to second optical delay elements and phase modulators, the third and fourth beam splitters each configured to split an entangled quantum particle pair such that one of the entangled quantum particle pair enters the first inputs of the fifth and sixth beam splitters, and the other of the entangle quantum particle pair passes though the second optical delay elements and phase modulators prior to entry into the second inputs of the fifth and sixth beam splitters, such that each of the fifth and sixth beam splitters produce first and second entangled quantum particle pairs, the fifth and sixth beam splitters being operatively connected to the first and second channels resulting in entangled quantum particle pairs being directed through the first and second channels.

10. The system of claim 1 wherein the system is configured so that the interfered particles interact with the target causing absorption at the target entangling the retained particle pairs.

11. The system of claim 1 wherein the system is configured so that the interfered particles interact with the target causing reflection at the target and further comprises optics or focusing components and measurement electronics wherein the measurement of the reflected entangled particles entangles the retained particle pairs.

12. A method for generating an image of a target utilizing entangled quantum particle pairs comprising:
providing at least one source of entangled quantum particle pairs having first and channels; the at least one source of entangled quantum particle pairs outputting first and second pairs of entangled quantum particles, the first pairs of entangled quantum particles being entangled with the second pairs of entangled quantum particles;
outputting first pairs of entangled quantum particles through the first channel and into a first beam splitter;
outputting second pairs of entangled quantum particles through a second channel towards a target;
utilizing the first beam splitter, splitting the first pairs of entangled quantum particle pairs such that the first particle of each pair enters into a first spatial detector and the second particle of each pair enters into a second spatial detector, both spatial detectors measuring particles that have not interacted with the target; detecting coincidences utilizing the first and second spatial detectors and at least one processor to create image data representing the target; displaying an image of the target utilizing the image data.

13. The method of claim 12 further comprising:
providing a receiver operatively connected to the at least one processor configured to receive second entangled quantum pairs reflected by the target;
providing a second beam splitter operatively connected to the receiver configured to receive the second entangled quantum pairs, the second beam splitter having third and fourth outputs configured such that one particle from the second pairs of entangled particles are outputted from the third and fourth outputs;
providing third and fourth spatial detectors operatively connected to the third and fourth outputs and the at least one processor;
detecting entangled quantum particles reflected by the target using the third and fourth spatial detectors,
using the at least one processor, recording the detection of entangled quantum particles by the third and fourth detectors, performing coincidence measurements and creating image data of the target for display based upon the coincidence measurements.

14. The method of claim 12 wherein the second pairs of entangled quantum particles are either reflected or absorbed by the target and the effect of the reflection or absorption is transferred to the corresponding first pairs of entangled quantum particles through the properties of quantum entanglement, and wherein the second pairs of entangled quantum particles are directed towards a target using a telescope, and wherein the receiver is a telescope, and wherein the at least one processor is operatively connected to the at least one source of entangled quantum particles.

15. The method of claim 12 wherein the step of detecting coincidences utilizing the first and second spatial detectors and at least one processor to create image data representing the target comprises detecting coincidences based on measurements of the first and second spatial detectors which occur within a predetermined time interval.

16. The method of claim 15 wherein the at least one processor is configured to generate an image of at least second order using the coincidences.

17. The method of claim 16 wherein the processor is configured to apply an image improvement method for generating an image of at least second order using at least one measurable quantum property.

18. The method of claim 12 further comprising a first optical delay element configured to introduce a time delay for the first pairs of entangled particles outputted from the first channel, the first optical delay being configured to control the time the first pairs of entangled quantum particles are detected at the first and second detectors so as to generate an absorption image of the target, a reflection image of the target, or both.

19. A system for generating an image of a target utilizing entangled quantum particle pairs comprising:

at least one processor;

at least one source of entangled quantum particles configured to sequentially output pairs of entanglement swapped particles through first and second channels, the first channel being configured to output first pairs of entanglement swapped quantum particles, the second channel being configured to output second pairs of entanglement swapped quantum particles, the first and second pairs of entanglement swapped quantum particles being entangled;

a first beam splitter operatively connected to the first channel of the at least one source of entangled quantum particles; the first beam splitter having first and second outputs configured such that one particle from each of the first pairs of entanglement swapped particles are outputted from the first and second outputs;

at least one focusing device operatively connected to the second channel configured to direct the second pairs of entanglement swapped quantum particles towards a target;

first and second spatial detectors operatively connected to the first and second outputs and the at least one processor; each of the first and second spatial detectors detecting one particle of the first pairs of entanglement swapped quantum particles, both spatial detectors measuring particles that have not interacted with the target; the at least one processor operating to record the detection of entanglement swapped quantum particles by the first and second spatial detectors and create image data representing the target; and at least one display operatively connected to the at least one processor for displaying an image of the target.

20. The system of claim 19 further comprising:

a receiver operatively connected to the at least one processor configured to receive second entanglement swapped quantum pairs reflected by the target;

a second beam splitter operatively connected to the receiver configured to receive the second entanglement swapped pairs reflected from the target, the second beam splitter having third and fourth outputs configured such that one particle from the second pairs of entanglement swapped particles are outputted from the third and fourth outputs;

third and fourth spatial detectors operatively connected to the third and fourth outputs and the at least one processor; the third and fourth spatial detectors operating to detect entanglement swapped quantum particles reflected by the target, the at least one processor operating to record the detection of entanglement swapped quantum particles by the third and fourth detectors, perform timing measurements and create image data of the target for display on the at least one display.

* * * * *